United States Patent
Hiwatashi et al.

[11] Patent Number: 5,915,800
[45] Date of Patent: Jun. 29, 1999

[54] SYSTEM FOR CONTROLLING BRAKING OF AN AUTOMOTIVE VEHICLE

[75] Inventors: Yutaka Hiwatashi, Isesaki; Akira Takahashi, Oota; Koji Matsuno, Kasakake-Machi; Munenori Matsuura, Oota, all of Japan

[73] Assignee: Fuji Jukogyo Kabushiki Kaisha, Tokyo, Japan

[21] Appl. No.: 08/664,009

[22] Filed: Jun. 14, 1996

[30] Foreign Application Priority Data

| Jun. 19, 1995 | [JP] | Japan | 7-152034 |
| Jul. 12, 1995 | [JP] | Japan | 7-176137 |
| Sep. 1, 1995 | [JP] | Japan | 7-225586 |

[51] Int. Cl.$^6$ .................................................. B60T 8/58
[52] U.S. Cl. ................................. 303/146; 303/147
[58] Field of Search ........................... 303/146, 147, 303/148, 140

[56] References Cited

U.S. PATENT DOCUMENTS

| 5,303,989 | 4/1994 | Yasuno et al. | 303/147 |
| 5,328,256 | 7/1994 | Ohta et al. | 303/146 |
| 5,341,296 | 8/1994 | Yasuno et al. | 303/146 |
| 5,344,224 | 9/1994 | Yasuno | 303/146 |
| 5,505,532 | 4/1996 | Tozu et al. | 303/165 |
| 5,560,690 | 10/1996 | Hattori et al. | 303/146 |

FOREIGN PATENT DOCUMENTS

| 2151556 | 6/1990 | Japan | 303/147 |
| 3112755 | 5/1991 | Japan | 303/147 |
| 6115417 | 4/1994 | Japan | 303/148 |

*Primary Examiner*—Matthew C. Graham
*Attorney, Agent, or Firm*—Beveridge, DeGrandi, Weilacher & Young, LLP

[57] ABSTRACT

A braking force control system comprises a yaw rate sensor for detecting an actual yaw rate of a vehicle, a target yaw rate calculating section for detecting a vehicle speed and a steering angle to calculate a target yaw rate, a yaw-rate difference calculating section for calculating a difference in yaw rate by subtracting the target yaw rate from the actual yaw rate, and a braked-wheel discriminating section for selecting a rear-inside wheel as a braked wheel when the sign of the actual yaw rate is different from that of the difference in yaw rate, and for selecting a front-outside wheel as the braked wheel when the sign of the actual yaw rate is the same as that of the difference in yaw rate. Therefore, when the vehicle is in an under-steering tendency, the rear-inside wheel is selected, and when it is in an over-steering tendency, the front-outside wheel is selected. In addition, the system may further comprise an output discriminating section for comparing the difference in yaw rate with a discriminating threshold to discriminate as to whether the difference in yaw rate is within a control region. A first threshold is set as the discriminating threshold. After the under-steering tendency is changed to the over-steering tendency, a set period of time and a second threshold, the absolute value of which is smaller than that of the first threshold, are set. With this construction, it is possible to smoothly perform the control without giving uncomfortable feeling to a driver, and it is also possible to restrain the control by a rear wheel.

14 Claims, 22 Drawing Sheets

SYSTEM FOR CONTROLLING BRAKING OF AN AUTOMOTIVE VEHICLE

BACKGROUND OF THE INVENTION

The present invention relates to a braking force control system which improves stability of an automotive vehicle by applying braking force to a suitable wheel thereof when the vehicle is negotiating a tight cornering.

In recent years, various braking force control systems have been proposed for improving the stability of an automotive vehicle by applying braking force to a proper wheel thereof when the vehicle is cornering on the basis of the force applied to the vehicle during the cornering.

For example, Japanese Patent Laid-Open No. 2-70561 discloses a braking force control system which controls the braking force on the basis of rotational motion around the vertical axis passing through the center of gravity of an automotive vehicle, i.e., on the basis of a yaw rate which is an angular velocity of yawing. In this technique, a target yaw rate is compared with an actual yaw rate, and then, it is determined as to whether the vehicle running condition is an under-steering tendency or an over-steering tendency with respect to the target yaw rate. Braking force is applied to the inside wheels when it is the under-steering tendency, and braking force is applied to the outside wheels when it is the over-steering tendency, so that the running stability of the vehicle is improved.

However, in the aforementioned prior art, for example, if braking force is applied to the front-inside wheel due to the under-steering tendency during the cornering of a vehicle, there is a problem in that the under-steering tendency is intensified when the front-inside wheel tends to be locked due to the decrease of frictional resistance against a road surface and so forth. To the contrary, if braking force is applied to the rear-outside wheel due to the over-steering tendency, there is a problem in that the over-steering tendency is intensified when the rear-outside wheel tends to be locked.

As another example for selecting a wheel to be braked, Japanese Patent Laid-Open No. 4-372447 discloses that a wheel to be braked is selected on the basis of steering conditions. However, this can not also eliminate the aforementioned problems.

Moreover, it is required to strictly select a wheel to which braking force is to be applied, from four wheels in accordance with conditions. In a case where a rear wheel is selected as the braked wheel, according to the values calculated on the basis of the vehicle running condition and the difference in yaw rate, although the braking force applied to the rear wheel can assure a stable control on a high $\mu$ road surface, it may reduce the stability of the vehicle on a low $\mu$ road surface since the side slip of the rear wheel is caused by the braking force. In addition, if the braking force applied to the rear wheel is calculated by using the same gain as that of the braking force applied to the front wheel, the moment of turning-round increases so as to give an unnatural feeling to the driver. Furthermore, Japanese Patent Application Laid-Open No. 5-270382 discloses that the braking force is regarded as important on a high $\mu$ road surface to ensure the braking force is applied to the rear wheel, and that the braking force to be applied to the rear wheel is decreased on a low $\mu$ road surface in accordance with the increase of the difference between a target yaw rate and an actual yaw rate in order to prevent the loss of the stability due to the side slip of the rear wheel by the braking force of the rear wheel. This relates to the distribution of braking force when a vehicle turns in a system which controls the distribution of the braking force to the right and left wheels and the braking forces applied to the two rear wheels (simultaneously).

The aforementioned braking force control for improving the vehicle running stability is carried out on the basis of the difference (the difference in yaw rate) so that the actual yaw rate is coincident with the target yaw rate, and a non-control region is set so that the control is carried out only at a larger difference in yaw rate than a predetermined value in order to prevent the unnecessary control at a small value of the difference in yaw rate. That is, when the control is designed to be carried out at a small value of the difference in yaw rate, the control is carried out even if the driver can easily cope with the cornering, so that an unnatural feeling is given to the driver and the abrasion of brake parts is increased. Therefore, in this condition, the control is designed not to be carried out.

On the other hand, if the non-control region is set in a larger range than the necessary range, the controlled conditions are decreased, so that the effects of the control can not be fully exhibited.

Therefore, various techniques for suitably setting the non-control region have been proposed. For example, Japanese Patent Laid-Open No. 6-239216 discloses that the non-control region is so set as to vary in accordance with vehicle speed since the suitable non-control region varies in accordance with vehicle speed.

In general, as shown in FIG. 1, when an automotive vehicle turns (FIG. 1 shows an example where an automotive vehicle turns to the right, wherein it is assumed that the sign in the direction turning to the right is plus (+), and the non-control region is expressed by the slanting lines between $-\epsilon \leq \Delta\gamma \leq \epsilon$.), an actual yaw rate $\gamma$ is first in an under-steering tendency with respect to a target yaw rate $\gamma'$ (t1<t<t4), and then, it is changed to an over-steering tendency with respect to the target yaw rate $\gamma'$ (t4<t<t7) to converge at the target yaw rate $\gamma'$ (FIG. 1(a)). The absolute value of the difference in yaw rate $\Delta\gamma$ (=$\gamma-\gamma'$) is decreased to be a value within the non-control region when the actual yaw rate $\gamma$ changes from the under-steering tendency to the over-steering tendency. Therefore, the control is not carried out during this change, and the control is started a while after the actual yaw rate $\gamma$ is changed to the over-steering tendency (FIGS. 1(b) and 1(c)). As a result, since the control is discontinuous, there is a problem in that an uncomfortable feeling is given to the driver if the control is started a while after the actual yaw rate $\gamma$ changes to the over-steering tendency. Since this problem is caused even if the vehicle speed is constant, it can not be solved by the aforementioned technique for setting the non-control region in accordance with the vehicle speed.

In particular, when the control is carried out by applying braking force to the rear wheel, the side slip of the rear wheel may be caused. Therefore, it is desired to restrain the control, which is carried out by applying braking force to the rear wheel, as much as possible.

SUMMARY OF THE INVENTION

It is therefore an object of the present invention to eliminate the aforementioned problems and to provide a braking force control system which can surely improve the running stability of an automotive vehicle by accurately selecting a wheel to which braking force is applied, from four wheels, and by setting the selected wheel.

It is another object of the present invention to provide a braking force control system which can surely improve the running stability of an automotive vehicle by accurately selecting a wheel to which braking force is applied, from four wheels, and by setting the selected wheel even if the vehicle is running on a low μ road surface, and which can control the braking force by natural vehicle behavior according to the driver's intention.

It is a further object of the present invention to provide a braking force control system which can smoothly control the braking force without giving an uncomfortable feeling to the driver, which can restrain the control carried out by applying braking force to the rear wheel, and which can improve the running stability of an automotive vehicle by accurately selecting and setting a wheel to which braking force is applied.

In order to accomplish the aforementioned and other objects, a braking force control system for an automotive vehicle having wheel speed detecting means for detecting a speed of each wheel and for generating a wheel speed signal, steering angle detecting means for detecting a steering angle of a steering wheel, and a yaw rate detector for detecting an actual yaw rate of the vehicle and for generating a yaw rate signal, comprises vehicle speed calculating means responsive to the wheel speed signal for computing a vehicle speed and for producing a vehicle speed signal, yaw rate calculating means responsive to the vehicle speed signal for calculating a yaw rate gain and for producing a yaw rate signal, target yaw rate calculating means responsive to said steering angle signal and the yaw rate signal for calculating a target yaw rate on the basis of the vehicle speed and the steering angle and for generating a target yaw rate signal, yaw rate difference calculating means responsive to the yaw rate and the target yaw rate signals for calculating a difference in the yaw rate by subtracting the target yaw rate from the yaw rate and for producing a difference signal, target braking force calculating means responsive to the difference signal for calculating a target braking force of the vehicle on the basis of the difference in the yaw rate and running conditions of the vehicle and for generating a target signal, discriminating means responsive to the yaw rate and the difference signals for selecting a wheel to be braked on the basis of the yaw rate and the difference and for producing a discrimination signal; and output means responsive to said discrimination signal and the target yaw rate signal for outputting a braking signal so as to control a target braking force at an optimum value corresponding to the driving conditions of the vehicle.

According to a second aspect of the present invention, in the braking force control system according to the first aspect, the braked-wheel discriminating means selects a rear-inside wheel as the braked wheel when the sign of the actual yaw rate is different from that of the difference in yaw rate, and a front-outside wheel as the braked wheel when the sign of the actual yaw rate is the same as that of the difference in yaw rate.

According to a third aspect of the present invention, in the braking force control system according to the first or second aspect, the braked-wheel discriminating means presets values of the actual yaw rate for which the selection of the braked wheel of the vehicle is not performed and no wheel is braked.

According to a fourth aspect of the present invention, in the braking force control system according to the third aspect of the present invention, the values of the actual yaw rate for which the selection of the braked wheel of the vehicle is not performed and no wheel is braked, preset in the discriminating means, is set within a substantially straight running condition of the vehicle.

According to a fifth aspect of the present invention, in the braking force control system according to the first aspect of the present invention, the braking force control system comprises output discriminating means for setting a first threshold as a yaw-rate difference discriminating threshold which discriminates as to whether the difference in yaw rate is in a control region, and for setting a second threshold, the absolute value of which is smaller than that of the first threshold, as the yaw-rate difference discriminating threshold and for discriminating as to whether the difference in yaw rate is in the control region by comparing the difference in yaw rate with the discriminating threshold, when the sign of the actual yaw rate is the same as that of the difference in yaw rate after the sign of the actual yaw rate has been different from that of the difference in yaw rate.

According to a sixth aspect of the present invention, in the braking force control system according to the first aspect, the target braking-force calculating means calculates a front-wheel theoretical target braking force and a rear-wheel theoretical target braking force on the basis of the running condition of the vehicle and the difference in yaw rate, and the target braking-force calculating means also calculates a front-wheel target braking force by multiplying the front-wheel theoretical target braking force by a relatively large gain, and a rear-wheel target braking force by multiplying the rear-wheel theoretical target braking force by a relatively small gain.

According to a seventh aspect of the present invention, in the braking force control system according to the sixth aspect, the braked-wheel discriminating means selects a rear-inside wheel as the braked wheel when the sign of the actual yaw rate is different from that of the difference in yaw rate, and a front-outside wheel as the braked wheel when the sign of the actual yaw rate is the same as that of the difference in yaw rate, in a preset running condition.

According to an eighth aspect of the present invention, in the braking force control system according to the sixth or seventh aspect, the relatively large gain by which the target braking-force calculating means multiplies the front-wheel theoretical target braking force to calculate the front-wheel target braking force, is preset on the basis of vehicle items, and the relatively small gain by which the target braking-force calculating means multiplies the rear-wheel theoretical target braking force to calculate the rear-wheel target braking force, is preset by multiplying the relatively large gain on the basis of the vehicle items, by a number which is larger than 0 and smaller than 1.

According to a ninth aspect of the present invention, the braking force control system according to the first aspect further comprises: braked-wheel discriminating means for selecting a rear-inside wheel as the braked wheel when the sign of the actual yaw rate is different from that of the difference in yaw rate, and a front-outside wheel as the braked wheel when the sign of the actual yaw rate is the same as that of the difference in yaw rate; output discriminating means for setting a first threshold as a yaw-rate difference discriminating threshold which discriminates as to whether the difference in yaw rate is in a control region, and for setting a second threshold, the absolute value of which is smaller than that of the first threshold, as the yaw-rate difference discriminating threshold and for discriminating as to whether the difference in yaw rate is in the control region by comparing the difference in yaw rate with the discriminating threshold, when the sign of the actual yaw rate is the same as that of the difference in yaw rate after the sign of the actual yaw rate has been different from that of the difference in yaw rate; and braking-signal output means for outputting a signal to the brake driving section so as to add the target braking force calculated by the target braking-force calculating means, to the braked wheel selected by the braked-wheel discriminating means when the output discriminating means discriminates that the difference in yaw rate is in the control region.

In the braking force control system according to the first aspect, the vehicle-speed detecting means detects the vehicle speed, the steering-angle detecting means detects the steering angle, and the actual yaw-rate detecting means detects the actual yaw rate. In addition, the target yaw-rate calculating means calculates the target yaw rate on the basis of the vehicle speed detected by the vehicle-speed detecting means and on the basis of the steering angle detected by the steering-angle detecting means, and the yaw-rate difference calculating means calculates the difference in yaw rate by subtracting the target yaw rate from the actual yaw rate. The target braking-force calculating means calculates the target braking force on the basis of the vehicle running condition such as the vehicle speed and the steering angle, and on the basis of the difference in yaw rate. In addition, the braked-wheel discriminating means selects the braked wheel from four wheels, so that the braking force applied thereto can be independently controlled, on the basis of the actual yaw rate and the difference in yaw rate. Moreover, the braking-signal output means outputs the signal to the brake driving section so as to add the target braking force calculated by the target braking-force calculating means to the braked wheel selected by the braked-wheel discriminating means.

In the braking force control system according to the second aspect, when the braked-wheel discriminating means selects the braked wheel, it compares the sign of the actual yaw rate with that of the difference in yaw rate, and selects the rear-inside wheel when both signs are different from one another and the front-outside wheel when both signs are the same.

In the braking force control system according to the third aspect, when the actual yaw rate is within the preset region, the selection of the braked wheel is not performed and no wheel is braked.

In the braking force control system according to the fourth aspect, when the actual yaw rate is within the preset substantially straight running condition of the vehicle, the selection of the braked wheel is not performed and no wheel is braked.

Furthermore, in the braking force control system according to the fifth asepct of the present invention, in addition to the first aspect, the output discriminating means sets the first threshold as the yaw-rate difference discriminating threshold which discriminates as to whether the difference in yaw rate is in the control region. When the sign of the actual yaw rate is the same as that of the difference in yaw rate after the sign of the actual yaw rate is different from that of the difference in yaw rate, the output discriminating means sets the second threshold, the absolute value of which is smaller than that of the first threshold, as the yaw-rate difference discriminating threshold during the preset period of time, and discriminates as to whether the difference in yaw rate is in the control region by comparing the difference in yaw rate with the discriminating threshold.

In the braking force control system according to the sixth aspect, the vehicle-speed detecting means detects the vehicle speed, the steering-angle detecting means detects the steering angle, and the actual yaw-rate detecting means detects the actual yaw rate. In addition, the target yaw-rate calculating means calculates the target yaw rate on the basis of the vehicle speed detected by the vehicle-speed detecting means and on the basis of the steering angle detected by the steering-angle detecting means, and the yaw-rate difference calculating means calculates the difference in yaw rate by subtracting the target yaw rate from the actual yaw rate. The target braking-force calculating means calculates the front-wheel theoretical target braking force and the rear-wheel theoretical target braking force on the basis of the vehicle running condition and the difference in yaw rate, and calculates the front-wheel target braking force by multiplying the front-wheel theoretical target braking force by a relatively large gain and the rear-wheel target braking force by multiplying the rear-wheel theoretical target braking force by a relatively small gain. In addition, the braked-wheel discriminating means selects the braked wheel from four wheels, so that the braking force applied thereto can be independently controlled, on the basis of the actual yaw rate and the difference in yaw rate. Moreover, the braking-signal output means outputs the signal to the brake driving section so as to add the target braking force calculated by the target braking-force calculating means, to the braked wheel selected by the braked-wheel discriminating means.

In the braking force control system according to the seventh aspect, when the braked-wheel discriminating means selects the braked wheel, it compares the sign of the actual yaw rate with that of the difference in yaw rate based on a preset running condition to select the rear-inside wheel as the braked wheel when both signs are different from another, and the front-outside wheel as the braked wheel when both signs are the same.

In the braking force control system according to the eighth aspect, in order for the target braking-force calculating means to calculate the front-wheel target braking force, the front-wheel theoretical target braking force is calculated on the basis of the vehicle running condition and the difference in yaw rate, and then, the front-wheel target braking force is calculated by multiplying the front-wheel theoretical target braking force by a relatively large gain which is preset on the basis of vehicle items. In addition, in order to calculate the rear-wheel target braking force, the rear-wheel theoretical target braking force is calculated on the basis of the vehicle running condition and the difference in yaw rate, and then, the rear-wheel target braking force is calculated by multiplying the rear-wheel theoretical target braking force by a relatively small gain which is larger than 0 and smaller than 1.

In the braking force control system according to the ninth aspect, the vehicle-speed detecting means detects the vehicle speed, the steering-angle detecting means detects the steering angle, and the actual yaw-rate detecting means detects the actual yaw rate. In addition, the target yaw-rate calculating means calculates the target yaw rate on the basis of the vehicle speed detected by the vehicle-speed detecting means and on the basis of the steering angle detected by the steering-angle detecting means, and the yaw-rate difference calculating means calculates the difference in yaw rate by subtracting the target yaw rate from the actual yaw rate. The target braking-force calculating means calculates the target braking force on the basis of the vehicle running condition such as the vehicle speed and the steering angle and on the basis of the difference in yaw rate. In addition, the braked-wheel discriminating means selects the rear-inside wheel as the braked wheel when the sign of the actual yaw rate is different from that of the difference in yaw rate, and the front-outside wheel as the braked wheel the sign of the actual yaw rate is the same as that of the difference in yaw rate. In addition, the output discriminating means sets the first threshold as the yaw-rate difference discriminating threshold which discriminates as to whether the difference in yaw rate is in the control region. When the sign of the actual yaw rate is the same as that of the difference in yaw rate after the sign of the actual yaw rate has been different from that of the difference in yaw rate, the output discriminating means sets the second threshold, the absolute value of which is smaller than that of the first threshold, as the yaw-rate difference discriminating threshold during the preset period of time, and discriminates as to whether the difference in yaw rate is in the control region by comparing the difference in yaw rate with the discriminating threshold. Moreover, the braking-signal output means outputs the signal to the brake driving section so as to add the target braking force calculated by the target braking-force calculating means, to the braked wheel selected by the braked-wheel discriminating means when the output discriminating means discriminates that the difference in yaw rate is in the control region.

According to a tenth aspect of the present invention, in the braking force control system according to the ninth aspect, the set intervals at which the second threshold is set by the output discriminating means is the preset period of time.

In the braking force control system according to the tenth aspect, the output discriminating means sets the second threshold as the discriminating threshold during a preset period of time after the sign of the actual yaw rate becomes the same as that of the difference in yaw rate after the sign of the actual yaw rate has been different from that of the difference in yaw rate.

According to an eleventh aspect of the present invention, in the braking force control system according to the ninth aspect, the set intervals at which the second threshold is set by the output discriminating means is a period of time until any one of the difference in yaw rate and the actual yaw rate is approximately zero after the second threshold is set.

In the braking force control system according to the eleventh aspect, the output discriminating means sets the second threshold as the discriminating threshold when the sign of the actual yaw rate is the same as that of the difference in yaw rate after the sign of the actual yaw rate has been different from that of the difference in yaw rate, and therefore, sets the second threshold as the discriminating threshold until any one of the difference in yaw rate and the actual yaw rate is approximately zero.

According to a twelfth aspect of the present invention, in the braking force control system according to the ninth aspect, the set intervals at which the second threshold is set by the output discriminating means is a shorter period of time out of a preset period of time and a period of time until any one of the difference in yaw rate and the actual yaw rate is approximately zero after the second threshold is set.

In the braking force control system according to the twelfth aspect, the second threshold is set as the discriminating threshold for a shorter period of time, out of a preset period of time when the sign of the actual yaw rate is the same as that of the difference in yaw rate after the signal of the actual yaw rate has been different from that of the difference in yaw rate, or of a period of time until any one of the difference in yaw rate and the actual yaw rate is approximately zero after the second threshold is set.

According to a thirteenth aspect of the present invention, in the braking force control system according to any one of the eighth, ninth, tenth and eleventh aspects, at least one of the absolute value of the first threshold and the absolute value of the second threshold is so set as to decrease as the running speed of the vehicle increases.

In the braking force control system according to the thirteenth aspect, at least one of the absolute value of the first threshold and the absolute value of the second threshold is so set as to decrease as the running speed of the vehicle increases in the braking force control system according to any one of the eighth through eleventh aspects.

As mentioned above, according to the present invention, braked-wheel discriminating means are provided for discriminating the turning direction of the vehicle on the basis of an actual yaw rate and for discriminating as to whether the running condition is an under-steering tendency or an over-steering tendency with respect to a target yaw rate on the basis of the actual yaw rate and a difference in yaw rate to select the most suitable wheel to be braked from four wheels. Therefore, it is possible to surely prevent a vehicle from being easy to spin by applying braking force to a rear wheel in spite of the tendency toward spin, and to prevent a vehicle from being easy to drift out by applying braking force a front wheel in spite of the tendency toward drift-out, and it is possible to improve the vehicle running stably.

In addition, braked-wheel discriminating means presets a region of the actual yaw rate wherein the selection of the braked-wheel is performed and no wheel is braked, so that no wheel is braked when it is particularly unnecessary to perform the control by the application of braking force. Therefore, it is possible to reduce the abrasion of a brake.

In addition, it is possible to accurately select and set a wheel to which braking force is applied, from four wheels of the vehicle, so that it is possible to surely improve the vehicle running stability even if the vehicle is running on a low $\mu$ road surface and it is possible to perform the control by natural vehicle behavior according to the driver's intention.

The second threshold, the absolute value of which is smaller than that of the first threshold, is set as the discriminating threshold for a predetermined period of time after the vehicle behavior is changed from the under-steering tendency to the over-steering tendency. Therefore, the control can be quickly started when the vehicle behavior is changed from the under-steering tendency to the over-steering tendency. In addition, the difference between the actual yaw rate and the target yaw rate can be relatively small after the over-steering tendency, and it is possible to quickly converge the actual yaw rate on the target yaw rate. Moreover, it is possible to smoothly perform the control without giving a sense of incompatibility to the driver, and it is possible to restrain the braking force control of the rear wheels. In addition, the turning direction of the vehicle is discriminated on the basis of the actual yaw rate, and it is discriminated as to whether the running condition is in the under-steering tendency or the over-steering tendency with respect to the target yaw rate on the basis of the actual yaw rate and the difference in yaw rate to select the most suitable wheel to be braked. Therefore, it is possible to surely prevent a vehicle from being easy to spin by applying braking force to a rear wheel in spite of the tendency toward spin and to surely prevent a vehicle from being easy to drift out by applying braking force a front wheel in spite of the tendency toward drift-out, so that it is possible to improve the vehicle running stability.

DETAILED DESCRIPTION OF THE PREFERRED EMBODIMENTS

Referring now to the accompanying drawings, the preferred embodiments of a braking force control system according to the present invention will be described in detail below.

Figure 1:
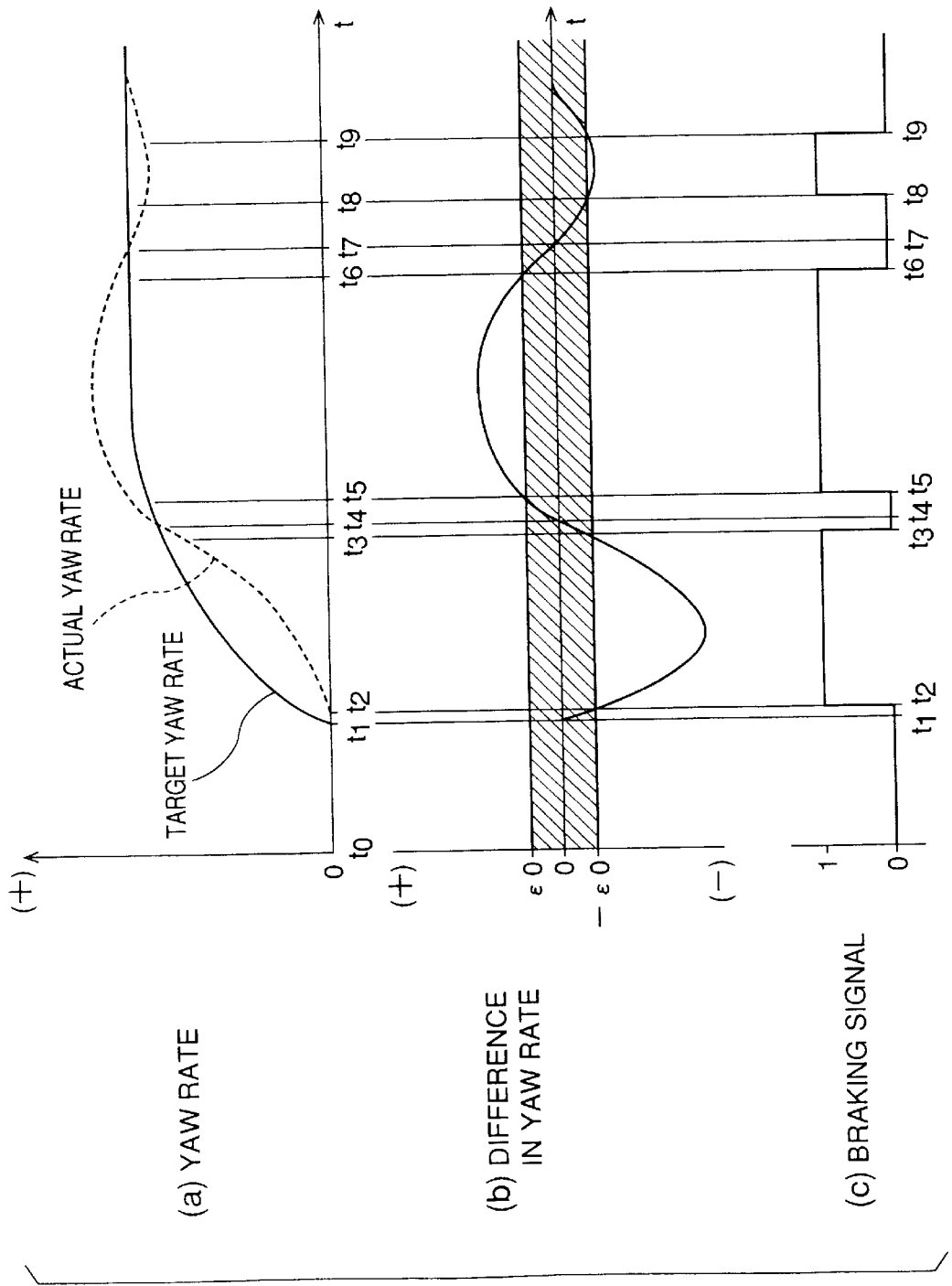
FIG. 1 is a time chart showing an example of a conventional braking force control.
Figure 2:
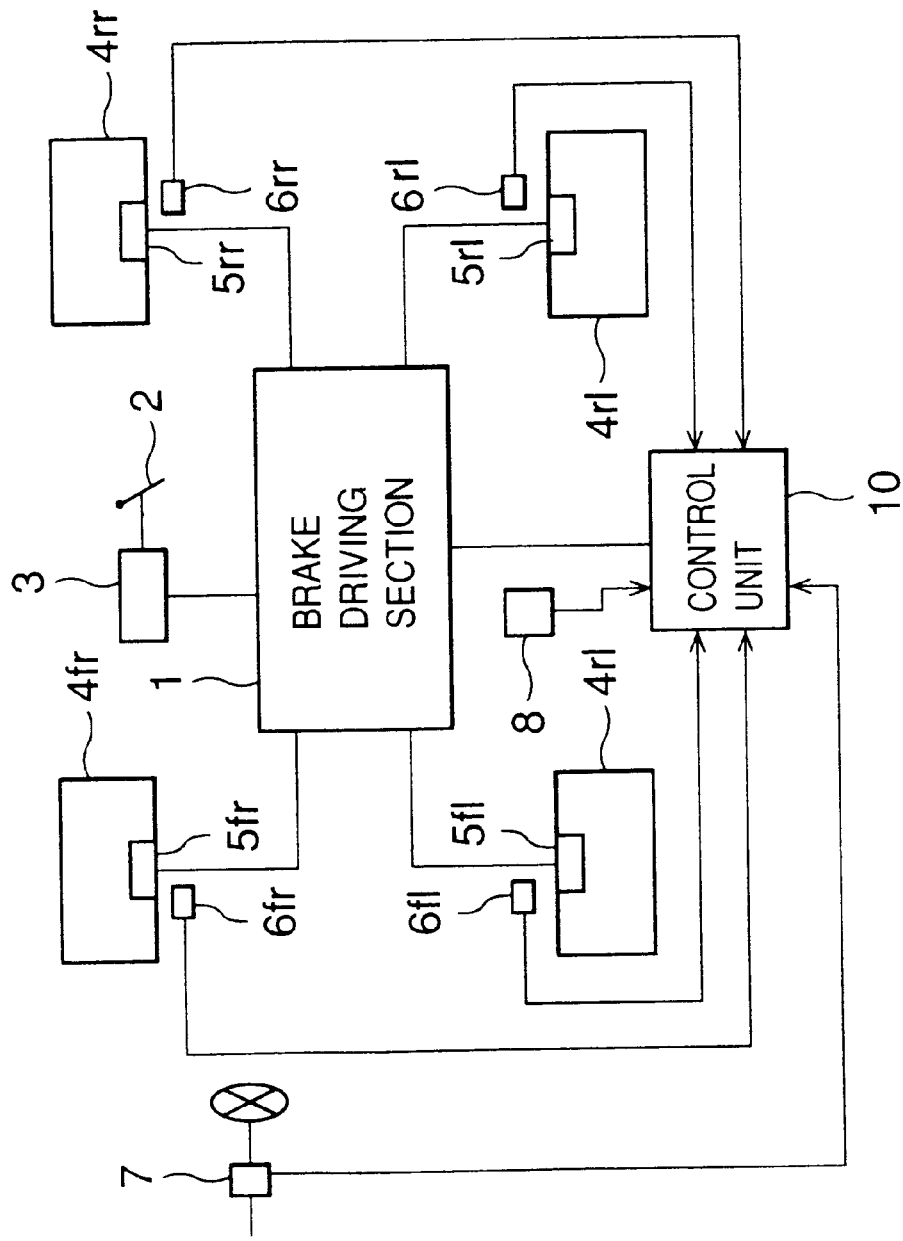
FIG. 2 is a schematic view of the first preferred embodiment of a braking force control system according to the present invention.

In FIG. 2, the reference number 1 denotes a brake driving section. A master cylinder 3 is connected to the brake driving section. The master cylinder 3 is also connected to a brake pedal 2 which is operated by a driver. When the driver treads on the brake pedal 2, braking pressure is introduced from the master cylinder 3 into each of the wheel cylinders (a front-left wheel cylinder 5fl, a front-right wheel cylinder 5fr, a rear-left wheel cylinder 5rl and a rear-right wheel cylinder 5rr) for four wheels (a front-left wheel 4fl, a front-right wheel 4fr, a rear-left wheel 4rl and a rear-right wheel 4rr) through the brake driving section 1, so that braking force is applied to the four wheels.

The brake driving section 1 is a hydraulic unit which has a pressure source, a pressure reducing valve, a pressure intensifying valve and so forth. The brake driving section 1 can introduce braking pressure into the wheel cylinders 5fl, 5fr, 5rl and 5rr independently of each other.

The wheel speeds of the respective wheels 4fl, 4fr, 4rl and 4rr are detected by means of wheel speed sensors (a front-left wheel speed sensor 6fl, a front-right wheel speed sensor 6fr, a rear-left wheel speed sensor 6rl and a rear-right wheel speed sensor 6rr). In addition, the steering wheel portion of the vehicle is provided with a steering angle sensor 7 for detecting the turning angle of a steering wheel.

The reference number 10 denotes a control unit comprising a microcomputer and its peripheral circuits. To this control unit 10, the wheel speed sensors 6fl, 6fr, 6rl and 6rr, the steering angle sensor 7, and a yaw rate sensor, for example, serving as an actual yaw-rate detecting means formed by combining acceleration sensors, are connected for outputting a driving signal to the brake driving section. Furthermore, the signal outputted from the yaw rate sensor 8 is inputted to the control unit 10, for example, through a low-pass filter of 7 Hz.

Figure 3:
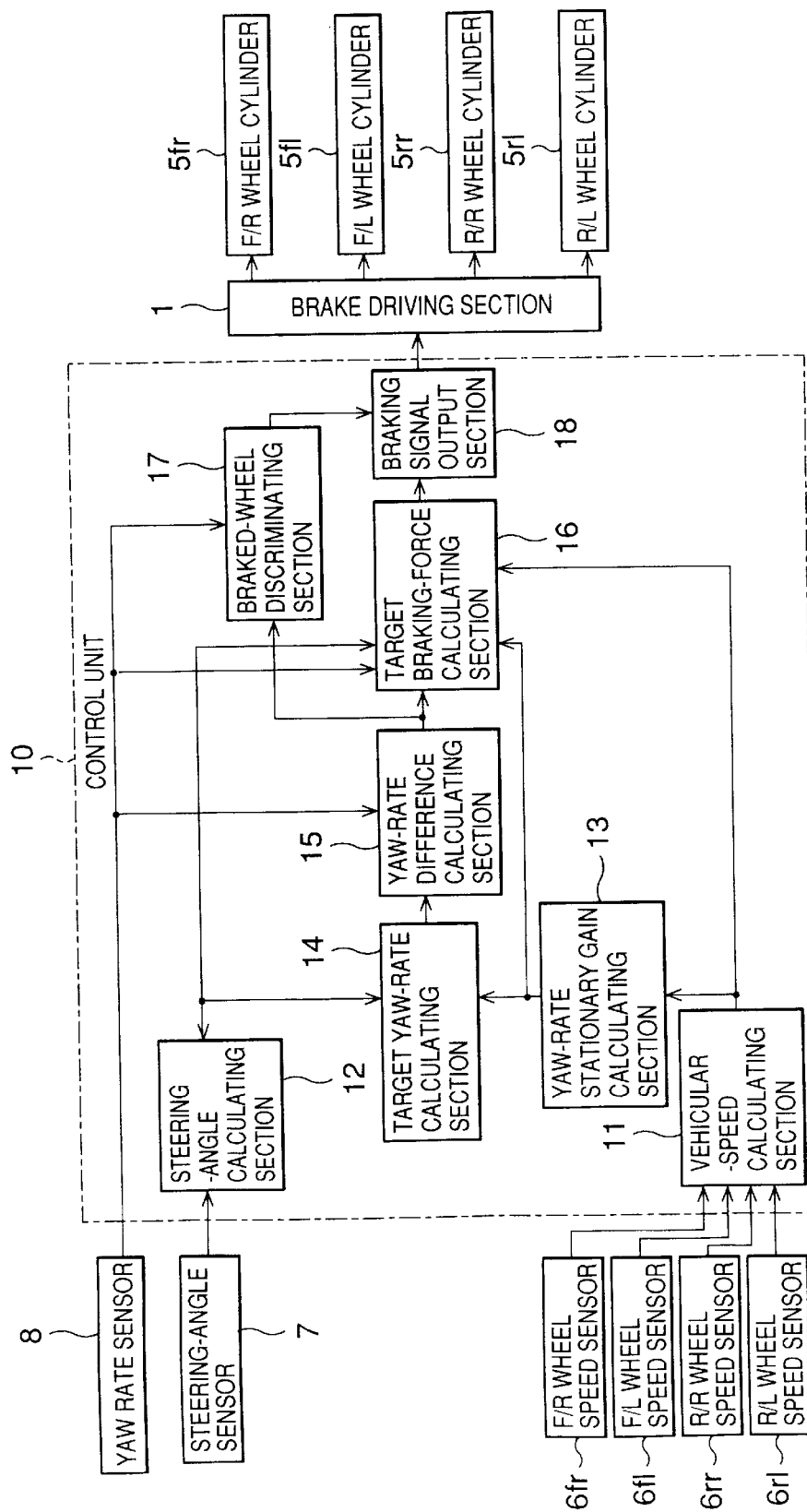
FIG. 3 is a functional block diagram of the first preferred embodiment of a braking force control system according to the present invention.

As shown in FIG. 3, the control unit 10 generally comprises a vehicle-speed calculating section 11, a steering-angle calculating section 12, a yaw-rate steady gain calculating section 13, a target yaw-rate calculating section 14, a yaw-rate difference calculating section 15, a target braking-force calculating section 16, a braked-wheel discriminating section 17 and a braking signal output section 18.

The vehicle-speed calculating section 11 is formed in a circuit section serving as vehicle-speed detecting means for receiving signals of wheel speeds $\omega 1$, $\omega 2$, $\omega 3$ and $\omega 4$ from the respective wheel speed sensors 6fl, 6fr, 6rl and 6rr to derive a vehicle speed V by calculating these signals in accordance with a preset numerical formula (for example, by deriving an average value of the speed signals from the respective wheel speed sensors 6fl, 6fr, 6rl and 6rr), and to output the derived vehicle speed V to the yaw-rate steady gain calculating section 13 and the target braking-force calculating section 16.

The steering-angle calculating section 12 is formed in a circuit section serving as steering-angle detecting means for receiving signals from the steering angle sensor 7 to derive an actual steering angle $\delta f$ ($=\theta/N$) by dividing a steering angle $\theta$ by a steering gear ratio N, and to output the derived actual steering angle $\delta f$ to the target yaw-rate calculating section 14 and the target braking-force calculating section 16.

The yaw-rate steady gain calculating section 13 is a circuit section for deriving a value of yaw rate (a yaw-rate steady gain $G\gamma\delta f(0)$ with respect to the actual steering angle $\delta f$ in the steady circular turning of the vehicle on the basis of a preset formula. The derived yaw-rate steady gain $G\gamma\delta f(0)$ is outputted to the target yaw-rate calculating section 14 and the target braking-force calculating section 16. Assuming that a wheel base is L and a stability factor determined by vehicle items is A0, the yaw-rate steady gain $G\gamma\delta f(0)$ is calculated by the following formula.

$$G\gamma\delta f(0)=1/(1+A0\cdot V2)\cdot V/L \qquad (1)$$

Assuming that the mass of the vehicle is m, the distance between a front shaft and the center of gravity is Lf, the distance between a rear shaft and the center of gravity is Lr, a front equivalent cornering power is CPf and a rear equivalent cornering power is CPr, the stability factor A0 is derived by the following formula.

$$A0=\{-m\cdot(Lf\cdot CPf-Lr\cdot CPr)\}/(2\cdot L2\cdot CPf\cdot CPr) \qquad (2)$$

The target yaw-rate calculating section 14 is formed in a circuit for calculating a target yaw rate $\gamma'$ in view of a response time lag of the vehicle on the basis of the actual steering angle $\delta f$ from the steering-angle calculating section 12 and of the yaw-rate steady gain $G\gamma\delta f(0)$ from the yaw-rate steady gain calculating section 13, and to output the calculated target yaw rate $\gamma'$ to the yaw-rate difference calculating section 15. That is, target yaw-rate calculating means are formed by the yaw-rate steady gain calculating section 13 and the target yaw-rate calculating section 14. Assuming that a time constant is T and a Laplacean is s, the target yaw rate is calculated by the following formula.

$$\gamma'=1/(1+T\cdot s)\cdot G\gamma\delta f(0)\cdot\delta f \qquad (3)$$

The aforementioned formula (3) is a formula obtained by approximating the response time lag expressed by a quadratic form to a linear form. In the formula (3), T is a time constant, and, for example, it is derived by the following formula.

$$T=m\cdot Lf\cdot V/2\cdot L\cdot CPr \qquad (4)$$

The yaw-rate difference calculating section 15 is a circuit serving as yaw-rate difference calculating means for subtracting the target yaw rate $\gamma'$, calculated by the target yaw-rate calculating section 14, from the actual yaw rate $\gamma$ detected by the yaw rate sensor 8, to derive a yaw-rate difference $\Delta\gamma$ (=$\gamma-\gamma'$) and to output the derived yaw-rate difference $\Delta\gamma$ to the target braking-force calculating section 16 and the braked-wheel discriminating section 17.

The target braking-force calculating section 16 is a circuit serving as target braking-force calculating means for calculating a target braking force (a front-wheel target fluid pressure BF2$f$, a rear-wheel target fluid pressure BF2$r$) in view of the vehicle items on the basis of the motion conditions of the vehicle and the difference in yaw rate. The calculated target fluid pressures BF2$f$ and Bf2$r$ are outputted to the braking signal output section 18. The target fluid pressures BF2$f$ and Bf2$r$ are calculated, for example, by the following formulae:

$$BF2f=G1\cdot(\Delta A\cdot 4\cdot L2\cdot CPf\cdot Cpr\cdot V)/\{(CPf+CPr)/df\}\cdot\gamma \qquad (5)$$

$$BF2r=G1\cdot(\Delta A\cdot 4\cdot L2\cdot CPf\cdot Cpr\cdot V)/\{(CPf+CPr)/dr\}\cdot\gamma \qquad (6)$$

wherein G1 is a gain, df is a front tread, dr is a rear tread, and $\Delta A$ is expressed by the following formula.

$$\Delta A=\{\delta f/(G\gamma\delta f(0)\cdot\delta f+\Delta\gamma)-1/G\gamma\delta f(0)\}/L\cdot V \qquad (7)$$

Furthermore, $\Delta\gamma$ in the aforementioned formula (7) may be corrected in view of a side slip angle $\beta$ which is an angle between the running direction of the vehicle and the forward and rearward directions, and the amended $\Delta\gamma$ may be used in the formula (7).

The braked-wheel discriminating section 17 is a circuit serving as braked-wheel discriminating means for selecting a wheel of the vehicle to be braked on the basis of the combination of the signs of the actual yaw rate $\gamma$ and the difference in yaw rate $\Delta\gamma$, and the following combinations are preset therein. Furthermore, both of the actual yaw rate $\gamma$ and the target yaw rate $\gamma'$ are given assuming that the direction of the vehicle turning to the left is + and the direction of the vehicle turning to the right is minus (−).

(Case 1): when $\gamma>0$ and $\Delta\gamma<0$, i.e. when the vehicle is turning to the left and the vehicle behavior is in the under-steering tendency with respect to the target yaw rate $\gamma'$, the rear-left wheel is braked.

(Case 2): when $\gamma>0$ and $\Delta\gamma>0$, i.e. when the vehicle is turning to the left and the vehicle behavior is in the over-steering tendency with respect to the target yaw rate $\gamma'$, the front-right wheel is braked.

(Case 3): when $\gamma<0$ and $\Delta\gamma<0$, i.e., when the vehicle is turning to the right and the vehicle behavior is in the over-steering tendency with respect to the target yaw rate $\gamma'$, the front-left wheel is braked.

(Case 4): when $\gamma<0$ and $\Delta\gamma>0$, i.e. when the vehicle is turning to the right and the vehicle behavior is in the under-steering tendency with respect to the target yaw rate $\gamma'$, the rear-right wheel is braked.

Figure 6:
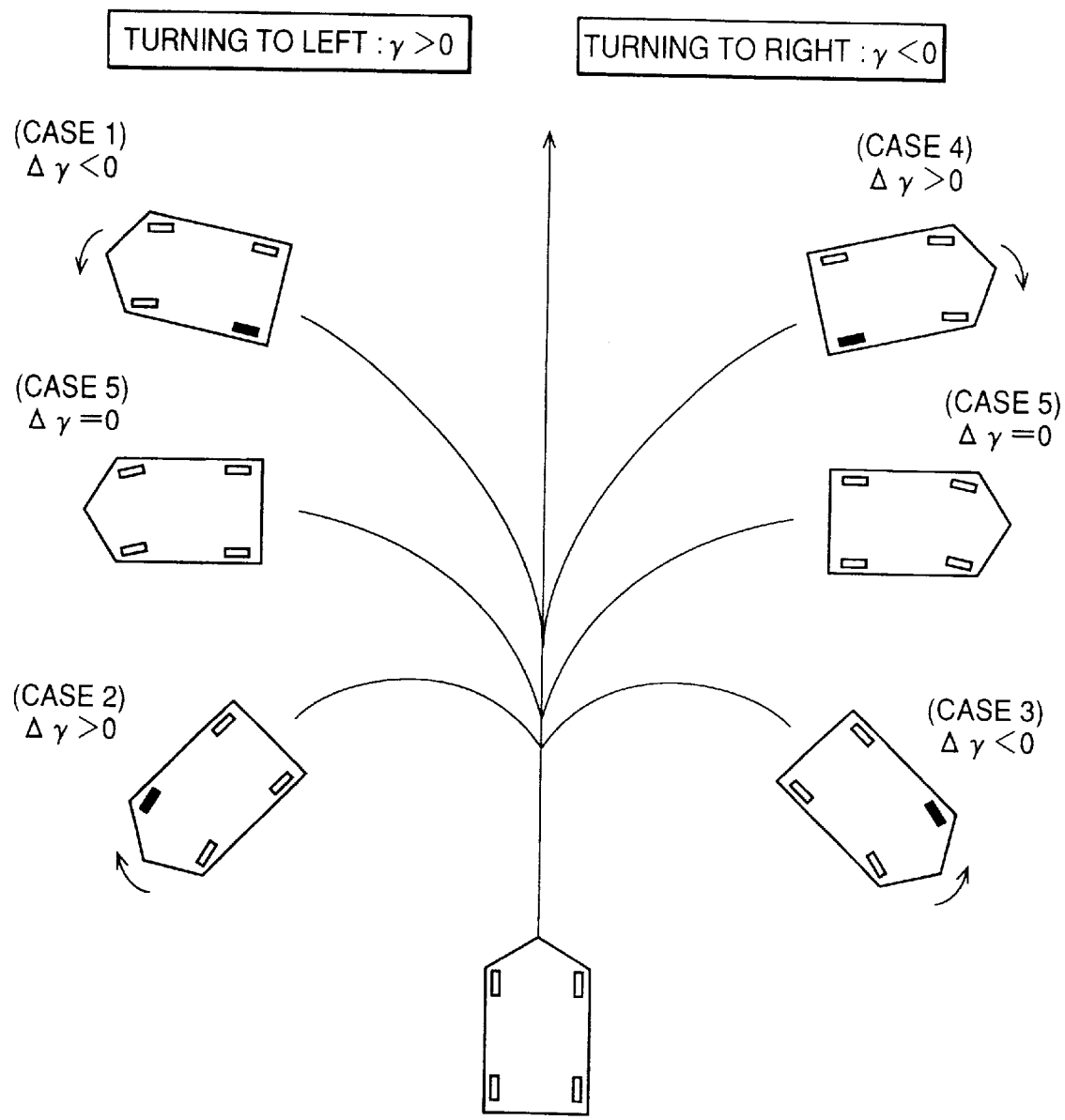
FIG. 6 is an explanatory drawing of the movements of an automotive vehicle according to the first preferred embodiment of a braking force control of the present invention.

(Case 5): when $\gamma=0$ or $\Delta\gamma=0$, the selection of the wheel to be braked is not performed and no wheel is braked (FIG. 6).

That is, when the sign of the actual yaw rate $\gamma$ is different from the sign of the difference in yaw rate $\Delta\gamma$, the rear-inside wheel is selected as the wheel to be braked, and when the sign of the actual yaw rate $\gamma$ is the same as the sign of the difference in yaw rate $\Delta\gamma$, the front-outside wheel is selected as the wheel to be braked. The results from the braked-wheel discriminating section 17 are outputted to the braking signal output section 18.

The braking signal output section 18 is a circuit serving as braking signal output means for outputting a signal to the brake driving section 1 so as to add the front-wheel target fluid pressure BF2$f$ or the rear-wheel target fluid pressure BF2$r$ calculated by the target braking-force calculating section 16 to the braked wheel selected by the braked-wheel discriminating section 17. The braking signal output section 18 also discriminates as to whether the braking is actually carried out by discriminating the values of the actual yaw rate $\gamma$ and the difference in yaw rate $\Delta\gamma$, so that it is possible to prevent the brake from being frequently operated.

Referring to the flow chart of FIG. 4, the first preferred embodiment of a braking force control according to the present invention will be described below.

This braking force control program is executed, for example, every predetermined time (for example, 10 ms) while the vehicle is running. After the program is started, at step 101, a steering angle $\theta$ is read by means of the steering angle sensor 7, wheel speeds $\omega 1$, $\omega 2$, $\omega 3$ and $\omega 4$ are read by means of the respective wheel-speed sensors 6$fl$, 6$fr$, 6$rl$ and 6$rr$, and an actual yaw rate $\gamma$ is read by means of the yaw rate sensor 8. Then, the routine goes to step 102.

At step 102, the steering angle calculating section 12 calculates an actual steering angle $\delta f$ (=$\theta/N$) on the basis of the steering angle $\theta$, the vehicle-speed detecting section 11 calculates a vehicle speed V on the basis of the respective wheel speeds $\omega 1$, $\omega 2$, $\omega 3$ and $\omega 4$, and the yaw-rate steady gain calculating section 13 calculates a yaw-rate steady gain $G\gamma\delta f(0)$ in accordance with the aforementioned formula (1).

Then, the routine goes to step 103 wherein the target yaw-rate calculating section 14 calculates a target yaw rate $\gamma'$ in accordance with the aforementioned formula (3). Then, the routine goes to step 104 wherein the yaw-rate difference calculating section 15 calculates a difference in yaw rate $\Delta\gamma$ ($=\gamma-\gamma'$). Then, the routine goes to step 105 wherein the target braking-force calculating section 16 calculates a front-wheel target fluid pressure BF2$f$ and a rear-wheel target fluid pressure BF2$r$ in accordance with the aforementioned formulae (5) and (6), and the routine goes to step 106.

Steps 106 through 116 correspond to the processing performed by the braked-wheel discriminating section 17. First, at step 106, it is discriminated as to whether the actual yaw rate is larger than 0 (positive sign), i.e., whether the vehicle is turning to the left. When the actual yaw rate is not larger than 0 and the vehicle is not turning to the left, the routine goes to step 107 wherein it is discriminated as to whether the actual yaw rate $\gamma$ is smaller than 0 (negative sign), i.e., whether the vehicle is turning to the right. When the actual yaw rate $\gamma$ which is discriminated indicates that the vehicle is not turning to the right i.e., when $\gamma$ is 0 ($\gamma=0$), the vehicle is going straight ahead, and the routine goes to step 116.

When it is discriminated at step 116 that the actual yaw rate $\gamma$ is positive and the vehicle is turning to the left, the routine goes to step 108 wherein it is discriminated as to whether the difference in yaw rate $\Delta\gamma$ is 0 ($\Delta\gamma=0$). When $\Delta\gamma=0$, the routine goes to step 116, and when $\Delta\gamma\neq 0$, the routine goes to step 109.

At step 109, the sign of the difference in yaw rate $\Delta\gamma$ is discriminated. When the sign of the difference in yaw rate $\Delta\gamma$ is negative, which is different from the sign of the actual yaw rate $\gamma$, the vehicle behavior is in the under-steering tendency with respect to the target yaw rate $\gamma'$, so that the routine goes to step 110 wherein the rear-left wheel 4$rl$ is selected as the wheel which is to be braked by the rear-wheel target fluid pressure BF2$r$ derived at the aforementioned step 105 (the rear-left wheel fluid pressure BRL=BF2$r$).

On the other hand, when it is discriminated at step 109 that the sign of the difference in yaw rate $\Delta\gamma$ is positive, which is the same as the sign of the actual yaw rate $\gamma$, the vehicle behavior is in the over-steering tendency with respect to the target yaw rate $\gamma'$, so that the routine goes to step 111 wherein the front-right wheel 4$fr$ is selected as the wheel which is to be braked by the front-wheel target fluid pressure BF2$f$ derived at the aforementioned step 105 (the front-right wheel fluid pressure BRF=BF2$f$).

In addition, when it is discriminated at the aforementioned step 107 that the actual yaw rate $\gamma$ is negative and the vehicle is turning to the right, the routine goes to step 112 wherein it is discriminated as to whether the difference in the yaw rate $\Delta\gamma$ is 0 ($\Delta\gamma=0$). When $\Delta\gamma=0$, the routine goes to step 116, and when $\Delta\gamma\neq 0$, the routine goes to step 113.

At step 113, the sign of the difference in yaw rate $\Delta\gamma$ is discriminated. When the sign of the difference in yaw rate $\Delta\gamma$ is positive, which is different from the sign of the actual yaw rate $\gamma$, the vehicle behavior is in the under-steering tendency with respect to the target yaw rate $\gamma'$, so that the routine goes to step 114 wherein the rear-right wheel 4$rr$ is selected as the wheel which is to be braked by the rear-wheel target fluid pressure BF2$r$ derived at the aforementioned step 105 (the rear-right wheel fluid pressure BRR=BF2$r$).

On the other hand, when it is discriminated at the aforementioned step 113 that the sign of the difference in yaw rate $\Delta\gamma$ is negative, which is the same as the sign of the actual yaw rate $\gamma$, the vehicle behavior is in the over-steering tendency with respect to the target yaw rate $\gamma'$, so that the routine goes to step 115 wherein the front-left wheel 4$fl$ is selected as the wheel which is to be braked by the front-wheel target fluid pressure BF2$f$ derived at the aforementioned step 105 (the front-left wheel fluid pressure BRL=BF2$f$).

Furthermore, when the routine goes to step 116 from step 107, 108 or 112, the selection of the wheel to be braked is not performed and no wheel is braked.

After the processing at the steps 110, 111, 114, 115 and 116 are performed, the routine goes to step 117 wherein the braking signal output section 18 outputs a signal to the brake driving section 1. That is, when a signal is outputted by the aforementioned step 110, the brake driving section 1 causes the wheel cylinder 5$rl$ to produce braking force corresponding to the fluid pressure BRL=BF2$r$, and when a signal is outputted by the aforementioned step 111, the brake driving section 1 causes the wheel cylinder 5$fr$ to produce braking force corresponding to the fluid pressure BFR=BF2$f$. In addition, when a signal is outputted by the aforementioned step 114, the brake driving section 1 causes the wheel cylinder 5$rr$ to produce braking force corresponding to the fluid pressure BRR=BF2$r$, and when a signal is outputted by the aforementioned step 115, the brake driving section 1 causes the wheel cylinder 5$fl$ to produce braking force corresponding to the fluid pressure BFL=BF2$f$.

Figure 5:
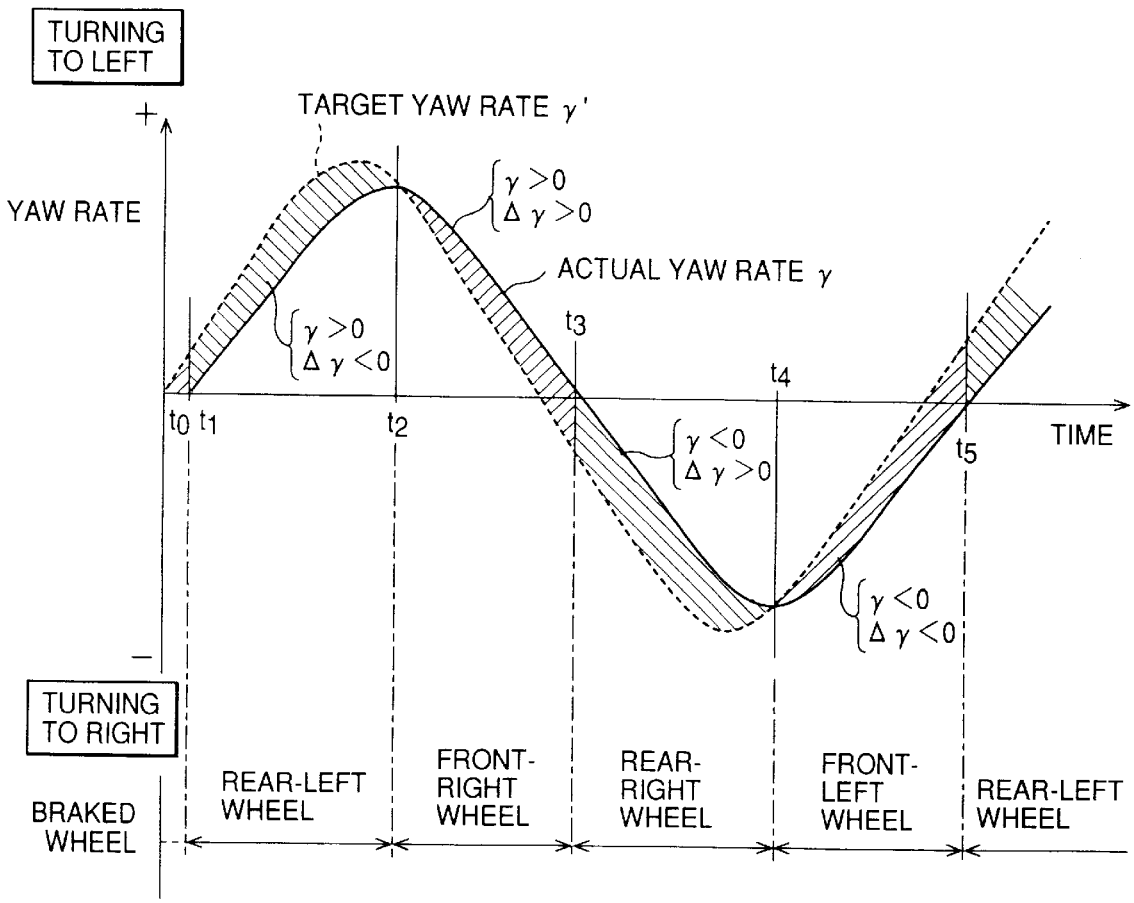
FIG. 5 is a view explaining an example of transitions in an actual yaw rate and a target yaw rate, and braked wheels in the first preferred embodiment.

FIG. 5 shows an example of the aforementioned control. This figure illustrates an example of transitions in the target yaw rate $\gamma'$ and the actual yaw rate $\gamma$ in accordance with the movement of a vehicle turning to the right after turning to the left. The value of the actual yaw rate $\gamma$ at time t0 is delayed to appear at time t1.

By this time lag, $\gamma<\gamma'$ until $\gamma=\gamma'$ at time t2, so that the difference in yaw rate $\Delta\gamma$ ($=\gamma-\gamma'$) <0. This case corresponds to a case 1 in FIG. 6 wherein the vehicle is turning to the left. In this case 1, braking force is applied to the rear-left wheel 4$rl$ to add moment as shown in the arrow to the vehicle, so as to prevent the drift-out of the vehicle. In this condition, even if excessive braking force is applied to the rear-left wheel 4$rl$ which tends to be locked so as to lessen the resistance to side slip, the vehicle turns toward the over-steering, so that it is possible to produce a yaw rate in the same direction as the original control rule (in the direction of the arrow).

Thereafter, $\gamma>\gamma'$ until $\gamma=0$ at time t3, so that the difference in yaw rate $\Delta\gamma$ ($=\gamma-\gamma'$) >0. This case corresponds to a case 2 in FIG. 6 wherein the vehicle is turning to the left. In this case 2, braking force is applied to the front-right wheel 4$fr$ to add moment as shown in the arrow to the vehicle, so as to prevent the vehicle from spinning. In this condition, even if excessive braking force is applied to the front-right wheel 4$fr$ which tends to be locked so as to lessen the resistance to side slip, the vehicle turns toward the under-steering, so that it is possible to produce a yaw rate in the same direction as the original control rule (in the direction of the arrow).

Then, $\gamma>\gamma'$ until $\gamma=\gamma'$ at time t4, so that the difference in yaw rate $\Delta\gamma$ ($=\gamma-\gamma'$) >0. This case corresponds to a case 4 in FIG. 6 wherein the vehicle is turning to the right. In this case 4, braking force is applied to the rear-right wheel 4$rr$ to add moment as shown in the arrow to the vehicle, so as to prevent the drift-out of the vehicle. In this condition, even if excessive braking force is applied to the rear-right wheel 4$rr$ which tends to be locked so as to lessen the resistance to side slip, the vehicle turns toward the over-steering, so that it is possible to produce a yaw rate in the same direction as the original control rule (in the direction of the arrow).

Thereafter, $\gamma<\gamma'$ until $\gamma=0$ at time t5, so that the difference in yaw rate $\Delta\gamma$ ($=\gamma-\gamma'$) <0. This case corresponds to a case 3 in FIG. 6 wherein the vehicle is turning to the right. In this case 3, braking force is applied to the front-left wheel 4$fl$ to add moment as shown in the arrow to the vehicle, so as to prevent the vehicle from spinning. In this condition, even if excessive braking force is applied to the front-left wheel 4$fl$ which tends to be locked so as to lessen the resistance to side slip, the vehicle turns toward the under-steering, so that it is possible to produce a yaw rate in the same direction as the original control rule (in the direction of the arrow).

As mentioned above, according to the first preferred embodiment of the present invention, it is possible to surely prevent the drift-out and spin of a vehicle by discriminating the turning direction of the vehicle on the basis of an actual yaw rate to surely discriminate as to whether the running condition of the vehicle is in the under-steering or over-steering tendency with respect to a target yaw rate on the basis of the actual yaw rate and a difference in yaw rate to select the most suitable wheel to be braked from four wheels. That is, it is possible to prevent a vehicle from being easy to spin by applying braking force to a rear wheel in spite of the tendency toward spin, and to prevent a vehicle from being easy to drift out by applying braking force to a front wheel in spite of the tendency toward drift-out. In addition, it is possible to prevent a braking force from being applied to the wheel in the direction which is easy to spin during counter-steering.

Figure 7:
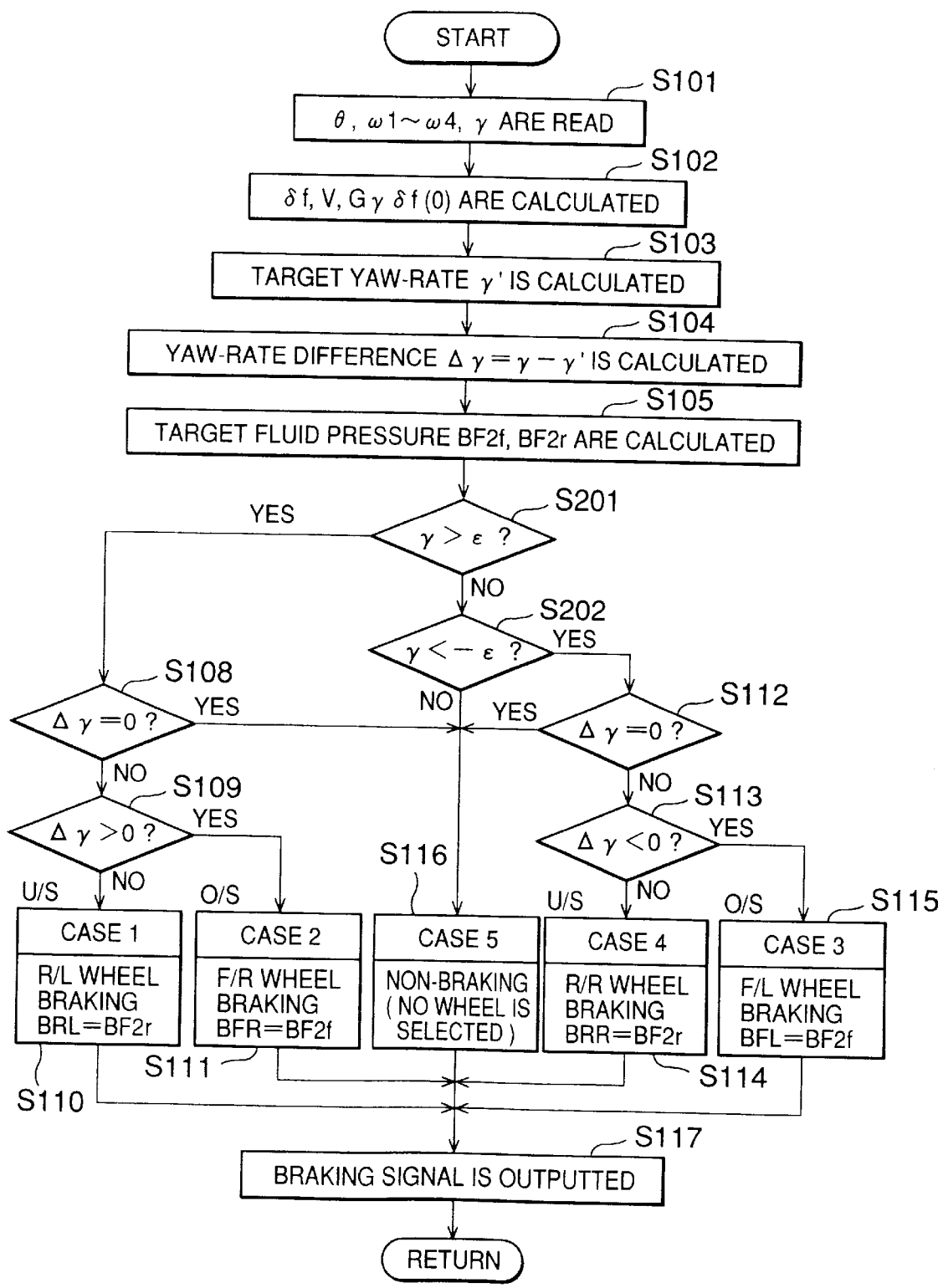
FIG. 7 is a flow chart of the second preferred embodiment of a braking force control according to the present invention.
Figure 8:
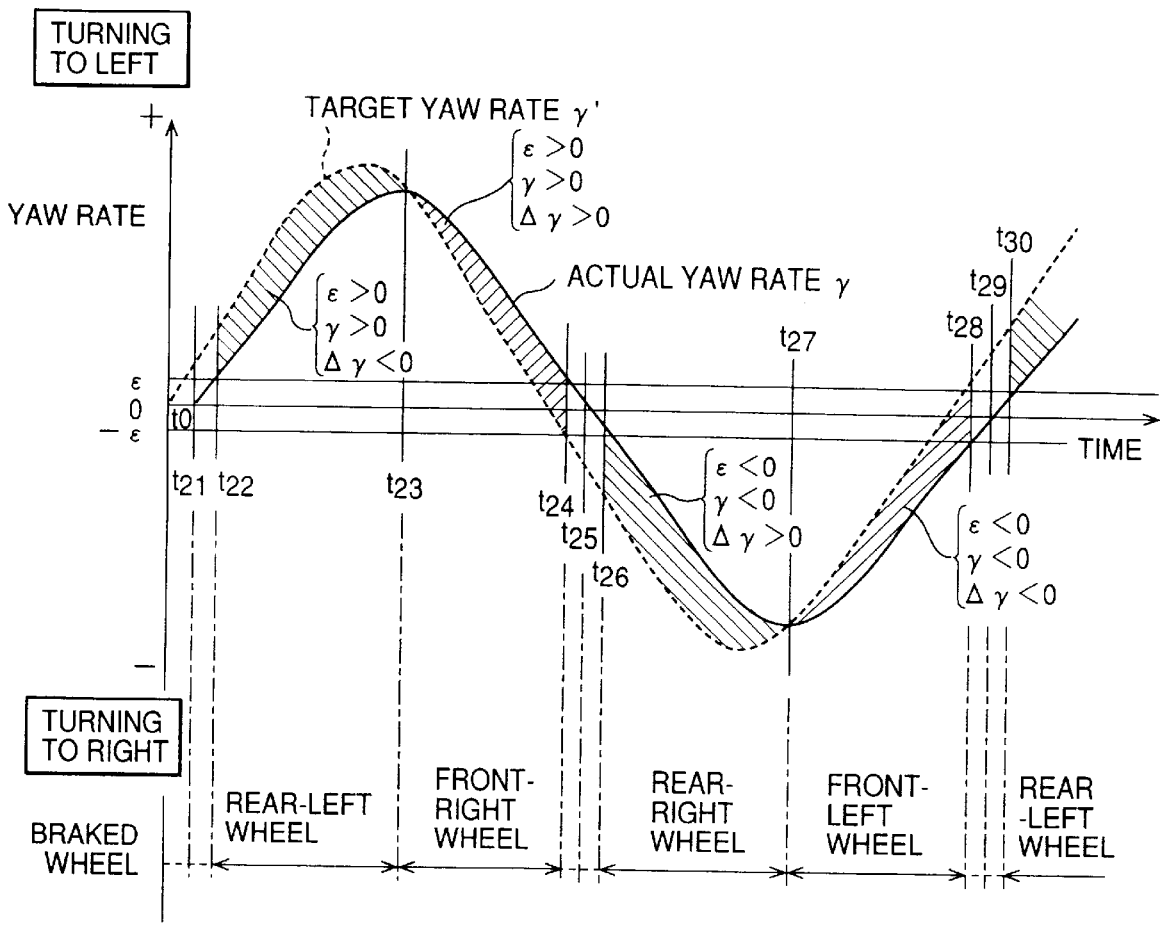
FIG. 8 is a view explaining an example of transitions in an actual yaw rate and a target yaw rate, and braked wheels in the second preferred embodiment.

FIGS. 7 and 8 show the second preferred embodiment of the present invention. FIG. 7 is a flow chart of the second preferred embodiment of a braking force control according to the present invention. FIG. 8 is an explanatory drawing of an example of transitions in an actual yaw rate and a target yaw rate, and a wheel to be braked in this preferred embodiment. Furthermore, in this second preferred embodiment, the scope of the values of the actual yaw rate wherein the wheel to be braked is not selected from wheels of a vehicle and no wheel is braked, is preset within the scope that the vehicle moves substantially straight.

Accordingly, the following combinations of the actual yaw rate $\gamma$ and the difference in yaw rate $\Delta\gamma$ are set in the braked-wheel discriminating section 17. It is assumed that a positive number obtained by experiment, calculation or the like is used as a set value $\epsilon$.

(Case 1): when $\gamma>\epsilon$ and $\Delta\gamma<0$, i.e., when the vehicle is turning to the left and the vehicle behavior is in the under-steering tendency with respect to the target yaw rate $\gamma'$, the rear-left wheel is braked.

(Case 2): when $\gamma>\epsilon$ and $\Delta\gamma>0$, i.e., when the vehicle is turning to the left and the vehicle behavior is in the over-steering tendency with respect to the target yaw rate $\gamma'$, the front-right wheel is braked.

(Case 3): when $\gamma<-\epsilon$ and $\Delta\gamma<0$, i.e., when the vehicle is turning to the right and the vehicle behavior is in the over-steering tendency with respect to the target yaw rate $\gamma'$, the front-left wheel is braked.

(Case 4): when $\gamma<-\epsilon$ and $\Delta\gamma>0$, i.e., when the vehicle is turning to the right and the vehicle behavior is in the under-steering tendency with respect to the target yaw rate $\gamma'$, the rear-right wheel is braked.

(Case 5): when $\epsilon\geq\gamma\geq-\epsilon$ or $\Delta\gamma=0$, the selection of the wheel to be braked is not performed and no wheel is braked.

That is, in the case of the vehicle running condition expressed by $\epsilon\geq\gamma\geq-\epsilon$ in the case 5 (substantially straight running condition), the selection of the wheel to be braked is not performed and no wheel is braked. In the scope of the actual yaw rate $\gamma$ other than this, when the sign of the actual yaw rate $\gamma$ is different from the sign of the difference in yaw rate $\Delta\gamma$, the rear-inside wheel is selected as the wheel to be braked, and when the sign of the actual yaw rate $\gamma$ is the same as the sign of the difference in yaw rate $\Delta\gamma$, the front-outside wheel is selected as the wheel to be braked.

Figure 4:
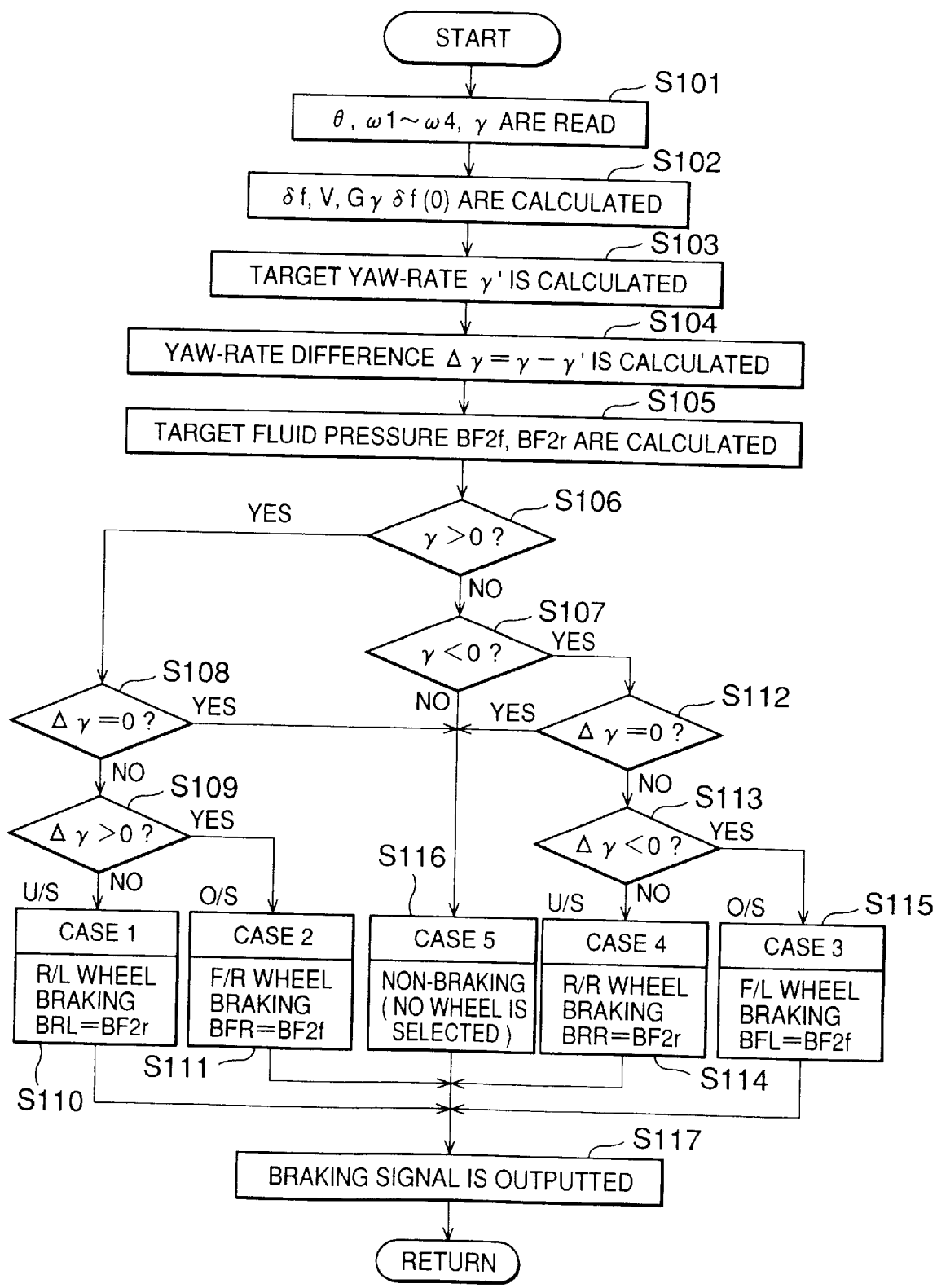
FIG. 4 is a flow chart of the first preferred embodiment of a braking force control according to the present invention.

For that reason, the flow chart in the aforementioned first preferred embodiment as shown in FIG. 4 is changed to the flow chart as shown in FIG. 7. That is, step 106 is changed to step 201, and step 107 is changed to step 202. After a front-wheel target fluid pressure BF2$f$ and a rear-wheel target fluid pressure BF2$r$ are calculated at step 105, the routine goes to step 201 wherein it is discriminated as to whether the actual yaw rate $\gamma$ is larger than $\epsilon$, i.e., whether the vehicle is turning to the left to a larger extent than a certain extent. When the actual yaw rate $\gamma$ is not larger than $\epsilon$, the routine goes to step 202 wherein it is discriminated as to whether the actual yaw rate $\gamma$ is smaller than $-\epsilon$, i.e., whether the vehicle is turning to the right to a larger extent than a certain extent. In the scope of actual yaw rate $\gamma$ ($\epsilon\geq\gamma\geq-\epsilon$) which is discriminated at the aforementioned step 202 that the vehicle is not turning to the right to a larger extent than a certain extent, the vehicle is going substantially straight ahead, so that the routine goes to step 116 wherein the selection of the wheel to be braked is not performed and no wheel is braked. Furthermore, when it is discriminated at the aforementioned step 201 that $\gamma>\epsilon$ and the vehicle is turning to the left to a larger extent than a certain extent, the routine goes to step 108, and the subsequent processing are the same as those of the aforementioned first preferred embodiment. Similarly, when it is discriminated at the aforementioned step 202 that $\gamma<-\epsilon$ and the vehicle is turning to the right to a larger extent than a certain extent, the routine goes to step 112, and the subsequent processing are the same as those of the aforementioned first preferred embodiment.

FIG. 8 shows an example of the aforementioned control. This figure corresponds to FIG. 5 in the first preferred embodiment. The value of the actual yaw rate $\gamma$ at time t0 is delayed to appear at time t21. After the time t21, $\gamma>\epsilon$ at time t22, and $\gamma<\gamma'$ until $\gamma=\gamma'$ at time t23 after the vehicle turns to the left to a certain extent, so that the difference in yaw rate $\Delta\gamma$ ($=\gamma-\gamma'$) <0. This case corresponds to the case 1 in FIG. 6 wherein the vehicle is turning to the left. In this case 1, braking force is applied to the rear-left wheel 4$rl$ to add moment as shown in the arrow to the vehicle, so as to prevent the drift-out of the vehicle. In this condition, even if excessive braking force is applied to the rear-left wheel 4$rl$ which tends to be locked so as to lessen the resistance to side slip, the vehicle turns toward the over-steering, so that it is possible to produce a yaw rate in the same direction as the original control rule (in the direction of the arrow).

Thereafter, $\gamma>\gamma'$ until time t24, so that the difference in yaw rate $\Delta\gamma$ ($=\gamma-\gamma'$) >0. This case corresponds to the case 2 in FIG. 6 wherein the vehicle is turning to the left. In this case 2, braking force is applied to the front-right wheel 4$fr$ to add moment as shown in the arrow to the vehicle, so as to prevent the vehicle from spinning. In this condition, even if excessive braking force is applied to the front-right wheel 4$fr$ which tends to be locked so as to lessen the resistance to side slip, the vehicle turns toward the under-steering, so that it is possible to produce a yaw rate in the same direction as the original control rule (in the direction of the arrow).

Moreover, there is the substantially straight running condition expressed by $\epsilon\geq\gamma\geq-\epsilon$ from time t24 to time t26 through time t25, the selection of the wheel to be braked is not performed and no wheel is braked.

Accordingly, $\gamma>\gamma'$ until $\gamma=\gamma'$ at time t27 after $\gamma<-\epsilon$ at time t26 and the vehicle turns to the right to a certain extent, so that the difference in yaw rate $\Delta\gamma$ ($=\gamma-\gamma'$) >0. This case corresponds to the case 4 in FIG. 6 wherein the vehicle is turning to the right. In this case 4, braking force is applied to the rear-right wheel 4$rr$ to add moment as shown in the arrow to the vehicle, so as to prevent the drift-out of the vehicle. In this condition, even if excessive braking force is applied to the rear-right wheel 4$rr$ which tends to be locked so as to lessen the resistance to side slip, the vehicle turns toward the over-steering, so that it is possible to produce a yaw rate in the same direction as the original control rule (in the direction of the arrow).

Thereafter, γ<γ' until time t28, so that the difference in yaw rate Δγ (=γ−γ') <0. This case corresponds to the case 3 in FIG. 6 wherein the vehicle is turning to the right. In this case 3, braking force is applied to the front-left wheel 4fl to add moment as shown in the arrow to the vehicle, so as to prevent the vehicle from spinning. In this condition, even if excessive braking force is applied to the front-left wheel 4fl which tends to be locked so as to lessen the resistance to side slip, the vehicle turns toward the under-steering, so that it is possible to produce a yaw rate in the same direction as the original control rule (in the direction of the arrow).

Moreover, there is the substantially straight running condition expressed by ε≧γ≧−ε from time t28 to time t30 through time t29, during which the selection of the wheel to be braked is not performed and no wheel is braked.

As mentioned above, according to the second preferred embodiment of the present invention, no wheel is braked when a vehicle is running substantially straight and it is particularly unnecessary to control by the application of braking force. Therefore, it is possible to reduce the abrasion of the brake.

Figure 20:
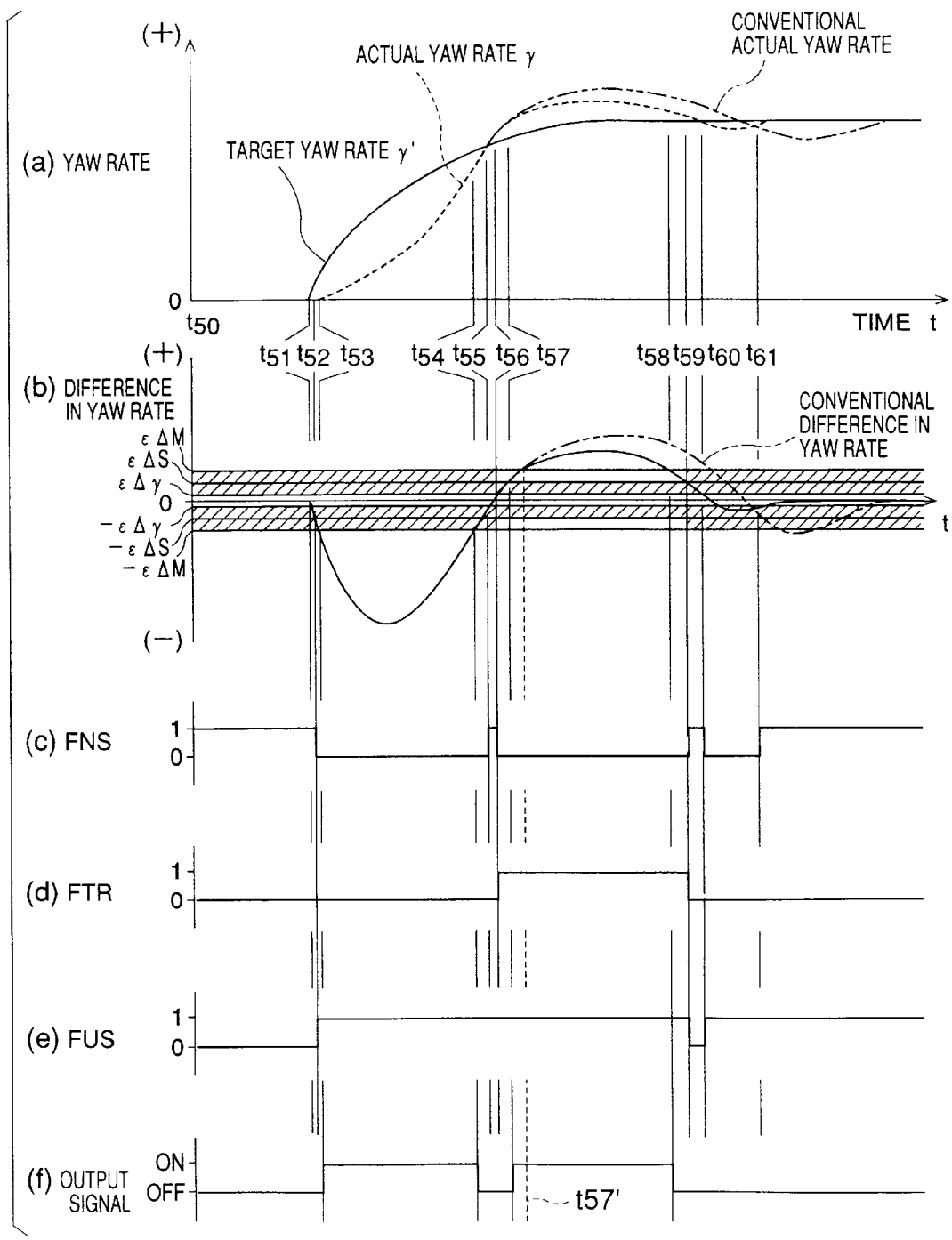
FIG. 20 is a time chart showing an example in the sixth preferred embodiment of a braking force control according to the present invention.
Figure 21:
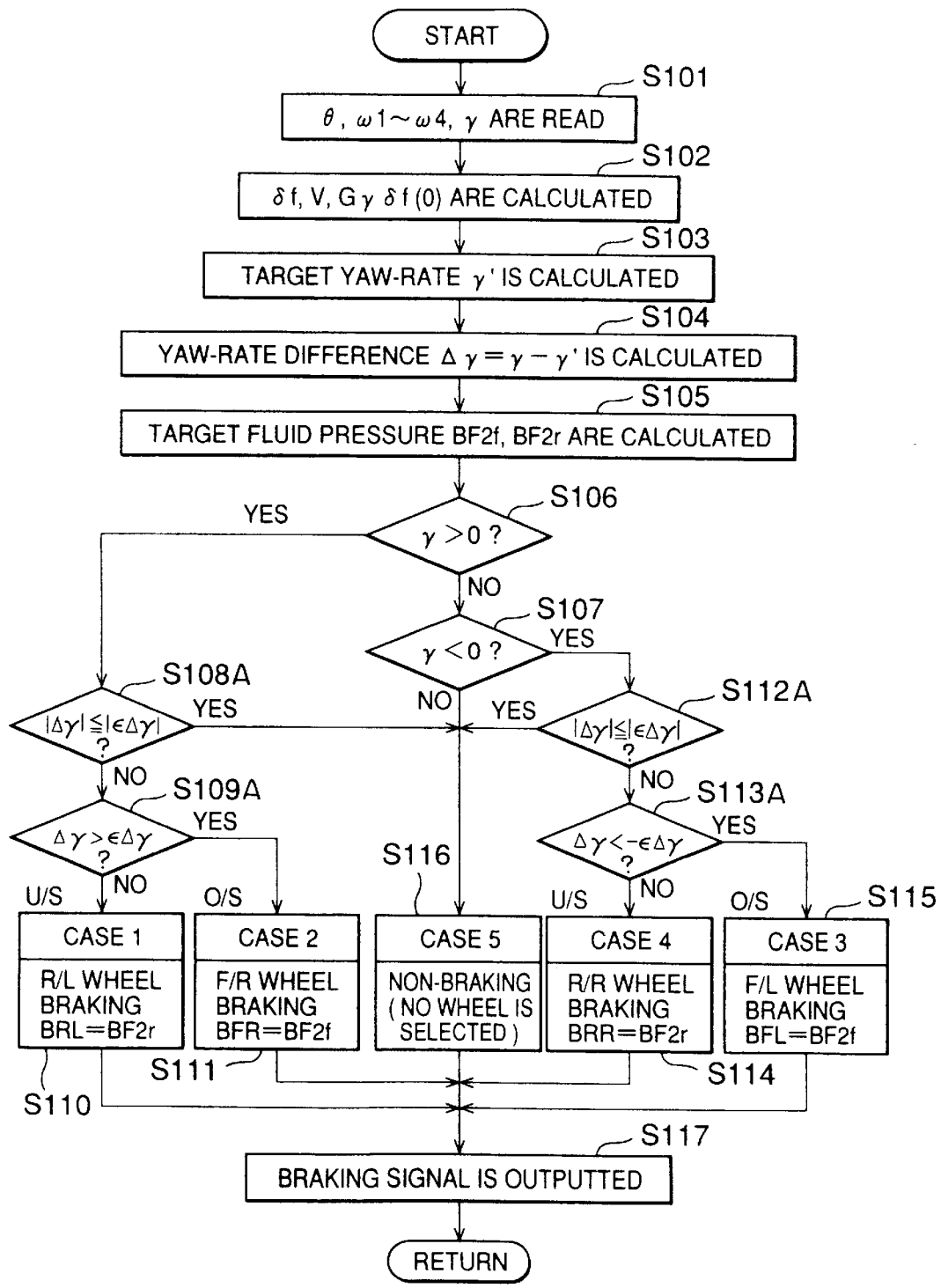
FIG. 21 is a flow chart showing a braking force control in the first embodiment corresponding to the fifth aspect of the present invention.
Figure 22:
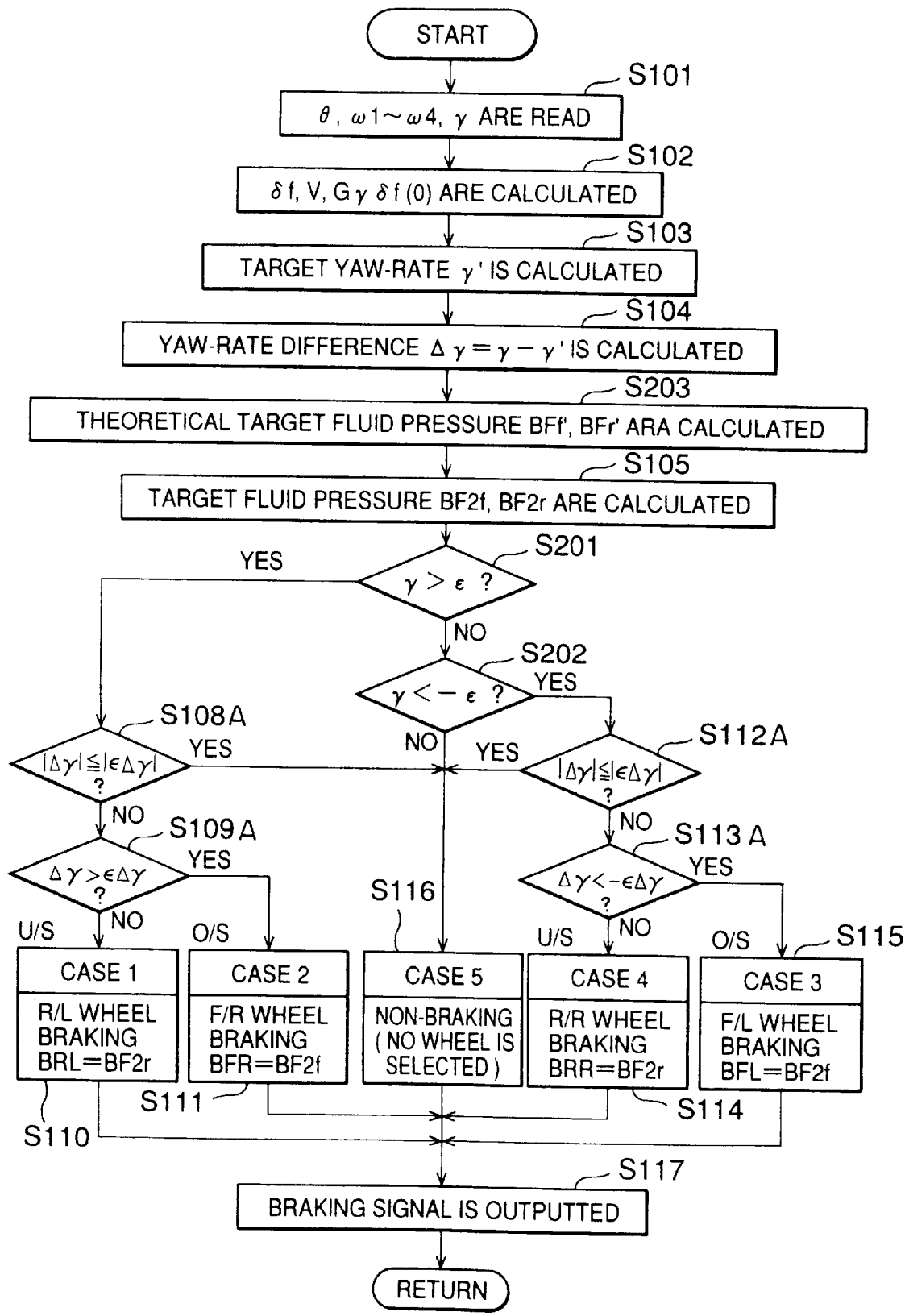
FIG. 22 is a flow chart showing a braking force control corresponding to the fifth aspect in the same manner of FIG. 21.

Even though the system according to the first embodiment does not determine as to whether there is a neutral-steering or not, the present invention may comprise a braking force control system according to a fifth aspect in the manner that operation is performed by steps S108A, S109A, S112A and S113A through steps S106 and S107 of steps S201 and S202 as shown in FIGS. 20 and 21. Since detailed control in these steps is the same as those of FIG. 13 and the corresponding description thereof, it will be described later.

Figure 9:
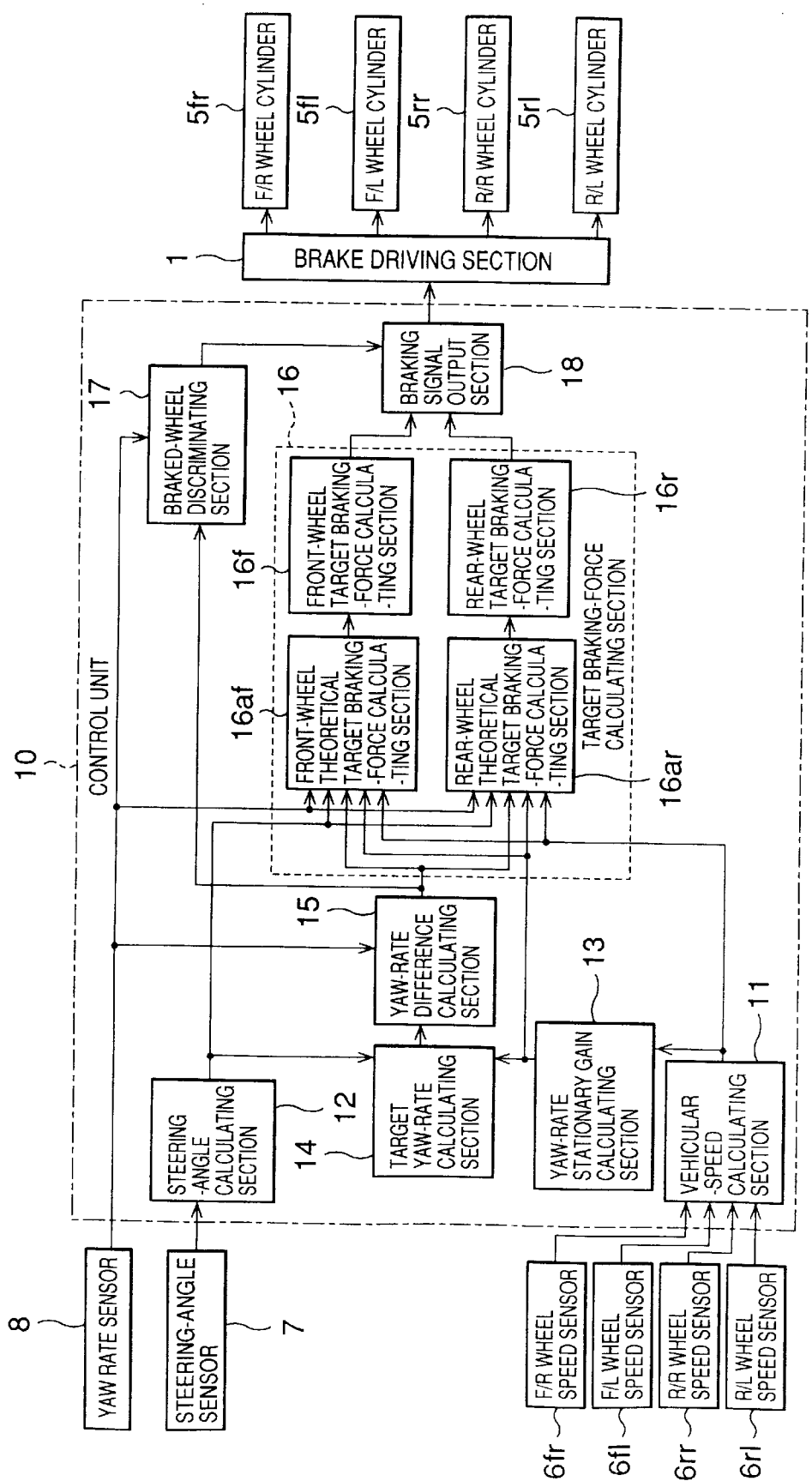
FIG. 9 is a block diagram showing the function of the third preferred embodiment of a braking force control system according to the present invention.
Figure 10:
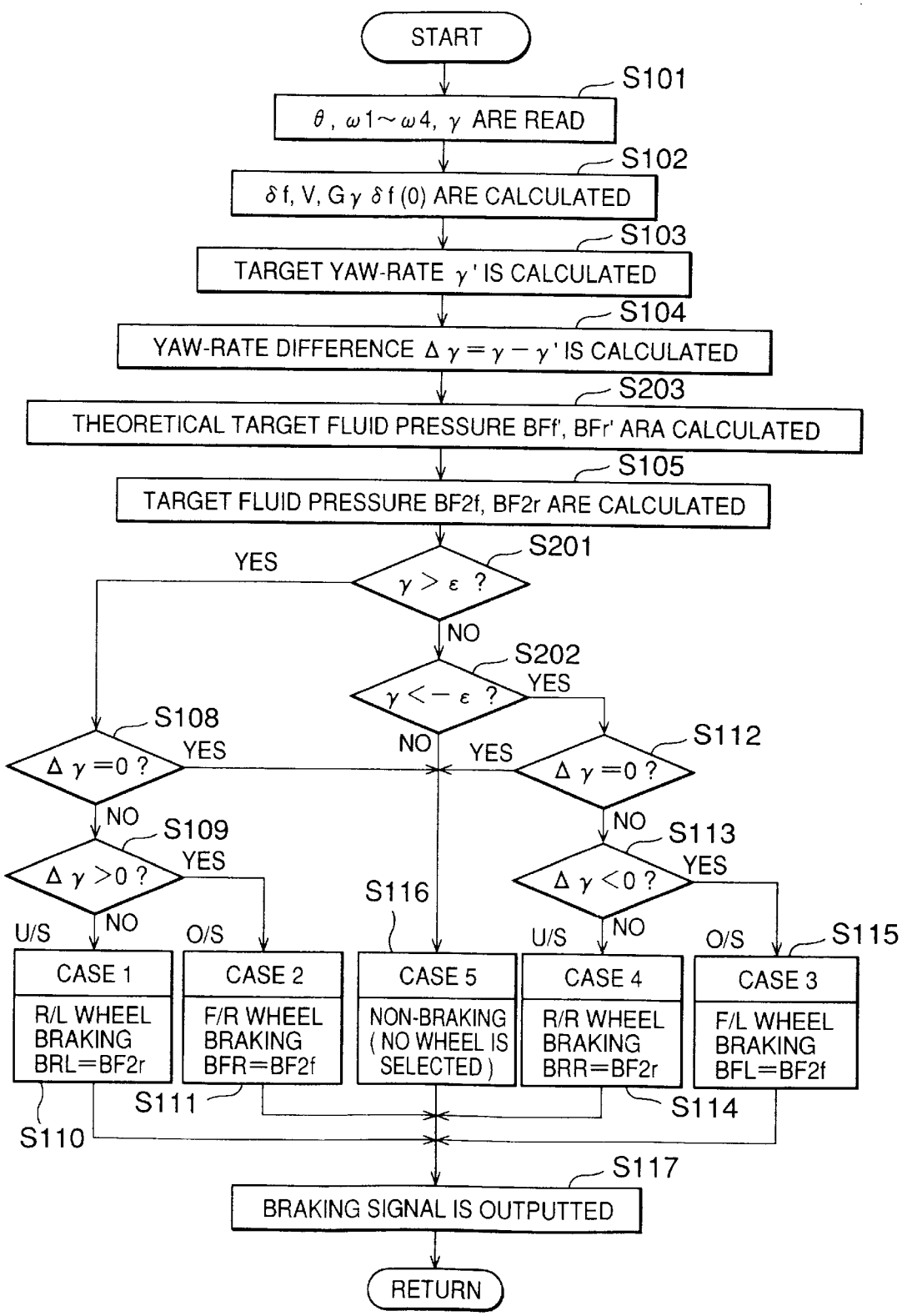
FIG. 10 is a flow chart of the third preferred embodiment of a braking force control according to the present invention.

Referring to FIGS. 9 and 10, the third preferred embodiment of a braking force control system according to the present invention will be described in detail below. The schematic construction of the braking force control system in this third preferred embodiment is also the same as those in the first and second preferred embodiments as shown in FIG. 2, so that the repeated descriptions are omitted.

As shown in FIG. 9, the control unit 10 in the third preferred embodiment has substantially the same construction as that in the first preferred embodiment as shown in FIG. 3. The different point between both preferred embodiments is that the construction of the target braking-force calculating section 16 in the third preferred embodiment as shown in FIG. 9 is illustrated in detail. Only this different point will be described below.

The target braking-force calculating section 16 is a circuit serving as target braking-force calculating means for calculating a target braking force (a front-wheel target fluid pressure BF2f, and a rear-wheel target fluid pressure BF2r) to output the calculated target braking force to the braking signal output section 18. The target braking-force calculating section 16 comprises a front-wheel theoretical target braking-force calculating section 16af, a rear-wheel theoretical target braking-force calculating section 16ar, a front-wheel target braking-force calculating section 16f, and a rear-wheel target braking-force calculating section 16r.

The front-wheel theoretical target braking-force calculating section 16af receives an actual rate γ, a difference in yaw rate Δγ, an actual steering angle δf, a vehicle speed V and a yaw-rate steady gain Gγδf(0), and calculates a front-wheel theoretical target braking force (a front-wheel theoretical target fluid pressure) BFf' in view of the vehicle items in accordance with the following formula:

$$BFf' = (\Delta A \cdot 4 \cdot L2 \cdot CPf \cdot Cpr \cdot V)/\{(CPf+CPr)/df\} \cdot \gamma \quad (8)$$

wherein df is a front tread, and the other values are obtained as with the first preferred embodiment, while ΔA is expressed by the following formula.

$$\Delta A = \{\delta f/(G\gamma\delta f(0) \cdot \delta f + \Delta\gamma) - 1/G\gamma\delta f(0)\}/L \cdot V \quad (7)$$

Furthermore, Δγ in the aforementioned formula (7) may be corrected in view of a side slip angle β which is an angle between the running direction of the vehicle and the forward and rearward directions, and the amended Δγ may be used in the formula (7).

The rear-wheel theoretical target braking-force calculating section 16ar also receives the actual rate γ, the difference in yaw rate Δγ, the actual steering angle δf, the vehicle speed V and the yaw-rate steady gain Gγδf(0), and calculates a rear-wheel theoretical target braking force (a rear-wheel theoretical target fluid pressure) BFr' in view of the vehicle items in accordance with the following formula:

$$BFr' = (\Delta A \cdot 4 \cdot L2 \cdot CPf \cdot Cpr \cdot V)/\{(CPf + CPr)/dr\} \cdot \gamma \quad (9)$$

wherein dr is a rear tread.

In addition, the front-wheel target braking-force calculating section 16f calculates the front-wheel target fluid pressure BF2f by multiplying the front-wheel theoretical target fluid pressure BFf' calculated by means of the front-wheel theoretical target braking-force calculating section 16af, by a gain G1 (a great gain, for example, 8.0) preset on the basis of the vehicle items.

$$BF2f = G1 \cdot BFf' \quad (10)$$

Moreover, the rear-wheel target braking-force calculating section 16r calculates the rear-wheel target fluid pressure BF2r by multiplying the rear-wheel theoretical target fluid pressure BFr' calculated by means of the rear-wheel theoretical target braking-force calculating section 16ar, by the gain G1 (a great gain, for example, 8.0) and a gain G2 (for example, 0.15) which is larger than 0 and smaller than 1, the gains G1 and G2 being preset on the basis of the vehicle items.

$$BF2r = G1 \cdot G2 \cdot BFr' \quad (11)$$

wherein it is assumed that the value of G1·G2 in the aforementioned formula (11) is a small gain.

That is, the target braking-force calculating section 16 calculates the rear-wheel target braking force with a smaller gain than the gain used for calculating the front-wheel target braking force, to reduce the rear-wheel braking force, so as to prevent the stability of the vehicle from being lost due to the side slip of the rear wheels by the braking force applied to the rear wheel on a low μ road surface and so forth. In addition, the moment of vehicle turning-round when the braking force is applied to the front wheel is substantially the same as that when the braking force is applied to the rear wheel, so that the control is performed by natural vehicle behavior according to the driver's intention.

The braked-wheel discriminating section 17 is a circuit serving as braked-wheel discriminating means for selecting a wheel of the vehicle to be braked on the basis of the combination of the signs of the actual yaw rate γ and the difference in yaw rate Δγ, and the following combinations are preset therein. Furthermore, both of the actual yaw rate γ and the target yaw rate γ' are given assuming that the direction of the vehicle turning to the left is + and the direction of the vehicle turning to the right is minus (−). It is assumed that a positive number obtained by experiment, calculation or the like is used as a set value $\epsilon$.

(Case 1): when $\gamma>\epsilon$ and $\Delta\gamma<0$, i.e., when the vehicle is turning to the left and the vehicle behavior is in the under-steering tendency with respect to the target yaw rate $\gamma'$, the rear-left wheel is braked.

(Case 2): when $\gamma>\epsilon$ and $\Delta\gamma>0$, i.e., when the vehicle is turning to the left and the vehicle behavior is in the over-steering tendency with respect to the target yaw rate $\gamma'$, the front-right wheel is braked.

(Case 3): when $\gamma<-\epsilon$ and $\Delta\gamma<0$, i.e., when the vehicle is turning to the right and the vehicle behavior is in the over-steering tendency with respect to the target yaw rate $\gamma'$, the front-left wheel is braked.

(Case 4): when $\gamma<-\epsilon$ and $\Delta\gamma>0$, i.e., when the vehicle is turning to the right and the vehicle behavior is in the under-steering tendency with respect to the target yaw rate $\gamma'$, the rear-right wheel is braked.

(Case 5): when $\epsilon\geq\gamma\geq-\epsilon$ or $\Delta\gamma=0$, the selection of the wheel to be braked is not performed and no wheel is braked.

That is, in the case of the vehicle running condition expressed by $\epsilon\geq\gamma\geq-\epsilon$ in the case 5 (a substantially straight running condition), the selection of the wheel to be braked is not performed and no wheel is braked. In the scope of the actual yaw rate $\gamma$ other than this, when the sign of the actual yaw rate $\gamma$ is different from the sign of the difference in yaw rate $\Delta\gamma$, the rear-inside wheel is selected as the wheel to be braked, and when the sign of the actual yaw rate $\gamma$ is the same as the sign of the difference in yaw rate $\Delta\gamma$, the front-outside wheel is selected as the wheel to be braked. The results from the braked-wheel discriminating section 17 are outputted to the braking signal output section 18.

The braking signal output section 18 is a circuit serving as braking signal output means for outputting a signal to the brake driving section 1 so as to add the front-wheel target fluid pressure BF2$f$ or the rear-wheel target fluid pressure BF2$r$ calculated by the target braking-force calculating section 16, to the braked wheel selected by the braked-wheel discriminating section 17. The braking signal output section 18 also discriminates as to whether the braking is actually carried out by discriminating the values of the actual yaw rate $\gamma$ and the difference in yaw rate $\Delta\gamma$, so that it is possible to prevent the brake from being frequently operated.

Referring to the flow chart of FIG. 10, the third preferred embodiment of a braking force control according to the present invention will be described below.

This braking force control program is substantially the same as that of FIG. 7 in the second preferred embodiment except that step 203 is provided, and is executed every predetermined time (for example, 10 ms) while the vehicle is running. After the program is started, at step 101, a steering angle $\theta$ is read by means of the steering angle sensor 7, wheel speeds $\omega1$, $\omega2$, $\omega3$ and $\omega4$ are read by means of the respective wheel-speed sensors 6$fl$, 6$fr$, 6$rl$ and 6$rr$, and an actual yaw rate $\gamma$ is read by means of the yaw rate sensor 8. Then, the routine goes to step 102.

At step 102, the steering angle calculating section 12 calculates an actual steerininging angle $\delta f$ ($=\theta/N$) on the basis of the steerininging angle $\theta$, the vehicle-speed detecting section 11 calculates a vehicle speed V on the basis of the respective wheel speeds $\omega1$, $\omega2$, $\omega3$ and $\omega4$, and the yaw-rate steady gain calculating section 13 calculates a yaw-rate steady gain G$\gamma\delta$f(0) in accordance with the aforementioned formula (1).

Then, the routine goes to step 103 wherein the target yaw-rate calculating section 14 calculates a target yaw rate $\gamma'$ in accordance with the aforementioned formula (3). Then, the routine goes to step 104 wherein the yaw-rate difference calculating section 15 calculates a difference in yaw rate $\Delta\gamma$ ($=\gamma-\gamma'$).

Then, the routine goes to step 203 wherein the front-wheel theoretical target braking-force calculating section 16$af$ and the rear-wheel theoretical target braking-force calculating section 16$ar$ of the target braking-force calculating section 16 calculate a front-wheel theoretical target fluid pressure BFf and a rear-wheel theoretical target fluid pressure BFr' in accordance with the aforementioned formulae (8) and (9). Then, the routine goes to step 106 wherein the front-wheel target braking-force calculating section 16$f$ and the rear-wheel target braking-force calculating section 16$r$ of the target braking-force calculating section 16 calculate a front-wheel target fluid pressure BF2$f$ and a rear-wheel target fluid pressure BF2$r$ in accordance with the aforementioned formulae (10) and (11), and the routine goes to step 107.

Steps 201, 202 and 108 through 116 correspond to the processing performed by the braked-wheel discriminating section 17. First, at step 201, it is discriminated as to whether the actual yaw rate is larger than $\epsilon$, i.e., whether the vehicle is turning to the left to a larger extent than a certain extent. When the actual yaw rate $\gamma$ is not larger than $\epsilon$, the routine goes to step 202 wherein it is discriminated as to whether the actual yaw rate $\gamma$ is smaller than $-\epsilon$, i.e., whether the vehicle is turning to the right to a larger extent than a certain extent. In the scope of actual yaw rate $\gamma$ ($\epsilon\geq\gamma\geq-\epsilon$) which is discriminated at the aforementioned step 202 that the vehicle is not turning to the right to a larger extent than a certain extent, the vehicle is going substantially straight ahead, so that the routine goes to step 116 wherein the selection of the wheel to be braked is not performed and no wheel is braked. Furthermore, when it is discriminated at the aforementioned step 202 that $\gamma>\epsilon$ and the vehicle is turning to the left to a larger extent than a certain extent, the routine goes to step 108 wherein it is discriminated as to whether the difference in yaw rate $\Delta\gamma$ is 0 ($\Delta\gamma=0$). When $\Delta\gamma=0$, the routine goes to step 116, and when $\Delta\gamma\neq0$, the routine goes to step 109.

At step 109, the sign of the difference in yaw rate $\Delta\gamma$ is discriminated. When the sign of the difference in yaw rate $\Delta\gamma$ is negative, which is different from the sign of the actual yaw rate $\gamma$, the vehicle behavior is in the under-steering tendency with respect to the target yaw rate $\gamma'$, so that the routine goes to step 101 wherein the rear-left wheel 4$rl$ is selected as the wheel which is to be braked by the rear-wheel target fluid pressure BF2$r$ derived at the aforementioned step 105 (the rear-left wheel fluid pressure BRL=BF2$r$).

On the other hand, when it is discriminated at step 109 that the sign of the difference in yaw rate $\Delta\gamma$ is positive, which is the same as the sign of the actual yaw rate $\gamma$, the vehicle behavior is in the over-steering tendency with respect to the target yaw rate $\gamma'$, so that the routine goes to step 111 wherein the front-right wheel 4$fr$ is selected as the wheel which is to be braked by the front-wheel target fluid pressure BF2$f$ derived at the aforementioned step 105 (the front-right wheel fluid pressure BRF=BF2$f$).

When it is discriminated at the aforementioned step 202 that $\gamma<-\epsilon$ and the vehicle is turning to the right to a larger extent than a certain extent, the routine goes to step 112 wherein it is discriminated as to whether the difference in yaw rate $\Delta\gamma$ is 0 ($\Delta\gamma=0$). When $\Delta\gamma=0$, the routine goes to step 116, and when $\Delta\gamma\neq0$, the routine goes to step 113.

At step 113, the sign of the difference in yaw rate $\Delta\gamma$ is discriminated. When the sign of the difference in yaw rate $\Delta\gamma$ is positive, which is different from the sign of the actual yaw rate $\gamma$, the vehicle behavior is in the under-steering tendency with respect to the target yaw rate $\gamma'$, so that the routine goes to step 114 wherein the rear-right wheel 4rr is selected as the wheel which is to be braked by the rear-wheel target fluid pressure BF2r derived at the aforementioned step 105 (the rear-right wheel fluid pressure BRR=BF2r).

On the other hand, when it is discriminated at the aforementioned step 113 that the sign of the difference in yaw rate $\Delta\gamma$ is negative, which is the same as the sign of the actual yaw rate $\gamma$, the vehicle behavior is in the over-steering tendency with respect to the target yaw rate $\gamma'$, so that the routine goes to step 115 wherein the front-left wheel 4fl is selected as the wheel which is to be braked by the front-wheel target fluid pressure BF2f derived at the aforementioned step 105 (the front-left wheel fluid pressure BRL=BF2f).

Furthermore, when the routine goes to step 116 from the aforementioned step 201, 108 or 112, the selection of the wheel to be braked is not performed and no wheel is braked.

After the processing at the steps 110, 111, 114, 115 and 116 are performed, the routine goes to step 117 wherein the braking signal output section 18 outputs a signal to the brake driving section 1. That is, when a signal is outputted by the aforementioned step 110, the brake driving section 1 causes the wheel cylinder 5rl to produce braking force corresponding to the fluid pressure BRL=BF2r, and when a signal is outputted by the aforementioned step 111, the brake driving section 1 causes the wheel cylinder 5fr to produce braking force corresponding to the fluid pressure BFR=BF2f. In addition, when a signal is outputted by the aforementioned step 114, the brake driving section 1 causes the wheel cylinder 5rr to produce braking force corresponding to the fluid pressure BRR=BF2r, and when a signal is outputted by the aforementioned step 115, the brake driving section 1 causes the wheel cylinder 5fl to produce braking force corresponding to the fluid pressure BFL=BF2f.

Referring to FIG. 8 in the second preferred embodiment, an example of the aforementioned control will be described. FIG. 8 illustrates an example of transitions in the target yaw rate $\gamma'$ and the actual yaw rate $\gamma$ in accordance with the movement of a vehicle turning to the right after turning to the left. The value of the actual yaw rate $\gamma$ at time t0 is delayed to appear at time t21.

Figure 12:
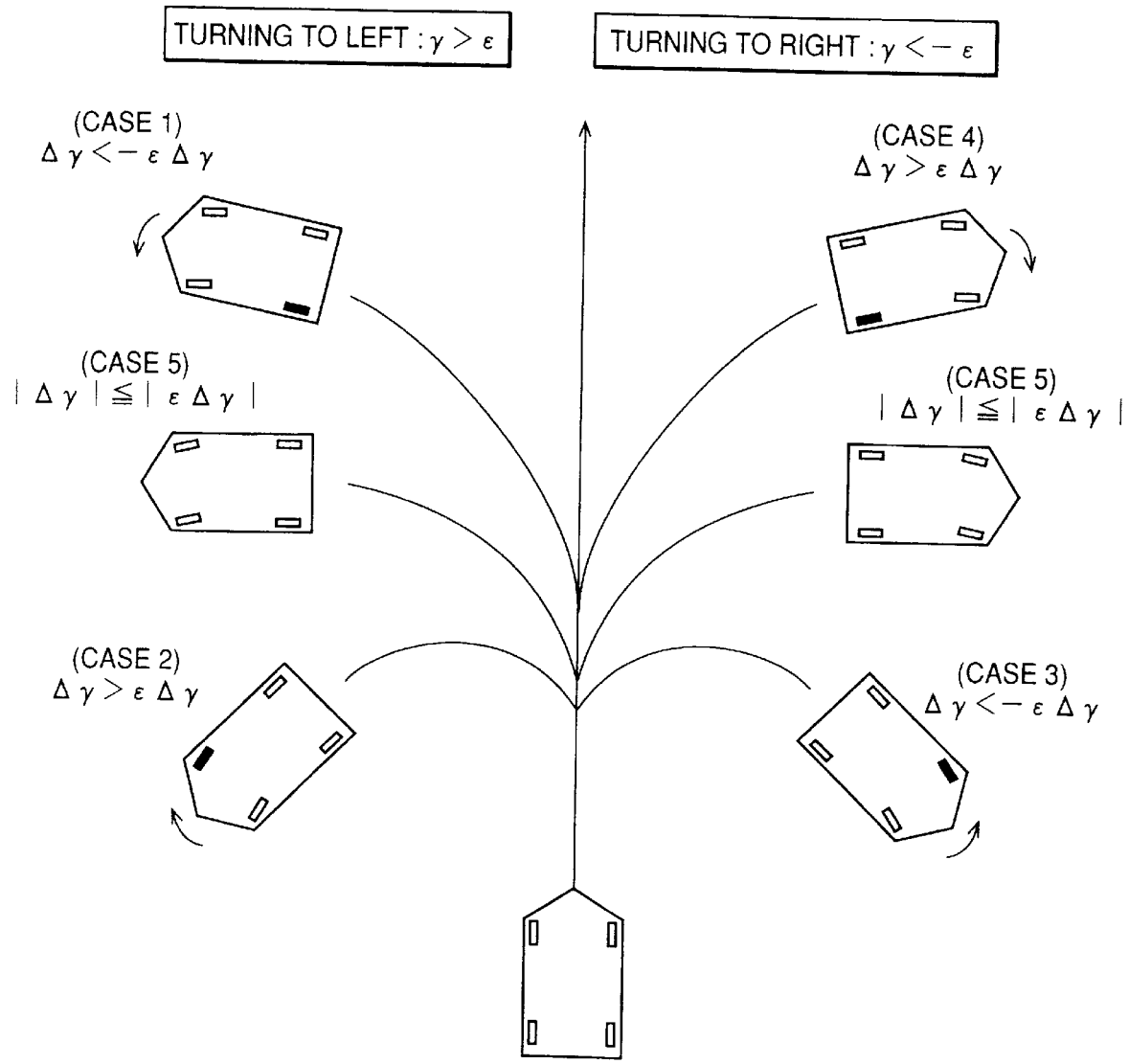
FIG. 12 is an explanatory drawing of the movements of an automotive vehicle according to the fourth preferred embodiment of a braking force control of the present invention.

In addition, the drawings illustrating the turning to the right and the turning to the left will be described using the undermentioned FIG. 12.

After the time t21, $\gamma > \epsilon$ at time t22, and $\gamma < \gamma'$ until $\gamma = \gamma'$ at time t23 after the vehicle turns to the left to a certain extent, so that the difference in yaw rate $\Delta\gamma(=\gamma-\gamma') <0$. This case corresponds to a case 1 in FIG. 12 wherein the vehicle is turning to the left. In this case 1, braking force is applied to the rear-left wheel 4rl to add moment as shown in the arrow to the vehicle, so as to prevent the drift-out of the vehicle. In this condition, even if excessive braking force is applied to the rear-left wheel 4rl which tends to be locked so as to lessen the resistance to side slip, the vehicle turns toward the over-steering, so that it is possible to produce a yaw rate in the same direction as the original control rule (in the direction of the arrow).

Thereafter, $\gamma > \gamma'$ until time t24, so that the difference in yaw rate $\Delta\gamma (=\gamma-\gamma') >0$. This case corresponds to a case 2 in FIG. 12 wherein the vehicle is turning to the left. In this case 2, braking force is applied to the front-right wheel 4fr to add moment as shown in the arrow to the vehicle, so as to prevent the vehicle from spinning. In this condition, even if excessive braking force is applied to the front-right wheel 4fr which tends to be locked so as to lessen the resistance to side slip, the vehicle turns toward the under-steering, so that it is possible to produce a yaw rate in the same direction as the original control rule (in the direction of the arrow).

Moreover, there is the substantially straight running condition expressed by $\epsilon \geq \gamma \geq -\epsilon$ from time t24 to time t26 through time t25, the selection of the wheel to be braked is not performed and no wheel is braked.

Then, $\gamma > \gamma'$ until $\gamma = \gamma'$ at time t27 after $\gamma < -\epsilon$ at time t26 and the vehicle turns to the right to a certain extent, so that the difference in yaw rate $\Delta\gamma (=\gamma-\gamma') >0$. This case corresponds to a case 4 in FIG. 12 wherein the vehicle is turning to the right. In this case 4, braking force is applied to the rear-right wheel 4rr to add moment as shown in the arrow to the vehicle, so as to prevent the drift-out of the vehicle. In this condition, even if excessive braking force is applied to the rear-right wheel 4rr which tends to be locked so as to loss the resistance to side slip, the vehicle turns toward the over-steering, so that it is possible to produce a yaw rate in the same direction as the original control rule (in the direction of the arrow).

Thereafter, $\gamma < \gamma'$ until time t28, so that the difference in yaw rate $\Delta\gamma (=\gamma-\gamma') <0$. This case corresponds to a case 3 in FIG. 12 wherein the vehicle is turning to the right. In this case 3, braking force is applied to the front-left wheel 4fl to add moment as shown in the arrow to the vehicle, so as to prevent the vehicle from spinning. In this condition, even if excessive braking force is applied to the front-left wheel 4fl which tends to be locked so as to loss the resistance to side slip, the vehicle turns toward the under-steering, so that it is possible to produce a yaw rate in the same direction as the original control rule (in the direction of the arrow).

Moreover, there is the substantially straight running condition expressed by $\epsilon \geq \gamma \geq -\epsilon$ from time t28 to time t30 through time t29, so the selection of the wheel to be braked is not performed and no wheel is braked.

As mentioned above, according to the third preferred embodiment of the present invention, it is possible to surely prevent the drift-out and spin of a vehicle by discriminating the turning direction of the vehicle on the basis of an actual yaw rate to surely discriminate as to whether the running condition of the vehicle is in the under-steering or over-steering tendency with respect to a target yaw rate on the basis of the actual yaw rate and a difference in yaw rate to select the most suitable wheel to be braked from four wheels. That is, it is possible to prevent a vehicle from being easy to spin by applying braking force to a rear wheel in spite of the tendency toward spin, and to prevent a vehicle from being easy to drift out by applying braking force to a front wheel in spite of the tendency toward drift-out. In addition, it is possible to prevent the braking force from being applied to the wheel in the direction which is easy to spin during counter-steering.

In addition, it is possible to reduce the abrasion of a brake in a non-braking condition in which no wheel is braked, when a vehicle is running substantially straight and it is particularly unnecessary to control by the application of braking force.

Moreover, it is possible to prevent the stability of the vehicle from being lost due to the side slip of the rear wheels even if the vehicle is running on a low $\mu$ road surface, since the braking force applied to the rear wheel selected as the wheel to be braked is so added as to be restrained. In addition, the moment of vehicle turning-round is not too strong, so that the control can be performed by natural vehicle behavior according to the driver's intention.

While a wheel to be braked is discriminated by comparing an actual yaw rate with a positive number $\epsilon$ derived by experiment, calculation and so forth in the second and third preferred embodiments, the wheel to be braked may be selected by discriminating as to whether an absolute value of the difference in yaw rate $\Delta\gamma$ is smaller than a positive value $\lambda$ derived by experiment, calculation and so forth ($|\Delta\gamma|\leq\lambda$), in order to prevent malfunction due to sensor noise and so forth.

The fourth preferred embodiment of a braking force control system according to the present invention will be described below.

Figure 11:
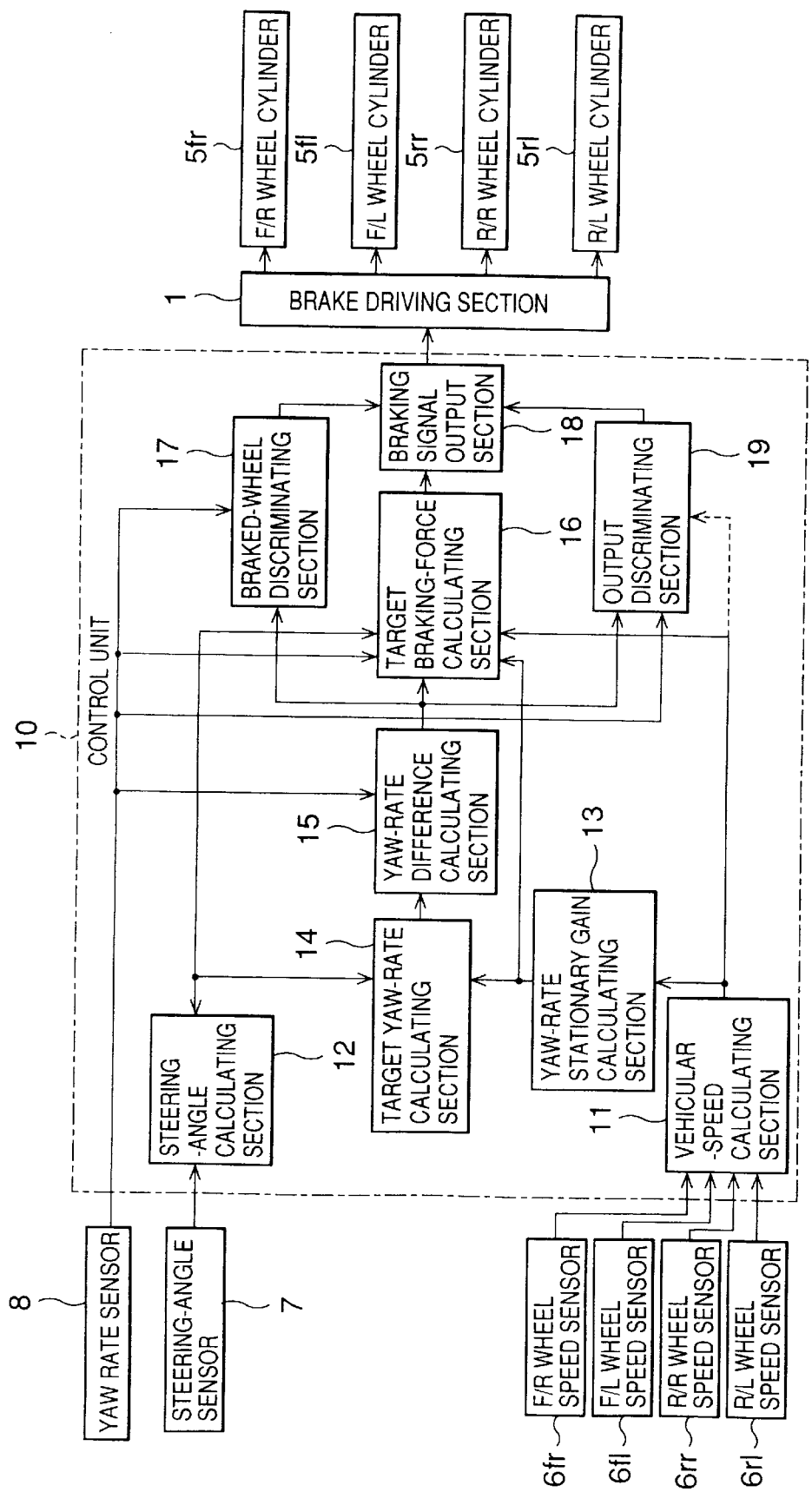
FIG. 11 is a block diagram showing the function of the fourth preferred embodiment of a braking force control system according to the present invention.

FIG. 11 illustrates the main structure of the fourth preferred embodiment of a braking force control system according to the present invention. The braking force control system in the fourth preferred embodiment as shown in FIG. 11 has basically the same construction as that in the first preferred embodiment as shown in FIGS. 2 and 3. The different point between both systems is that the system as shown in FIG. 11 is provided with an output discriminating section 19 for inputting the outputs of the yaw-rate sensor 8 and the yaw-rate difference calculating section 15, and the output of the vehicle-speed calculating section 11 if necessary, to discriminate as to whether the difference in yaw rate is within the control region to output the results to the braking signal output section 18.

Therefore, the construction and operation upstream of the target braking-force calculating section 16 in FIG. 11 are substantially the same as those of the respective constitutional elements of the braking force control system according to the first preferred embodiment, so that the repeated descriptions are omitted. However, the outputs of the yaw-rate sensor 8 and the yaw-rate difference calculating section 15 are also supplied to the output discriminating section 19.

Furthermore, in order to prevent the side slip of the rear wheels of the vehicle due to the braking force applied thereto, from causing the vehicle to be unstable, or in order to prevent the driver from feeling the instability of the vehicle due to strong moment of vehicle turning-round against the driver's intention, the rear-wheel target fluid pressure BF2$r$ may be a smaller value by multiplying the value derived in accordance with the aforementioned formula (6), by a gain which is larger than 0 and smaller than 1.

The braked-wheel discriminating section 17 is a circuit serving as braked-wheel discriminating means for selecting a wheel of the vehicle to be braked on the basis of the combination of the signs of the actual yaw rate $\gamma$ and the difference in yaw rate $\Delta\gamma$, and the following combinations are preset therein. Furthermore, both of the signs of the actual yaw rate $\gamma$ and the target yaw rate $\gamma'$ are given assuming that the direction of the vehicle turning to the left is plus (+) and the direction of the vehicle turning to the right is minus (–). It is assumed that $\epsilon\Delta\gamma$ is a positive number of approximately 0 obtained by experiment, calculation or the like.

(Case 1): when $\gamma>\epsilon$ and $\Delta\gamma<-\epsilon\Delta\gamma$, i.e., when the vehicle is turning to the left and its behavior is in the under-steering tendency with respect to the target yaw rate $\gamma'$, the rear-left wheel is braked.

(Case 2): when $\gamma>\epsilon$ and $\Delta\gamma>\epsilon\Delta\gamma$, i.e., when the vehicle is turning to the left and its behavior is in the over-steering tendency with respect to the target yaw rate $\gamma'$, the front-right wheel is braked.

(Case 3): when $\gamma<-\epsilon$ and $\Delta\gamma<-\epsilon\Delta\gamma$, i.e., when the vehicle is turning to the right and its behavior is in the over-steering tendency with respect to the target yaw rate $\gamma'$, the front-left wheel is braked.

(Case 4): when $\gamma<-\epsilon$ and $\Delta\gamma>\epsilon\Delta\gamma$, i.e., when the vehicle is turning to the right and its behavior is in the under-steering tendency with respect to the target yaw rate $\gamma'$, the rear-right wheel is braked.

(Case 5): when $|\gamma|<|\epsilon|$, i.e., when the vehicle is running substantially straight, or when $|\Delta\gamma|=|\epsilon\Delta\gamma|$, i.e., when the vehicle is running substantially in the neutral-steering condition, the selection of the wheel to be braked is not performed and no wheel is braked.

That is, in the scopes of the actual yaw rate $\gamma$ and the difference in yaw rate $\Delta\gamma$, except for the case of the substantially straight running condition discriminated by $|\gamma|<|\epsilon|$ and for the case of the substantially neutral-steering condition with respect to the target yaw rate $\gamma'$ discriminated by $|\Delta\gamma|=|\epsilon\Delta\gamma|$, when the sign of the actual yaw rate $\gamma$ is different from the sign of the difference in yaw rate $\Delta\gamma$, the rear-inside wheel is selected as the wheel to be braked, and when the sign of the actual yaw rate $\gamma$ is the same as the sign of the difference in yaw rate $\Delta\gamma$, the front-outside wheel is selected as the wheel to be braked. The results from the braked-wheel discriminating section 17 are outputted to the braking signal output section 18.

The output discriminating section 19 is formed in a circuit serving as output discriminating means for setting a discriminating threshold $\epsilon\Delta$ which discriminates as to whether the difference in yaw rate $\Delta\gamma$ is within the control region, for comparing the discriminating threshold $\epsilon\Delta$ with the difference in yaw rate $\Delta\gamma$ to discriminate as to whether the difference in yaw rate $\Delta\gamma$ is within the control region, and for outputting the results to the braking signal output section 18.

As the discriminating threshold $\epsilon\Delta$, a first threshold $\epsilon\Delta M$ is usually set. After the vehicle behavior changes from the under-steering tendency to the over-steering tendency, a second threshold $\epsilon\Delta S$ is set as the discriminating threshold $\epsilon\Delta$ for a preset time (for a period of time preset in a timer). Both of the first threshold $\epsilon\Delta M$ and the second threshold $\epsilon\Delta S$ are positive values previously obtained by experiment, calculation or the like. The relationship between the respective thresholds for discriminating the difference in yaw rate $\Delta\gamma$ is $|\epsilon\Delta M|>|\epsilon\Delta S|\geq|\epsilon\Delta\gamma|$.

Figure 16:
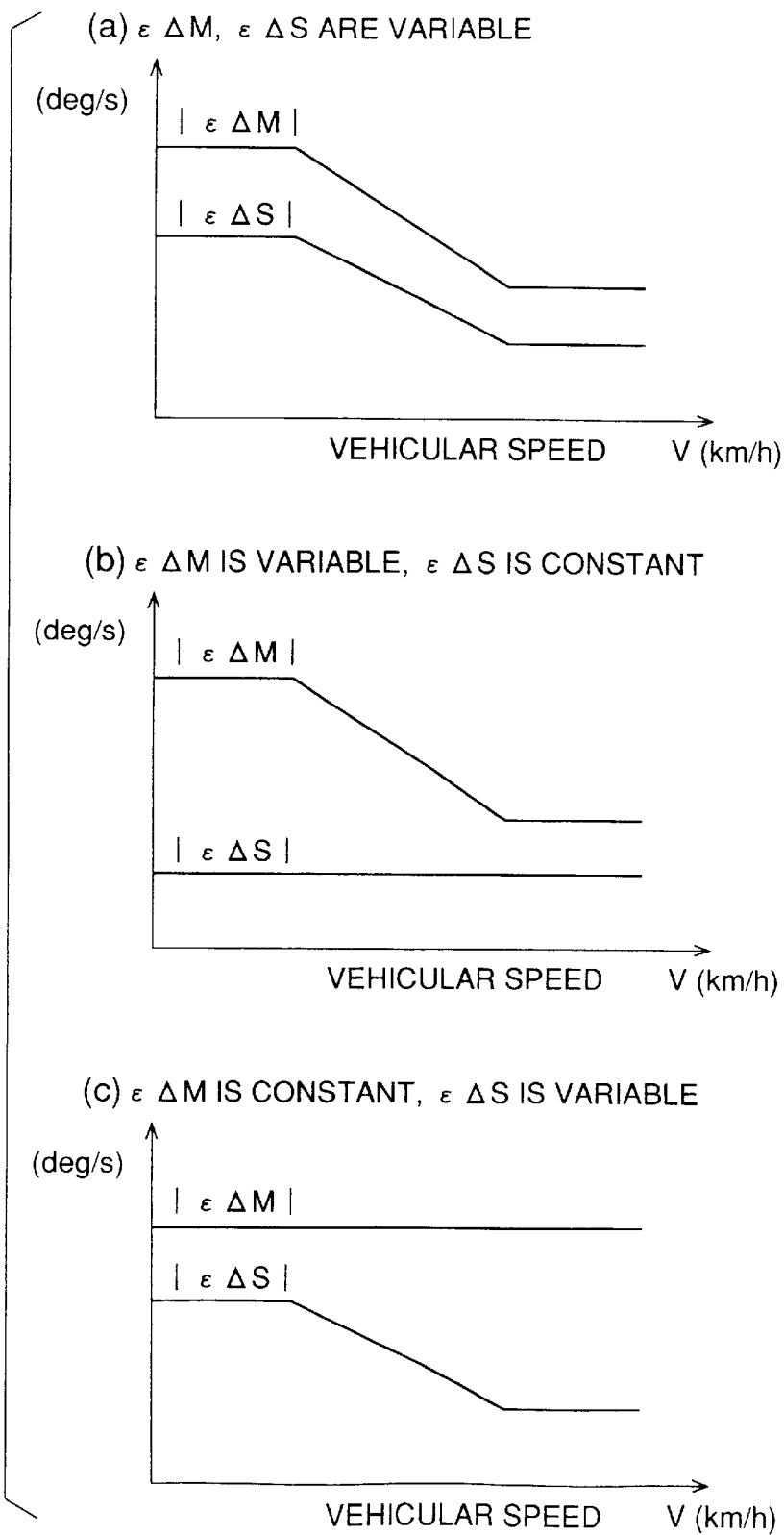
FIGS. 16(a) through 16(c) are graphs explaining the characteristics of discrimination thresholds according to the fourth preferred embodiment of a braking force control of the present invention.

Furthermore, if at least one of the first threshold $\epsilon\Delta M$ and the second threshold $\epsilon\Delta S$ is variably set in accordance with the vehicle speed as shown in FIG. 16 in a memory table or the like, it is possible to set more suitable values in accordance with the vehicle speed, as the discriminating threshold $\epsilon\Delta$. That is, when the vehicle speed is low, even if the vehicle behavior becomes unstable, the driver can simply correct such unstable behavior in comparison with the case of a higher vehicle speed, so that no control is required. Therefore, it is possible to set a relatively great non-control region. For that reason, as shown in FIG. 16(a), the first threshold $\epsilon\Delta M$ and the second threshold $\epsilon\Delta S$ may be so set as to decrease as the vehicle speed increases. Alternatively, as shown in FIG. 16(b), the second threshold $\epsilon\Delta S$ may be set to be constant while the first threshold $\epsilon\Delta M$ may be so set as to decrease as the vehicle speed increases. Moreover, as shown in FIG. 16(c), the first threshold $\epsilon\Delta M$ may be set to be constant while the second threshold $\epsilon\Delta S$ may be so set as to decrease as the vehicle speed increases.

The braking signal output section 18 is a circuit serving as braking signal output means for outputting a discriminating signal which indicates the control region, discriminated in the output discriminating section 19, to the brake driving section 1 so as to add the front-wheel target fluid pressure BF2$f$ or the rear-wheel target fluid pressure BF2$r$ calculated by the target braking-force calculating section 16, to the braked wheel selected by the braked-wheel discriminating section 17.

Referring to the flow charts of FIGS. 13 and 14, the fourth preferred embodiment of a braking force control according to the present invention will be described below.

This braking force control program is executed every predetermined time (for example, 10 ms) while the vehicle is running. After the program is started, at step S101, a steering angle θ is read out of the steering angle sensor 7, wheel speeds ω1, ω2, ω3 and ω4 are read out of the respective wheel-speed sensors 6fl, 6fr, 6rl and 6rr, and an actual yaw rate γ is read out of the yaw rate sensor 8. Then, the routine goes to step S102.

At step S102, the steering angle calculating section 12 calculates an actual steering angle δf (=θ/N) on the basis of the steering angle θ, the vehicle-speed detecting section 11 calculates a vehicle speed V on the basis of the respective wheel speeds ω1, ω2, ω3 and ω4, and the yaw-rate steady gain calculating section 13 calculates a yaw-rate steady gain Gγδf(0) in accordance with the aforementioned formula (1).

Then, the routine goes to step S103 wherein the target yaw-rate calculating section 14 calculates a target yaw rate γ' in accordance with the aforementioned formula (3), and then, the routine goes to step S104 wherein the yaw-rate difference calculating section 15 calculates a difference in yaw rate Δγ (=γ-γ'). Then, the routine goes to step S105 wherein the target braking-force calculating section 16 calculates a front-wheel target fluid pressure BF2f and a rear-wheel target fluid pressure BF2r in accordance with the aforementioned formulae (5) and (6), and the routine goes to step S201.

Steps S201 through S116 correspond to the processing performed by the braked-wheel discriminating section 17. First, at step S201, it is discriminated as to whether the actual yaw rate is larger than ε, i.e., whether the vehicle is turning to the left to a larger extent than a certain extent. When the actual yaw rate γ is not larger than ε, the routine goes to step S202 wherein it is discriminated as to whether the actual yaw rate γ is smaller than -ε, i.e., whether the vehicle is turning to the right to a larger extent than a certain extent. In the scope of the actual yaw rate γ (ε≧γ≧-ε) which is discriminated at the aforementioned step S202 that the vehicle is not turning to the right to a larger extent than a certain extent, the vehicle is running substantially straight, so that the routine goes to step S116 wherein the selection of the wheel to be braked is not performed and no wheel is braked. Furthermore, when it is discriminated at the aforementioned step S201 that γ>ε and the vehicle is turning to the left to a larger extent than a certain extent, the routine goes to step S108A wherein it is discriminated as to whether the difference in yaw rate Δγ is |Δγ|≦|εΔγ| and approximately 0, and the vehicle behavior is substantially neutral-steering.

When it is discriminated in step S108A that |Δγ|≦|εΔγ| and the vehicle behavior is substantially neutral-steered, the routine goes to step S116, and in other cases (in the cases of the under-steering tendency and the over-steering tendency), the routine goes to step S109A.

At step S109A, it is discriminated as to whether the vehicle behavior is the under-steering tendency or the over-steering tendency, and whether Δγ<-εΔγ or Δγ>εΔγ. When Δγ<-εΔγ and the sign of the difference in yaw rate Δγ is negative, which is different from the sign of the actual yaw rate γ, it is discriminated that the vehicle behavior is in the under-steering tendency with respect to the target yaw rate γ', and the routine goes to step S110. On the other hand, when Δγ>εΔγ and the sign of the difference in yaw rate Δγ is positive, which is the same as the sign of the actual yaw rate γ, it is discriminated that the vehicle behavior is in the over-steering tendency with respect to the target yaw rate γ', and the routine goes to step S111.

At step S110, the rear-left wheel 4rl is selected as the wheel which is to be braked by the rear-wheel target fluid pressure BF2r derived at the aforementioned step S105 (the rear-left wheel fluid pressure BRL=BF2r).

At step 111, the front-right wheel 4fr is selected as the wheel which is to be braked by the front-wheel target fluid pressure BF2f derived at the aforementioned step S105 (the front-right wheel fluid pressure BRF=BF2f).

When it is discriminated at the aforementioned step S107 that γ<-ε and the vehicle is turning to the right to a larger extent than a certain extent, the routine goes to step S112A wherein it is discriminated as to whether the difference in yaw rate Δγ is |Δγ|≦|εΔγ| and approximately 0, and the vehicle behavior is substantially neutral-steering.

When it is discriminated that |Δγ|≦|εΔγ| and the vehicle behavior is substantially neutral-steering, the routine goes to step S116, and in other cases (in the cases of the under-steering tendency and the over-steering tendency), the routine goes to step S113A.

At step S113A, it is discriminated as to whether the vehicle behavior is the under-steering tendency or the over-steering tendency, and whether Δγ>εΔγ or Δγ<-εΔγ. When Δγ>εΔγ and the sign of the difference in yaw rate Δγ is positive, which is different from the sign of the actual yaw rate γ, it is discriminated that the vehicle behavior is in the under-steering tendency with respect to the target yaw rate γ', and the routine goes to step S114. On the other hand, when Δγ<-εΔγ and the sign of the difference in yaw rate Δγ is negative, which is the same as the sign of the actual yaw rate γ, it is discriminated that the vehicle behavior is in the under-steering tendency with respect to the target yaw rate γ', and the routine goes to step S115.

At step S114, the rear-right wheel 4rr is selected as the wheel which is to be braked by the rear-wheel target fluid pressure BF2r derived at the aforementioned step S105 (the rear-right wheel fluid pressure BRR=BF2r).

At step S115, the front-left wheel 4fl is selected as the wheel which is to be braked by the front-wheel target fluid pressure BF2f derived at the aforementioned step S105 (the front-left wheel fluid pressure BRL=BF2f).

Furthermore, when the routine goes to step S116 from the aforementioned step S201, S108A or S112A, the selection of the wheel to be braked is not performed and no wheel is braked.

When the processing in the under-steering tendency (the selection of the wheel to be braked and the setting of the fluid pressure) at step S110 or S114 is completed, the routine goes to step S117. When the processing in the over-steering tendency (the selection of the wheel to be braked and the setting of the fluid pressure) at step S111 or S115 is completed, the routine goes to step S118. From step S116, the routine goes to step S124.

At step S117 after the processing in the under-steering tendency at the step S110 or S114 is performed, an under-steering condition passing flag FUS is set (FUS←1) and the routine goes to step S122. This under-steering condition passing flag FUS is a flag which exhibits that the driving in the under-steering tendency was performed and which is cleared by means of a threshold setting timer as mentioned later (FUS←0).

At step S118 after the processing in the over-steering tendency at the step S111 or S115 is performed, it is discriminated as to whether the under-steering condition passing flag FUS is set (FUS=1). When it is discriminated that the under-steering condition passing flag FUS is set and the driving in the under-steering tendency was performed, the routine goes to step S119. When it is discriminated that the under-steering condition passing flag FUS is 0, the routine goes to step S112. In general, since the vehicle behavior passes through the under-steering tendency before the vehicle behavior is in the over-steering tendency, when the vehicle behavior changes from the under-steering tendency to the over-steering tendency, the under-steering condition passing flag FUS should be set, so that the routine goes from step S118 to step S119. However, when the under-steering condition passing flag FUS has been cleared by means of the threshold setting timer or when the vehicle behavior has changed to the over-steering tendency without passing through the under-steering tendency for some reason or other, the routine goes to step S112 without performing the processing at steps S119 through S121.

At step S119, after it is discriminated at step 118 that FUS=1, it is discriminated whether a timer start flag (FTR) is cleared (FTR=0). This timer start flag FTR is a flag which is set (FTR←1) when the threshold setting timer is started and which is cleared (FRT←0) when the threshold setting timer is stopped.

When it is discriminated at step S119 that the timer start flag FTR is cleared (FTR=0) and the threshold setting timer is stopped, the routine goes to step S120 wherein the threshold setting timer is caused to be started and the timer start flag FTR is set. Then, the routine goes to step S121 wherein the second threshold $\epsilon\Delta S$ is set as the discriminating threshold $\epsilon\Delta$, and the routine goes to step S122.

On the other hand, when it is discriminated at step S119 that the timer start flag FTR is set (FTR=1) and the threshold setting timer is actuated, the routine goes directly to step 122.

At step S122, after it is discriminated at step S118 that FUS=0, or after it is discriminated at step S119 that FTR=1, or after step S121, the difference in yaw rate $\Delta\gamma$ is compared with the discriminating threshold $\epsilon\gamma$ (the comparison for the absolute values). When the difference in yaw rate $\gamma\Delta$ is within the control region ($|\Delta\gamma|>|\epsilon\Delta|$), the routine goes to step S123 wherein the braking signal output section 19 outputs a signal to the brake driving section 1. That is, when it is discriminated at the aforementioned step S122 that the difference in yaw rate $\Delta\gamma$ is within the control region, or when the routine passes through the aforementioned steps S110 and S117, the brake driving section 1 causes the wheel cylinder 5rl to produce braking force corresponding to the fluid pressure BRL=BF2r, and when the routine passes through the aforementioned steps S114 and S117, the brake driving section 1 causes the wheel cylinder 5rr to produce braking force corresponding to the fluid pressure BRR=BF2r. In addition, when the routine passes through the aforementioned steps S111 and S118, the brake driving section 1 causes the wheel cylinder 5fr to produce braking force corresponding to the fluid pressure BFR=BF2f, and when the routine passes through the aforementioned steps S115 and S118, the brake driving section 1 causes the wheel cylinder 5fl to produce braking force corresponding to the fluid pressure BFL=BF2f.

On the other hand, when it is discriminated at the aforementioned step S122 that the difference in yaw rate $\Delta\gamma$ is within the non-control region ($|\Delta\gamma|\leq|\epsilon\Delta|$), or when the routine goes from the aforementioned step 116 to step S124, no control signal is output and the set fluid pressure is cleared at step S124. The processing at the aforementioned step S123 and S124 are performed by the control signal output section 19.

When the routine goes to step S125 after the processing at step S123 or S124, it is discriminated as to whether the timer start flag FTR is set (whether the threshold setting timer is operated).

When the timer start flag FTR is cleared and the threshold setting timer is not operated, the routine returns to START.

On the other hand, when the timer start flag FTR is set and the threshold setting timer is operated, the routine goes to step S126 wherein it is discriminated as to whether a predetermined period of time elapsed. When the predetermined period of time has elapsed, the under-steering condition passing flag FUS is cleared at step S127, the first threshold $\epsilon\Delta M$ is set as the discriminating threshold $\epsilon\Delta$ at step S128, the threshold setting timer is stopped and the timer start flag FTR is cleared at step S129, and then, the routine returns to START.

Figure 15:
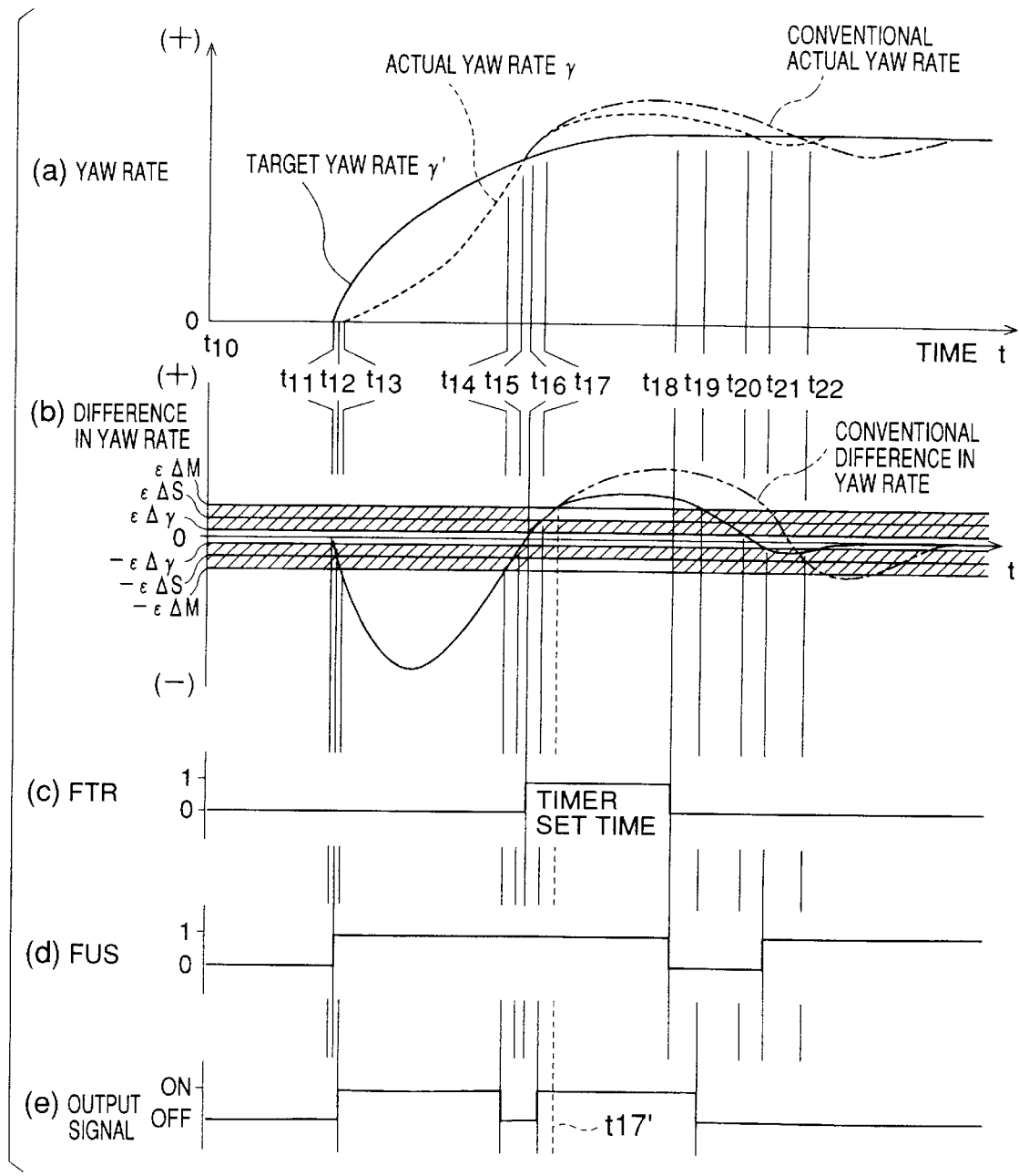
FIG. 15 is a time chart showing an example in the fourth preferred embodiment of a braking force control according to the present invention.

An example of the aforementioned control is shown in FIG. 15. FIG. 15 illustrates an example of the case where a vehicle which is being run straight from t10 turns to the left at t11. FIG. 15(a) shows the transitions in the target yaw rate $\gamma'$ and in the actual yaw rate $\gamma$, FIG. 15(b) shows the transition in the difference in yaw rate $\Delta\gamma$, FIG. 15(c) shows the setting of the timer start flag FTR during the control, FIG. 15(d) shows the setting of the under-steering condition passing flag FUS during the control, and FIG. 15(e) shows ON-OFF of the braking signal output from the braking signal output section 19.

After t11, the actual yaw rate $\gamma$ increases so as to follow the gradually increasing target yaw rate $\gamma'$. The difference between the actual yaw rate $\gamma$ and the target yaw rate $\gamma'$ gradually increases, and the difference between the actual yaw rate $\gamma$, i.e. the difference in yaw rate $\Delta\gamma$, varies in the negative direction so that the absolute value thereof $|\Delta\gamma|$ increases.

After t12, the absolute value $|\Delta\gamma|$ of the difference in yaw rate $\Delta\gamma$ is larger than the absolute value $|\epsilon\Delta\gamma|$ of the threshold $\epsilon\Delta\gamma$ which discriminates the substantially neutral-steering condition, so that the vehicle behavior is in the under-steering tendency with respect to the target yaw rate $\gamma'$ and the under-steering condition passing flag FUS is set. In addition, the first threshold $\epsilon\Delta M$ is set as the discriminating threshold $\epsilon\Delta$ of the non-control region (the region expressed by the slanting lines in FIG. 15(b)), so that no braking signal is outputted until the absolute value $|\Delta\gamma|$ of the difference in yaw rate $\Delta\gamma$ is larger than the absolute value $|\epsilon\Delta|$ of the discriminating threshold $\epsilon\Delta$ at t13.

After t13, until the absolute value $|\Delta\gamma|$ of the difference in yaw rate $\Delta\gamma$ is smaller than the absolute value $|\epsilon\Delta|$ of the discriminating threshold $\epsilon\Delta$ again at t14, the braking signal is outputted. The output of this braking signal corresponds to the case that $\gamma>\epsilon$ (positive, turning to the left), $\Delta\gamma<-\epsilon\Delta\gamma$ (negative, the under-steering tendency), i.e. the case 1 in FIG. 12. In this case 1, braking force is applied to the rear-left wheel 4rl to add moment as shown in the arrow to the vehicle, so as to prevent the drift-out of the vehicle. Furthermore, in this condition, even if excessive braking force is applied to the rear-left wheel 4rl which tends to be locked so as to lessen the resistance to side slip, the vehicle turns toward the over-steering, so that it is possible to produce a yaw rate in the same direction as the original control rule (in the direction of the arrow).

Between t14 and t15, wherein the actual yaw rate $\gamma$ is approaching the target yaw rate $\gamma'$, the vehicle behavior is in the under-steering tendency. However, since the absolute value $|\Delta\gamma|$ of the difference in yaw rate $\Delta\gamma$ is smaller than the absolute value $|\epsilon\Delta|$ of the discriminating threshold $\epsilon\Delta$ and the vehicle behavior is within the non-control region, no braking signal is outputted. In addition, between t15 and 16, the absolute value $|\Delta\gamma|$ of the difference in yaw rate $\Delta\gamma$ is smaller than the absolute value $|\epsilon\Delta|$ of the discriminating threshold $\epsilon\Delta$, so that the vehicle behavior is in the substantially neutral-steering condition.

When the difference in yaw rate $\Delta\gamma$ varies in the positive direction so that the absolute value thereof $|\Delta\gamma|$ increases and when the vehicle behavior is in the over-steering tendency with respect to the target yaw rate γ' after t16, the timer start flag FTR is set, the threshold setting timer is operated, and the second threshold εΔS which is smaller than the first threshold εΔM is set as the discriminating threshold εΔ.

Thereafter, before t17, the absolute value |Δγ| of the difference in yaw rate Δγ is smaller than the absolute value |εΔ| of the discriminating threshold εΔ, so that no braking signal is outputted, and after t17, the braking signal is outputted. The output of this braking signal corresponds to the case that γ>ε(positive, turning to the left), Δγ>εΔγ (positive, the over-steering tendency), i.e. the case 2 in FIG. 12. In this case 2, braking force is applied to the front-right wheel 4fr to add moment as shown in the arrow to the vehicle, so as to prevent the vehicle from spinning. In this condition, even if excessive braking force is applied to the front-right wheel 4fr which tends to be locked so as to lessen the resistance to side slip, the vehicle turns toward the under-steering, so that it is possible to produce a yaw rate in the same direction as the original control rule (in the direction of the arrow).

At t18, the threshold setting timer is stopped, the timer start flag FTR is cleared, the under-steering condition passing flag FUS is also cleared, and the first threshold εΔM is set as the discriminating threshold εΔ. At this time, the discriminating threshold εΔ is changed from the second threshold εΔS to the first threshold εΔM. That is, if the absolute value |Δγ| of the difference in yaw rate Δγ is changed from the small absolute value to the large absolute value, the absolute value |Δγ| of the difference in yaw rate Δγ is larger than the absolute value |εΔM| of the first threshold εΔM, so that the braking signal remains being outputted.

Between t19 and t20 wherein the actual yaw rate γ approaches the target yaw rate γ', the vehicle behavior is in the over-steering tendency. However, since the absolute value |Δγ| of the difference in yaw rate Δγ is smaller than the absolute value |εΔ| of the discriminating threshold εΔ and the vehicle behavior is within the non-control region, no braking signal is outputted. In addition, between t20 and t21, the absolute value |Δγ| of the difference in yaw rate Δγ is smaller than the absolute value |εΔ| of the discriminating threshold εΔ, so that the vehicle behavior is in the substantially neutral-steering condition.

Thereafter, between t21 and t22, the absolute value |Δγ| of the difference in yaw rate Δγ is larger than the absolute value |εΔγ| of the threshold εΔγ again, so that the vehicle behavior is in the under-steering tendency with respect to the target yaw rate γ' and the under-steering condition passing flag FUS is set.

After t22, the absolute value |Δγ| of the difference in yaw rate Δγ is smaller than the absolute value |εΔγ| of the threshold εΔγ again, so that the vehicle behavior is in the substantially neutral-steering condition and the value of the actual yaw rate γ is substantially the same as that of the target yaw rate γ'. In this case, although the under-steering condition passing flag FUS remains set, there is no problem since the vehicle behavior passes through the under-steering tendency before it is in the over-steering tendency.

Furthermore, after t19, the absolute value |Δγ| of the difference in yaw rate Δγ is smaller than the absolute value |εΔ| of the discriminating threshold εΔ and the vehicle behavior is within the non-control region, so that no braking signal is outputted.

As mentioned above, according to the fourth preferred embodiment of the present invention, the second threshold εΔS, the absolute value of which is smaller than that of the first threshold εΔM is set as the discriminating threshold εΔ for a predetermined period of time after the vehicle behavior is changed from the under-steering tendency to the over-steering tendency. Therefore, the control can be quickly started when the vehicle behavior is changed from the under-steering tendency to the over-steering tendency (as expressed by two-dot chain lines in FIG. 15, the conventional control is started at t17' when the vehicle behavior is changed from the under-steering tendency to the over-steering tendency).

For that reason, the difference between the actual yaw rate γ and the target yaw rate γ' can be relatively small after the over-steering tendency, and it is possible to quickly converge the actual yaw rate γ on the target yaw rate γ'.

In addition, since the control is quickly started after the vehicle behavior is changed to the over-steering tendency, it is possible to smoothly control the vehicle without giving a sense of incompatibility to the driver.

In addition, when the vehicle behavior is changed from the over-steering tendency to the under-steering tendency, the non-control region is set to be relatively large in the under-steering tendency wherein the braking force control of the rear wheels is performed, and the non-control region is set to be relatively small in the over-steering tendency wherein the braking force control of the front wheels is performed, so that it is possible to restrain the braking force control of the rear wheels.

Moreover, it is possible to surely prevent the drift-out and spin of a vehicle by discriminating the turning direction of the vehicle on the basis of an actual yaw rate γ to surely discriminate as to whether the running condition of the vehicle is in the under-steering or over-steering tendency with respect to a target yaw rate γ' on the basis of the actual yaw rate γ and a difference in yaw rate Δγ to select the most suitable wheel to be braked from four wheels. That is, it is possible to prevent a vehicle from being easy to spin by applying braking force to a rear wheel in spite of the tendency toward spin, and to prevent a vehicle from being easy to drift out by applying braking force a front wheel in spite of the tendency toward drift-out. In addition, it is possible to prevent braking force from being applied to the wheel in the direction which is easy to spin during counter-steering.

Figure 17:
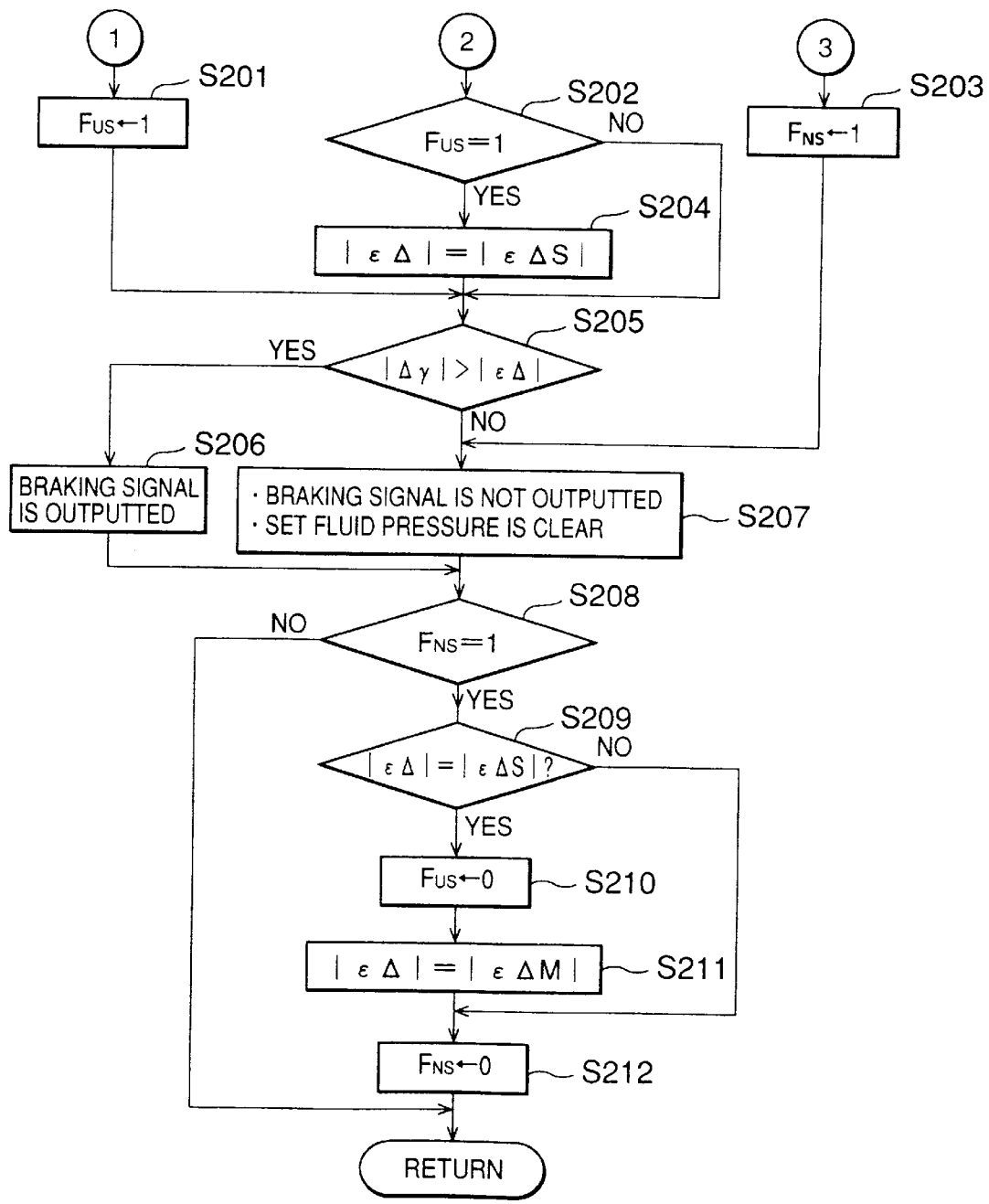
FIG. 17 is a flow chart of the fifth preferred embodiment of a braking force control according to the present invention.
Figure 18:
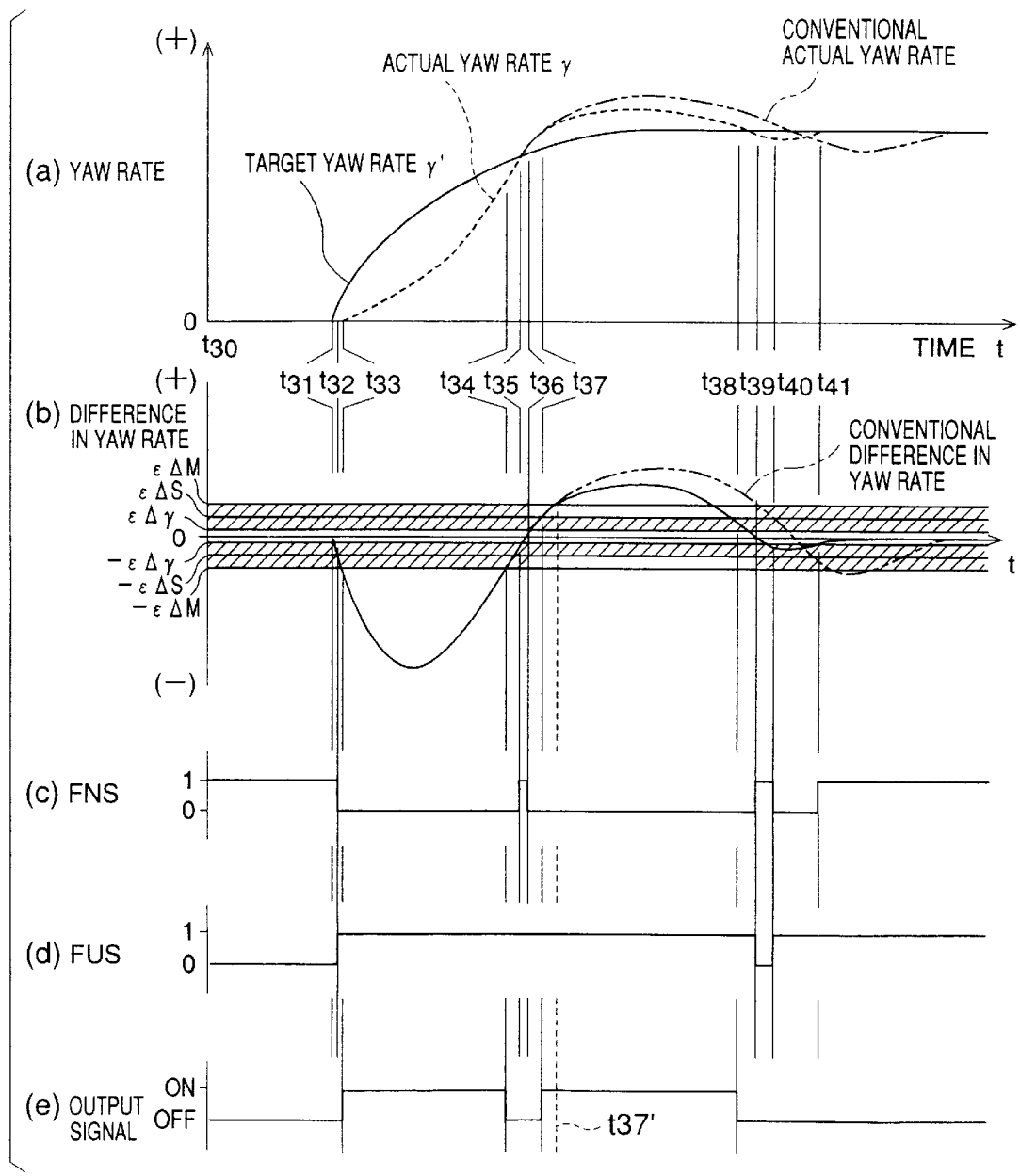
FIG. 18 is a time chart showing an example in the fifth preferred embodiment of a braking force control according to the present invention.

FIGS. 17 and 18 show the fifth preferred embodiment of a braking force control system according to the present invention. FIG. 17 is a flow chart of a braking force control in this preferred embodiment, and FIG. 18 is a time chart showing an example of a braking force control in this preferred embodiment. Furthermore, the return of the discriminating threshold of the non-control region from the second threshold to the first threshold is performed when either value of the difference in yaw rate or the actual yaw rate is substantially zero after the over-steering tendency.

Figure 13:
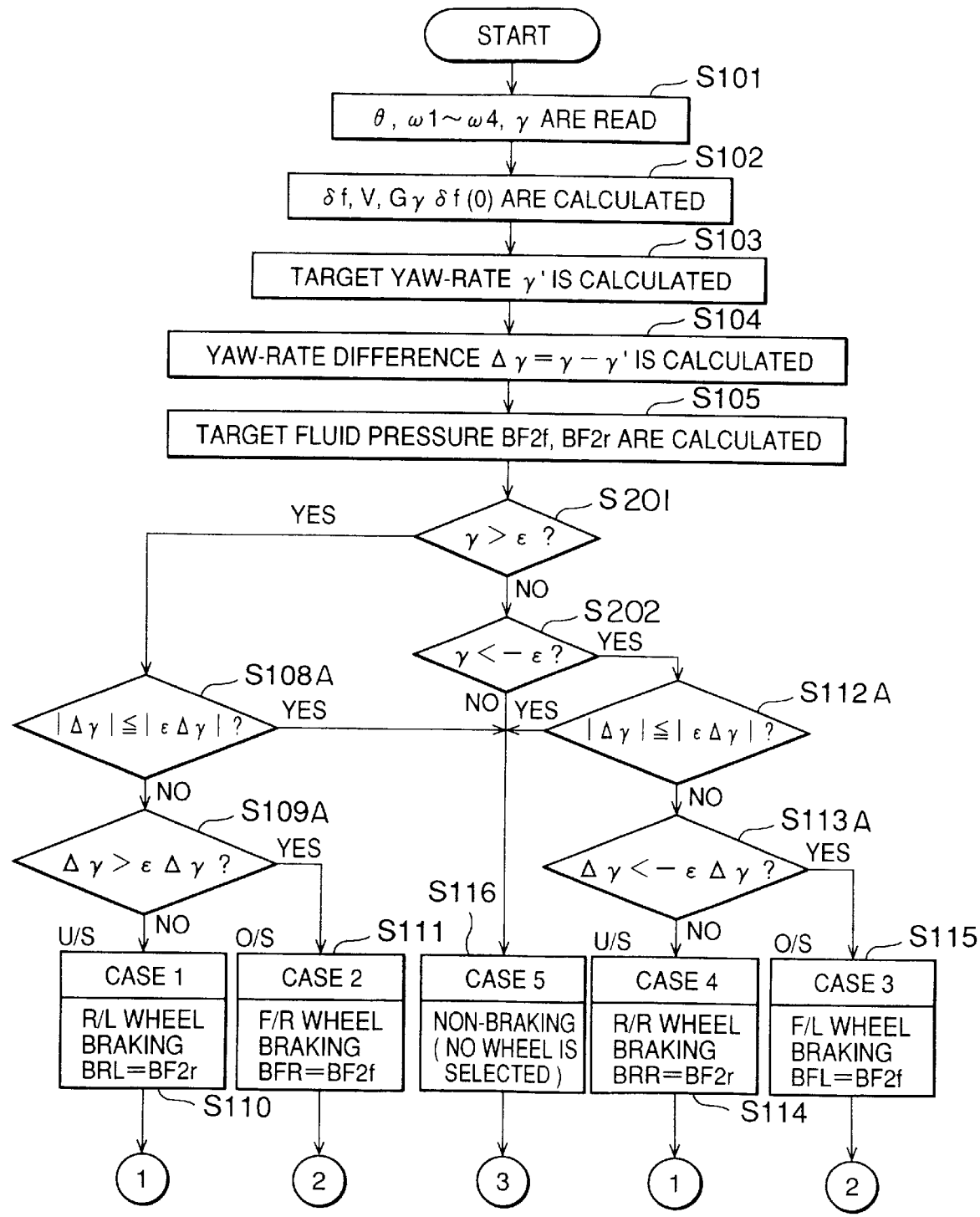
FIG. 13 is a flow chart of the fourth preferred embodiment of a braking force control according to the present invention.
Figure 14:
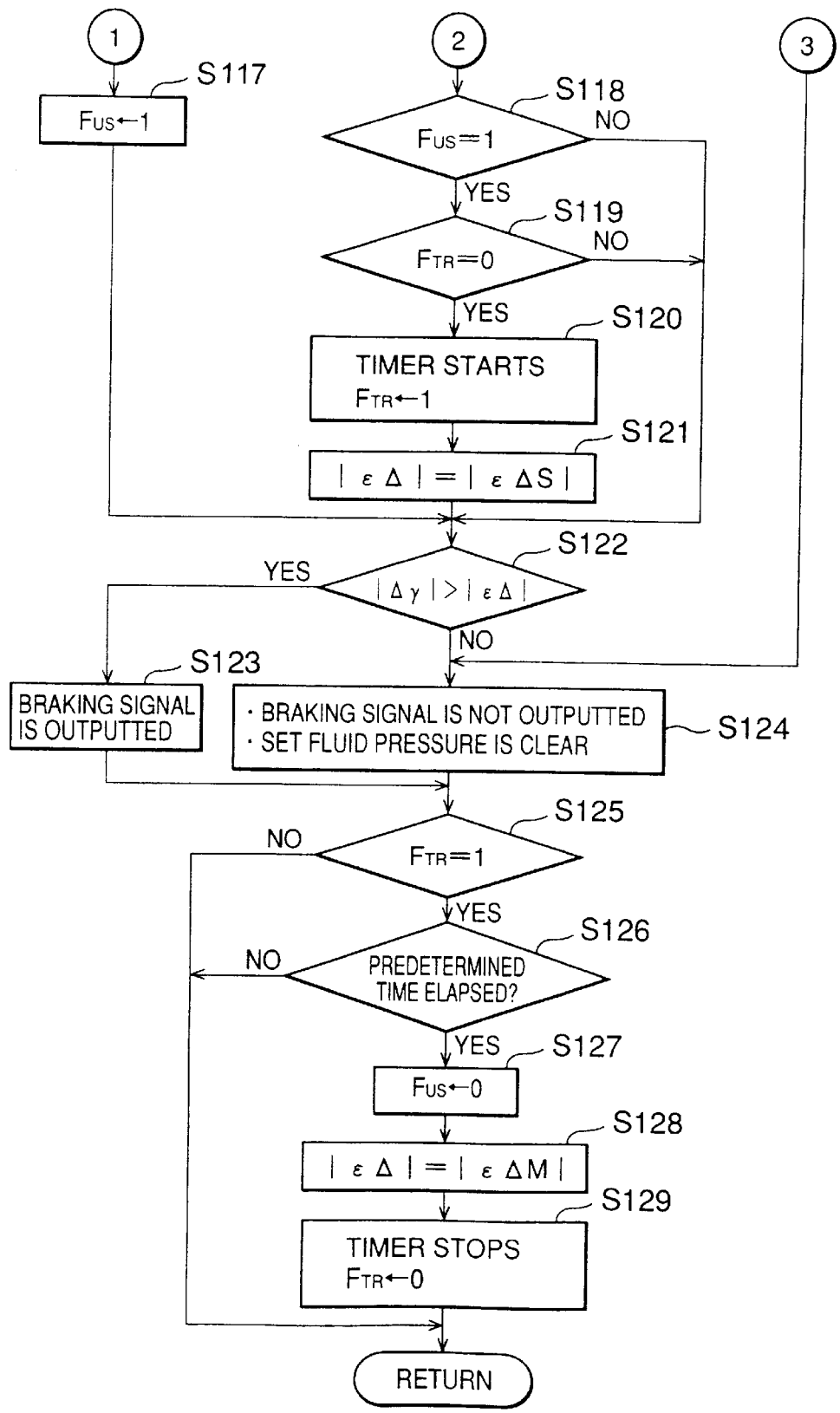
FIG. 14 is a flow chart following the flow chart of FIG. 13.

The flow chart of FIG. 17 follows the flow chart of FIG. 13 in the fourth preferred embodiment. When the processing in the under-steering tendency (the selection of the wheel to be braked and the setting of the fluid pressure) at step 110 or 114 is completed, the routine goes to step 201. When the processing in the over-steering tendency (the selection of the wheel to be braked and the setting of the fluid pressure) at step 111 or 115 is completed, the routine goes to step 202. From step 116, the routine goes to step 203.

At step 201 after the processing in the under-steering tendency at the step 110 or 114 is performed, an under-steering condition passing flag FUS is set (FUS←1) and the routine goes to step 205. This under-steering condition passing flag FUS is a flag which exhibits that the driving in the under-steering tendency was performed and which is cleared (FUS←0) when the vehicle behavior is not in the over-steering tendency in a case where the second threshold $\epsilon\Delta S$ is set as the discriminating threshold $\epsilon\Delta$.

At step 202, after the processing in the over-steering tendency at the step 111 or 115 is performed, it is discriminated as to whether the under-steering condition passing flag FUS is set (FUS=1). When it is discriminated that the under-steering condition passing flag FUS is set and the driving in the under-steering tendency was previously performed, the routine goes to step 204 wherein the second threshold $\epsilon\Delta S$ is set as the discriminating threshold $\epsilon\Delta$, and then, the routine goes to step 205. When it is discriminated at step 202 that the driving in the under-steering tendency has not been performed, the routine goes from step 202 to step 205. In general, since the vehicle behavior passes through the under-steering tendency before the vehicle behavior is in the over-steering tendency, when the vehicle behavior changes from the under-steering tendency to the over-steering tendency, the under-steering condition passing flag FUS should be set, so that the routine goes from step 202 to step 204. However, when the vehicle behavior has changed to the over-steering tendency without passing through the under-steering tendency for some reason or other, the routine goes from step 202 to step 205.

After step 201, after it is discriminated at step 202 that FUS=0, or after step 204, the routine goes to step 205. At step 205, the difference in yaw rate $\Delta\gamma$ is compared with the discriminating threshold $\epsilon\Delta$ (the comparison for the absolute values). When the difference in yaw rate $\epsilon\gamma$ is within the control region ($|\Delta\gamma|>|\epsilon\Delta|$), the routine goes to step 206 wherein the braking signal output section 19 outputs a signal to the brake driving section 1. That is, when it is discriminated at the aforementioned step 205 that the difference in yaw rate $\Delta\gamma$ is within the control region, or when the routine passes through the aforementioned steps 110 and 201, the brake driving section 1 causes the wheel cylinder 5$rl$ to produce braking force corresponding to the fluid pressure BRL=BF2$r$, and when the routine passes through the aforementioned steps 114 and 201, the brake driving section 1 causes the wheel cylinder 5$rr$ to produce braking force corresponding to the fluid pressure BRR=BF2$r$. In addition, when the routine passes through the aforementioned steps 111 and 202, the brake driving section 1 causes the wheel cylinder 5$fr$ to produce braking force corresponding to the fluid pressure BFR=BF2$f$, and when the routine passes through the aforementioned steps 115 and 202, the brake driving section 1 causes the wheel cylinder 5$fl$ to produce braking force corresponding to the fluid pressure BFL=BF2$f$.

On the other hand, when it is discriminated at the aforementioned step 205 that the difference in yaw rate $\Delta\gamma$ is within the non-control region ($|\Delta\gamma|\leq|\epsilon\Delta|$), the routine goes to step 207.

In addition, when the routine goes from the aforementioned step 116 to step 203, a straight and steady running condition flag FNS indicating that the vehicle is running substantially straight or in the substantially neutral-steering condition is set (FNS←1), and the routine goes to step 207.

When the routine goes from the aforementioned step 203 or 205 to step 207, no control signal is outputted and the set fluid pressure is cleared. That is, the processing at the aforementioned step 206 and 207 are performed by the control signal output section 19.

Then, the routine goes to step 208 wherein it is discriminated as to whether the straight and steady running condition flag FNS is set (FNS←1). When it is cleared (FNS←0), the routine returns to START, and when it is set, the routine goes to step 209. Furthermore, it is discriminated at step 208 that FNS=1 only when the routine goes from the aforementioned step 203 to step 208.

At step 209, it is discriminated as to whether the second threshold $\epsilon\Delta S$ is set as the discriminating threshold $\epsilon\Delta$. When the first threshold $\epsilon\Delta M$ is set as the discriminating threshold $\epsilon\Delta$ (the neutral-steering condition when the vehicle behavior is changed from the under-steering tendency to the over-steering tendency), the routine goes to step 212 wherein the straight and steady running condition flag FNS is cleared (FNS←0) and the routine returns to START. On the other hand, when the second threshold $\epsilon\Delta S$ is set as the discriminating threshold $\epsilon\Delta$ (the neutral-steering condition when the vehicle behavior is changed from the over-steering tendency to the under-steering tendency), the routine goes to step 210 wherein the straight and steady running condition flag FNS is cleared (FNS←0) and the routine goes to step 211. At step 211, the first threshold $\epsilon\Delta M$ is set as the discriminating threshold $\epsilon\Delta$, and the routine goes to step 212. At step 212, the straight and steady running condition flag FNS is cleared (FNS←0), and the routine returns to START.

That is, after starting the control, when the vehicle behavior is changed from the under-steering tendency to the over-steering tendency, or when it is changed from the over-steering tendency to the under-steering tendency, it is in the neutral-steering condition. Therefore, at steps 208 and 209, it is detected as to whether the vehicle behavior is in the neutral-steering condition when changed from the over-steering tendency to the under-steering tendency, and at step 211, the second threshold $\epsilon\Delta S$ returns to the first threshold $\epsilon\Delta M$.

An example of the aforementioned control is shown in FIG. 18. This figure illustrates an example of the case where a vehicle which was being run straight from t30 turns to the left at t31. FIG. 18(*a*) shows the transitions in the target yaw rate $\gamma'$ and in the actual yaw rate $\gamma$, FIG. 18(*b*) shows the transition in the difference in yaw rate $\Delta\gamma$, FIG. 18(*c*) shows the setting of the straight and steady running condition flag FNS during the control, FIG. 18(*d*) shows the setting of the under-steering condition passing flag FUS during the control, and FIG. 18(*e*) shows ON-OFF of the braking signal output from the braking signal output section 19.

After t31, although the actual yaw rate $\gamma$ increases so as to follow the gradually increasing target yaw rate $\gamma'$, the difference between the actual yaw rate $\gamma$ and the target yaw rate $\gamma'$ gradually increases, and the difference between the actual yaw rate $\gamma$, i.e. the difference in yaw rate $\Delta\gamma$, varies in the negative direction so that the absolute value thereof $|\Delta\gamma|$ increases.

After t32, the absolute value $|\Delta\gamma|$ of the difference in yaw rate $\Delta\gamma$ is larger than the absolute value $|\epsilon\Delta\gamma|$ of the threshold $\epsilon\Delta\gamma$ which discriminates the substantially neutral-steering condition, so that the vehicle behavior is in the under-steering tendency with respect to the target yaw rate $\gamma'$ and the under-steering condition passing flag FUS is set. In addition, the straight and steady running condition flag FNS which has been set before t32 is cleared at t32. Moreover, the first threshold $\epsilon\Delta M$ is set as the discriminating threshold $\epsilon\Delta$ of the non-control region (the region expressed by the slanting lines in FIG. 18(*b*)), so that no braking signal is outputted until the absolute value $|\Delta\gamma|$ of the difference in yaw rate $\Delta\gamma$ is larger than the absolute value $|\epsilon\Delta|$ of the discriminating threshold $\epsilon\Delta$ at t33.

After t33, until the absolute value $|\Delta\gamma|$ of the difference in yaw rate $\Delta\gamma$ is smaller than the absolute value $|\epsilon\Delta|$ of the discriminating threshold $\epsilon\Delta$ again at t34, the braking signal is outputted. The output of this braking signal corresponds to the case where γ>ε (positive, turning to the left), and Δγ<−εΔγ (negative, the under-steering tendency), i.e. the case 1 in FIG. 12. In this case 1, braking force is applied to the rear-left wheel 4rl to add moment as shown in the arrow to the vehicle, so as to prevent the drift-out of the vehicle. Furthermore, in this condition, even if excessive braking force is applied to the rear-left wheel 4rl which tends to be locked so as to lessen the resistance to side slip, the vehicle turns toward the over-steering, so that it is possible to produce a yaw rate in the same direction as the original control rule (in the direction of the arrow).

Between t34 and t35 wherein the actual yaw rate γ is approaching the target yaw rate γ', the vehicle behavior is in the under-steering tendency. However, since the absolute value |Δγ| of the difference in yaw rate Δγ is smaller than the absolute value |εΔ| of the discriminating threshold εΔ and the vehicle behavior is within the non-control region, no braking signal is outputted. In addition, between t35 and 36, the absolute value |Δγ| of the difference in yaw rate Δγ is smaller than the absolute value |εΔ| of the discriminating threshold εΔ, so that the vehicle behavior is in the substantially neutral-steeringing condition, and the straight and steady running condition flag FNS is set.

After the difference in yaw rate Δγ varies in the positive direction so that the absolute value thereof |Δγ| increases, when the vehicle behavior is in the over-steering tendency with respect to the target yaw rate γ' after t16, the straight and steady running condition flag FNS is cleared, and the second threshold εΔS, the absolute value of which is smaller than that of the first threshold εΔM, is set as the discriminating threshold εΔ.

Thereafter, before t37, the absolute value |Δγ| of the difference in yaw rate Δγ is smaller than the absolute value |εΔ| of the discriminating threshold εΔ, so that no braking signal is outputted, and after t37, the braking signal is outputted until the difference in yaw rate Δγ enters the non-control region again at t38. The output of this braking signal corresponds to the case where γ>ε (positive, turning to the left), and Δγ>εΔγ (positive, the over-steering tendency), i.e. the case 2 in FIG. 12. In this case 2, braking force is applied to the front-right wheel 4fr to add moment as shown in the arrow to the vehicle, so as to prevent the vehicle from spinning. In this condition, even if excessive braking force is applied to the front-right wheel 4fr which tends to be locked so as to lessen the resistance to side slip, the vehicle turns toward the under-steering, so that it is possible to produce a yaw rate in the same direction as the original control rule (in the direction of the arrow).

Between t38 and t39, the absolute value |Δγ| of the difference in yaw rate Δγ is smaller than the absolute value |εΔ| of the discriminating threshold εΔ, so that no braking signal is outputted.

At t39, the vehicle behavior is in the substantially neutral-steering condition, so that the straight and steady running condition flag FNS is set, the under-steering condition passing flag FUS is cleared, and the setting of the discriminating threshold εΔ is changed from the second threshold εΔS to the first threshold εΔM.

Thereafter, between t40 and t41, the absolute value |Δγ| of the difference in yaw rate Δγ is larger than the absolute value |εΔγ| of the threshold εΔγ, so that the straight and steady running condition flag FNS is cleared, and the vehicle behavior is in the under-steering tendency with respect to the target yaw rate γ', so that the under-steering condition passing flag FUS is set.

After t41, the absolute value |Δγ| of the difference in yaw rate Δγ is smaller than the absolute value |εΔγ| of the threshold εΔγ, so that the vehicle behavior is in the substantially neutral-steering condition (the straight and steady running condition flag FNS is also set) and the value of the actual yaw rate γ is substantially the same as that of the target yaw rate γ'. In this case, although the under-steering condition passing flag FUS remains set, there is no problem since the vehicle behavior passes through the under-steering tendency before the over-steering tendency.

Furthermore, after t38, the absolute value |Δγ| of the difference in yaw rate Δγ is smaller than the absolute value |εΔ| of the discriminating threshold εΔ and the vehicle behavior is within the non-control region, so that no braking signal is outputted.

As mentioned above, according to the fifth preferred embodiment of the present invention, the second threshold εΔS, the absolute value of which is smaller than that of the first threshold εΔM is set as the discriminating threshold εΔ until the control in the over-steering tendency is finished after the vehicle behavior is changed from the under-steering tendency to the over-steering tendency. Therefore, the control can be quickly started when the vehicle behavior is changed from the under-steering tendency to the over-steering tendency, and the difference between the actual yaw rate γ and the target yaw rate γ' can be relatively small after the over-steering tendency. In addition, it is possible to quickly converge the actual yaw rate γ on the target yaw rate γ'. Moreover, it is possible to smoothly perform the control without giving the uncomfortable feeling to the driver, and it is possible to restrain the braking force control of the rear wheels. In addition, as mentioned in the fourth preferred embodiment, it is possible to improve the vehicle running stability. Furthermore, t37' in FIG. 18 is the starting point of the control when the vehicle behavior is in the over-steering tendency in the conventional control.

Figure 19:
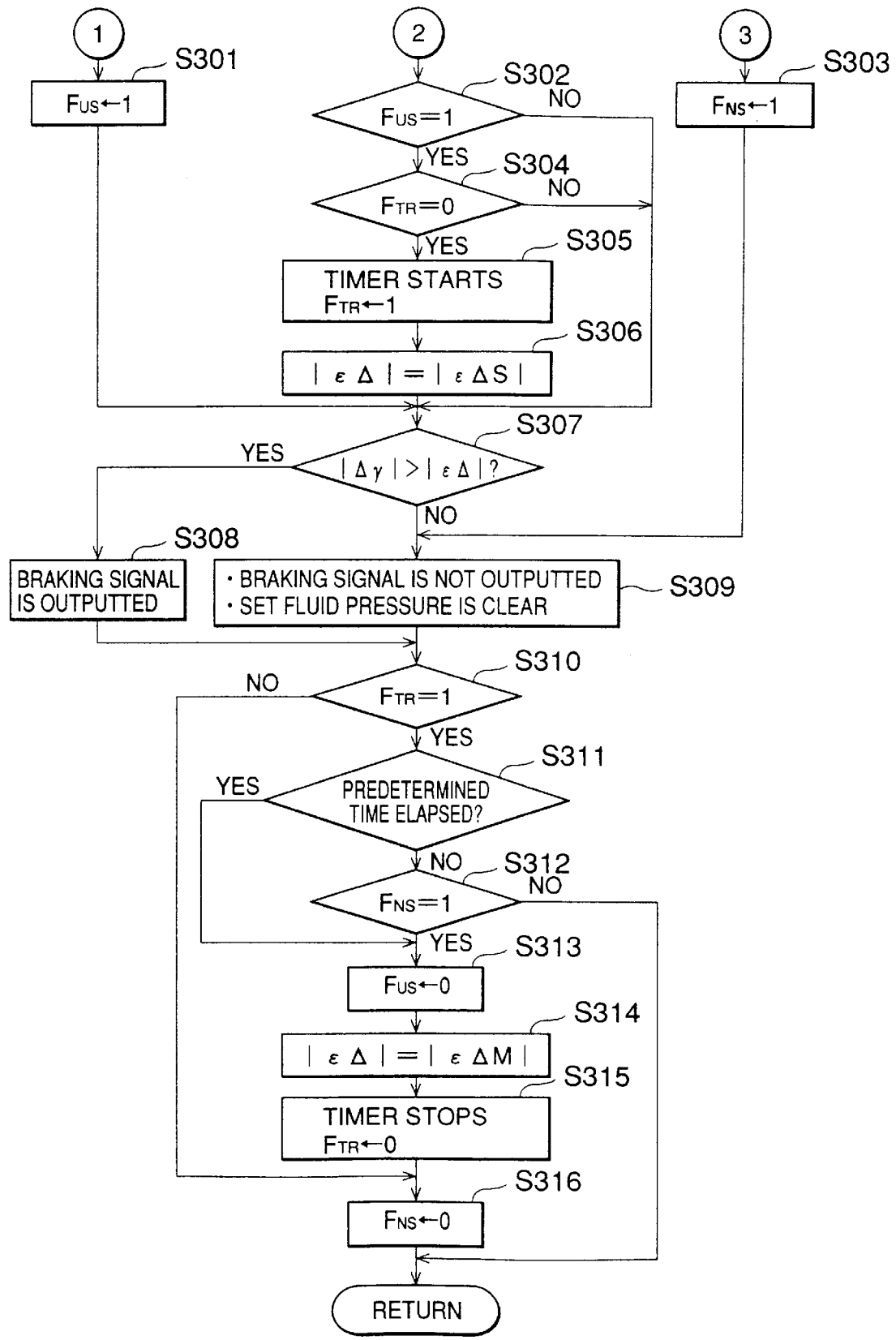
FIG. 19 is a flow chart of the sixth preferred embodiment of a braking force control according to the present invention.

FIGS. 19 and 20 show the sixth preferred embodiment of a braking force control system according to the present invention. FIG. 19 is a flow chart of a braking force control in this preferred embodiment, and FIG. 20 is a time chart showing an example of a braking force control in this preferred embodiment. Furthermore, in this sixth preferred embodiment, the return of the discriminating threshold of the non-control region from the second threshold to the first threshold in the fourth preferred embodiment is performed during the set time in the threshold setting timer as shown in the fourth preferred embodiment, or when either value of the difference in yaw rate or the actual yaw rate is substantially zero after the over-steering tendency.

The flow chart of FIG. 19 follows the flow chart of FIG. 13 in the fourth preferred embodiment. When the processing in the under-steering tendency (the selection of the wheel to be braked and the setting of the fluid pressure) at step 110 or 114 is completed, the routine goes to step 301. When the processing in the over-steering tendency (the selection of the wheel to be braked and the setting of the fluid pressure) at step 111 or 115 is completed, the routine goes to step 302. From step 116, the routine goes to step 303.

When the routine goes to step 301 after the processing in the under-steering tendency is performed at the step 110 or 114, an under-steering condition passing flag FUS is set (FUS←1), and then, the routine goes to step 307. This under-steering condition passing flag FUS is a flag which exhibits that the driving was performed in the under-steering tendency and which is cleared (FUS←0) by means of the threshold setting timer or when the vehicle behavior is changed from the over-steering tendency to the neutral-steering tendency.

When the routine goes to step 302 after the processing in the over-steering tendency is performed at the step 111 or 115 (the selection of the wheel to be braked and the setting of the fluid pressure), it is discriminated as to whether the under-steering condition passing flag FUS is set (FUS=1). When it is discriminated that the under-steering condition passing flag FUS is set and the driving was previously performed in the under-steering tendency, the routine goes to step 304. When the under-steering condition passing flag FUS is cleared, the routine goes to step 307. In general, the vehicle behavior passes through the under-steering tendency before the over-steering tendency. Therefore, when the vehicle behavior changes from the under-steering tendency to the over-steering tendency, the under-steering condition passing flag FUS should be set, so that the routine goes from step 302 to step 304.

However, when the under-steering condition passing flag FUS is cleared by means of the threshold setting timer or when the vehicle behavior has changed to the over-steering tendency without passing through the under-steering tendency for some reason or other, the routine goes from step 302 to step 307 without the need of processing at steps 304 to 306.

When the routine goes to step 304 after it is discriminated at step 302 that FUS=1, it is discriminated as to whether a timer start flag FTR is cleared (FTR=0). This timer start flag FTR is a flag which is set (FTR←1) when the threshold setting timer is started and which is cleared (FTR←0) when the threshold setting timer is stopped.

When it is discriminated at step 304 that the timer start flag FTR is cleared (FTR=0) and the threshold setting timer is stopped, the routine goes to step 305 wherein the threshold setting timer is started and the timer start flag FTR is set. Then, the routine goes to step 306 wherein the second threshold $\epsilon\Delta S$ is set as the discriminating threshold $\epsilon\Delta$, and the routine goes to step 307.

When it is discriminated at step 304 that the timer start flag fTR is set (FTR=1) and the threshold setting timer is operated, the routine passes over steps 305 and 306 to go to step 307.

When the routine goes to step 307 from any one of steps 301, 302 (in the case of FUS=0), 304 (in the case of FTR=1) and 306, the difference in yaw rate $\Delta\gamma$ is compared with the discriminating threshold $\epsilon\Delta$ (the comparison for the absolute values). When the difference in yaw rate $\Delta\gamma$ is within the control region ($|\Delta\gamma|>|\epsilon\Delta|$), the routine goes to step 208 wherein the braking signal output section 19 outputs a signal to the brake driving section 1. That is, when it is discriminated at the aforementioned step 207 that the difference in yaw rate $\Delta\gamma$ is within the control region, or when the routine passes through the aforementioned steps 110 and 301, the brake driving section 1 causes the wheel cylinder 5rl to produce braking force corresponding to the fluid pressure BRL=BF2r, and when the routine passes through the aforementioned steps 114 and 301, the brake driving section 1 causes the wheel cylinder 5rr to produce braking force corresponding to the fluid pressure BRR=BF2r. In addition, when the routine passes through the aforementioned steps 111 and 302, the brake driving section 1 causes the wheel cylinder 5fr to produce braking force corresponding to the fluid pressure BFR=BF2f, and when the routine passes through the aforementioned steps 115 and 302, the brake driving section 1 causes the wheel cylinder 5fl to produce braking force corresponding to the fluid pressure BFL=BF2f.

On the other hand, when it is discriminated at the aforementioned step 307 that the difference in yaw rate $\Delta\gamma$ is within the non-control region ($|\Delta\gamma|\leq|\epsilon\Delta|$), the routine goes to step 309.

In addition, when the routine goes from step 116 to step 203, a straight and steady running condition flag FNS indicating that the vehicle is running substantially straight or in the substantially neutral-steering condition is set (FNS←1), and the routine goes to step 309.

When the routine goes from step 303 or 307 to step 309, no control signal is outputted and the set fluid pressure is also cleared. That is, the processing at step 308 and 309 are performed by means of the control signal output section 19.

Then, when the routine goes to step 310, it is discriminated as to whether the timer start flag FTR is set (whether the threshold setting timer is operated).

When it is discriminated at step 310 that the timer start flag FTR is cleared and the threshold setting timer is not operated, the routine goes to step 316 wherein the straight and steady running condition flag FNS is cleared and the routine returns to START. On the other hand, when it is discriminated at step 310 that the timer start flag FTR is set and the threshold setting timer is operated, the routine goes to step 311 wherein it is discriminated as to whether a predetermined period of time has elapsed.

When it is discriminated at step 311 that the predetermined period of time has elapsed, the routine goes to step 313 wherein the under-steering condition passing flag FUS is cleared, and then, the routine goes to step 314 wherein the first threshold $\epsilon\Delta M$ is set as the discriminating threshold $\epsilon\Delta$. Then, the routine goes to step 315 wherein the threshold setting timer is stopped and the timer start flag FTR is cleared, and then, the routine goes to step 316 wherein the straight and steady running condition flag FNS is cleared and the routine returns to START.

On the other hand, when it is discriminated at step 311 that the predetermined period of time has not elapsed, the routine goes to step 312 wherein it is discriminated that the straight and steady running condition flag FNS is set (FNS=1).

When the straight and steady running condition flag FNS is cleared (FNS=0), the routine returns to START, and when it is set, the routine goes to step 313 wherein the under-steering condition passing flag FUS is cleared, and then, the routine goes to step 314 wherein the first threshold $\epsilon\Delta M$ is set as the discriminating threshold $\epsilon\Delta$. Then, the routine goes to step 315 wherein the threshold setting timer is stopped and the timer start flag FTR is cleared, and then, the routine goes to step 316 wherein the straight and steady running condition flag FNS is cleared and the routine returns to START.

That is, even if the vehicle running condition is the straight and steady running condition before the threshold setting timer is stopped, the first threshold $\epsilon\Delta M$ is designed to be set as the discriminating threshold $\epsilon\Delta$.

An example of the aforementioned control is shown in FIG. 20. This figure illustrates an example of the case where a vehicle which has been run straight from t50 turns to the left at t51. FIG. 20(a) shows the transitions in the target yaw rate $\gamma'$ and in the actual yaw rate $\gamma$, FIG. 20(b) shows the transitions in the difference in yaw rate $\Delta\gamma$, FIG. 20(c) shows the setting of the straight and steady running condition flag FNS during the control, FIG. 20(d) shows the setting of the timer start flag FTR during the control, FIG. 20(e) shows the setting of the under-steering condition passing flag FUS during the control, and FIG. 20(f) shows ON-OFF of the braking signal output from the braking signal output section 19.

After t51, although the actual yaw rate $\gamma$ increases so as to follow the gradually increasing target yaw rate $\gamma'$, the difference between the actual yaw rate $\gamma$ and the target yaw rate $\gamma'$ gradually increases, and the difference between the actual yaw rate γ, i.e. the difference in yaw rate Δγ, varies in the negative direction so that the absolute value thereof |Δγ| increases.

After t52, the absolute value |Δγ| of the difference in yaw rate Δγ is larger than the absolute value |εΔγ| of the threshold εΔγ which discriminates the substantially neutral-steering condition, so that the vehicle behavior is in the under-steering tendency with respect to the target yaw rate γ' and the under-steering condition passing flag FUS is set. In addition, the straight and steady running condition flag FNS which has been set before t52 is cleared after t52. Moreover, the first threshold εΔM is set as the discriminating threshold εΔ of the non-control region (the region expressed by the slanting lines in FIG. 20(b)), so that no braking signal is outputted until the absolute value |Δγ| of the difference in yaw rate Δγ is larger than the absolute value |εΔ| of the discriminating threshold εΔ at t53.

After t53, until the absolute value |Δγ| of the difference in yaw rate Δγ is smaller than the absolute value |εΔ| of the discriminating threshold εΔ again at t54, the braking signal is outputted. The output of this braking signal corresponds to the case that γ>ε (positive, turning to the left), and Δγ<−εΔγ (negative, the under-steering tendency), i.e. the case 1 in FIG. 12. In this case 1, braking force is applied to the rear-left wheel 4rl to add moment as shown in the arrow to the vehicle, so as to prevent the drift-out of the vehicle. Furthermore, in this condition, even if excessive braking force is applied to the rear-left wheel 4rl which tends to be locked so as to lessen the resistance to side slip, the vehicle turns toward the over-steering, so that it is possible to produce a yaw rate in the same direction as the original control rule (in the direction of the arrow).

Between t54 and t55 wherein the actual yaw rate γ is approaching the target yaw rate γ', the vehicle behavior is in the under-steering tendency. However, since the absolute value |Δγ| of the difference in yaw rate Δγ is smaller than the absolute value |εΔ| of the discriminating threshold εΔ and the vehicle behavior is within the non-control region, no braking signal is outputted. In addition, between t55 and 56, the absolute value |Δγ| of the difference in yaw rate Δγ is smaller than the absolute value |εΔ| of the discriminating threshold εΔ, so that the vehicle behavior is in the substantially neutral-steeringing condition and the straight and steady running condition flag FNS is set.

When the difference in yaw rate Δγ varies in the positive direction so that the absolute value thereof |Δγ| increases and when the vehicle behavior is in the over-steering tendency with respect to the target yaw rate γ' after t56, the straight and steady running condition flag FNS is cleared, the timer start flag FTR is set, the threshold setting timer is operated, and the second threshold εΔS which is smaller than the first threshold εΔM is set as the discriminating threshold εΔ.

Thereafter, since the absolute value |Δγ| of the difference in yaw rate Δγ is smaller than the absolute value |εΔ| of the discriminating threshold εΔ before t57, no braking signal is outputted, and after t57, the braking signal is outputted. The output of this braking signal corresponds to the case where γ>ε (positive, turning to the left), and Δγ>εΔγ (positive, the over-steering tendency), i.e. the case 2 in FIG. 12. In this case 2, braking force is applied to the front-right wheel 4fr to add moment as shown in the arrow to the vehicle, so as to prevent the spin of the vehicle. In this condition, even if excessive braking force is applied to the front-right wheel 4fr which tends to be locked so as to lessen the resistance to side slip, the vehicle turns to the under-steering tendency, so that it is possible to produce a yaw rate in the same direction as the original control rule (in the direction of the arrow).

After t58, the absolute value |Δγ| of the difference in yaw rate Δγ is smaller than the absolute value |εΔ| of the discriminating threshold εΔ and in the non-control region. After t59, the vehicle behavior is in the substantially neutral-steering condition before the threshold setting timer is stopped.

For that reason, at t59, the straight and steady running condition flag FNS is set, the under-steering condition passing flag FUS is cleared, the threshold setting timer is stopped, and the timer start flag FTR is cleared. In addition, the first threshold εΔM is set as the discriminating threshold εΔ.

Thereafter, between t60 and t61, the absolute value |Δγ| of the difference in yaw rate Δγ is larger than the absolute value |εΔγ| of the threshold εΔγ again. Therefore, the straight and steady running condition flag FNS is cleared, the vehicle behavior is in the under-steering tendency with respect to the target yaw rate γ', and the under-steering condition passing flag FUS is set.

After t61, the absolute value |Δγ| of the difference in yaw rate Δγ is smaller than the absolute value |εΔγ| of the threshold εΔγ again, so that the vehicle behavior is in the substantially neutral-steering condition (the straight and steady running condition flag FNS is also set) and the value of the actual yaw rate γ is substantially the same as that of the target yaw rate γ'. In this case, although the under-steering condition passing flag FUS remains being set, there is no problem since the vehicle behavior passes through the under-steering tendency before the over-steering tendency.

Furthermore, after t58, the absolute value |Δγ| of the difference in yaw rate Δγ is smaller than the absolute value |εΔ| of the discriminating threshold εΔ and the vehicle behavior is within the non-control region, so that no braking signal is outputted.

As mentioned above, according to the sixth preferred embodiment of the present invention, the second threshold εΔS, the absolute value of which is smaller than that of the first threshold εΔM, is set as the discriminating threshold εΔ during a predetermined setting period of time after the vehicle behavior is changed from the under-steering tendency to the over-steering tendency, or until the control in the over-steering tendency is finished if the predetermined setting period of time does not elapse. Therefore, the control can be quickly started when the vehicle behavior is changed from the under-steering tendency to the over-steering tendency, and the difference between the actual yaw rate γ and the target yaw rate γ' can be relatively small after the over-steering tendency. In addition, it is possible to quickly converge the actual yaw rate γ on the target yaw rate γ'. Moreover, it is possible to smoothly perform the control without giving a sense of incompatibility to the driver, and it is possible to restrain the braking force control of the rear wheels. In addition, as mentioned in the fourth preferred embodiment, it is possible to improve the vehicle running stability. Furthermore, t57' in FIG. 20 is the starting point of the control when the vehicle behavior is changed to the over-steering tendency in the conventional control.

While the presently preferred embodiments of the present invention have been shown and described, it is to be understood that this disclosure is for the purpose of illustration and that various changes and modification may be made without departing from the scope of the invention as set forth in the appended claims.

What is claimed is:

1. A braking force control system for an automotive vehicle having wheel speed detecting means for detecting a speed of each wheel and for generating a wheel speed signal, steering angle detecting means for detecting a steering angle of a steering wheel, and a yaw rate detector for detecting an actual yaw rate of the vehicle and for generating a yaw rate signal, comprising:

vehicle speed calculating means responsive to said wheel speed signal from each wheel for computing a vehicle speed and for producing a vehicle speed signal;

yaw rate calculating means responsive to said vehicle speed signal for calculating a yaw rate gain and for producing a yaw rate signal;

target yaw rate calculating means responsive to said steering angle signal and said yaw rate signal for calculating a target yaw rate on the basis of said vehicle speed and said steering angle and for generating a target yaw rate signal;

yaw rate difference calculating means responsive to said yaw rate and said target yaw rate signals for calculating a difference in said yaw rate by subtracting said target yaw rate from said yaw rate and for producing a difference signal;

target braking force calculating means responsive to said difference signal for calculating a target braking force of said vehicle on the basis of said difference in said yaw rate and running conditions of said vehicle and for generating a target signal;

discriminating means responsive to said yaw rate and said difference signals for selecting a wheel to be braked on the basis of said yaw rate and said difference and for producing a discrimination signal;

output means responsive to said discrimination signal and said target yaw rate signal for outputting a braking signal so as to control a target braking force at an optimum value corresponding to said running conditions of said vehicle; and output discriminating means for setting a first threshold as a yaw-rate difference discriminating threshold which discriminates whether the difference in yaw rate is in a control region, and for setting a second threshold when the sign of the actual yaw rate is the same as the sign of the difference in yaw rate after the sign of the actual yaw rate has been different from the sign of the difference in yaw rate, the absolute value of the second threshold being smaller that the absolute value of the first threshold, and for discriminating as to whether the difference in yaw rate is in the control region by comparing the difference in yaw rate with discriminating threshold, when the sign of the actual yaw rate is the same as the sign of the difference in yaw rate after the sign of the actual yaw rate has been different from the sign of the difference in yaw rate.

2. A braking force control system for an automotive vehicle having wheel speed detecting means for detecting a speed of each wheel and for generating a wheel speed signal steering angle detecting means for detecting a steering angle of a steering wheel, and a yaw rate detector for detecting an actual yaw rate of the vehicle and for generating a yaw rate signal, comprising:

vehicle speed calculating means responsive to said wheel speed signal from each wheel for computing a vehicle speed and for producing a vehicle speed signal;

yaw rate calculating means responsive to said vehicle speed signal for calculating a yaw rate gain and for producing a yaw rate signal;

target yaw rate calculating means responsive to said steering angle signal and said yaw rate signal for calculating a target yaw rate on the basis of said vehicle speed and said steering angle and for generating a target yaw rate signal;

yaw rate difference calculating means responsive to said yaw rate and said target yaw rate signals for calculating a difference in said yaw rate by subtracting said target yaw rate from said yaw rate and for producing a difference signal;

target braking force calculating means responsive to said difference signal for calculating a target braking force of said vehicle on the basis of said difference in said yaw rate and running conditions of said vehicle and for generating a target signal;

discriminating means responsive to said yaw rate and said difference signal for selecting a wheel to be braked on the basis of said yaw rate and said difference and for producing a discrimination signal, wherein said discriminating means presets and stores non-braking values of the actual yaw rate for which selection of the braked wheel of the vehicle is not performed; and output means responsive to said discrimination signal and said target yaw rate signal for outputting a braking signal so as to control a target braking force at an optimum value corresponding to said running conditions of said vehicle.

3. A braking force control system as set forth in claim 2, wherein:

said target braking force includes calculating means for calculating a front-wheel theoretical target braking force and a rear-wheel theoretical target braking force on the basis of the difference in yaw rate calculated by said yaw rate difference calculating means and on the basis of the running condition of the vehicle, and calculating means for calculating a front-wheel target braking force by multiplying said front-wheel theoretical target braking force by a relatively large gain, and a rear-wheel target braking force by multiplying said rear-wheel theoretical target braking force by a relatively small gain.

4. A braking force control system as set forth in claim 3, wherein said relatively large gain by which said target braking force calculating means multiplies said front-wheel theoretical target braking force to calculate said front-wheel target braking force is preset on the basis of vehicle items, and said relatively small gain by which said target braking force calculating means multiplies said rear-wheel theoretical target braking force to calculate said rear-wheel target braking force is preset by multiplying said relatively large gain by a number which is larger than 0 and smaller than 1.

5. A braking force control system as set forth in claim 3, wherein in a preset running condition, said discriminating means selects a rear-inside wheel as the braked wheel when the sign of the actual yaw rate is different from the sign of the difference in yaw rate calculated by said yaw rate difference calculating means, and a front-outside wheel as the braked wheel the sign of the actual yaw rate is the same as the sign of the difference in yaw rate.

6. A braking force control system as set forth in claim 5, wherein said relatively large gain by which said target braking force calculating means multiplies said front-wheel theoretical target braking force for calculating to said front-wheel target braking force is preset on the basis vehicle items, and said relatively small gain by which said target braking force calculating means multiplies said rear-wheel theoretical target braking force for calculating to said rear-wheel target braking force is preset by multiplying said relatively large gain by a number which is larger than 0 and smaller than 1.

7. A braking force control system for an automotive vehicle having wheel speed detecting means for detecting a speed of each wheel and for generating a wheel speed signal, steering angle detecting means for detecting a steering angle of a steering wheel, and a yaw rate detector for detecting an actual yaw rate of the vehicle and for generating a yaw rate signal, comprising:

vehicle speed calculating means responsive to said wheel speed signal from each wheel for computing a vehicle speed and for producing a vehicle speed signal;

yaw rate calculating means responsive to said vehicle speed signal for calculating a yaw rate gain and for producing a yaw rate signal;

target yaw rate calculating means responsive to said steering angle signal and said yaw rate signal for calculating a target yaw rate on the basis of said vehicle speed and said steering angle and for generating a target yaw rate signal;

yaw rate difference calculating means responsive to said yaw rate and said target yaw rate signals for calculating a difference in said yaw rate by subtracting said target yaw rate from said yaw rate and for producing a difference signal;

target braking force calculating means responsive to said difference signal for calculating a target braking force of said vehicle on the basis of said difference in said yaw rate and running conditions of said vehicle and for generating a target signal;

discriminating means responsive to said yaw rate and said difference signals for selecting a wheel to be braked on the basis of said yaw rate and said difference and for producing a discrimination signal, wherein said discriminating means selects a rear-inside wheel as the braked wheel when the sign of the actual yaw rate is different from the sign of the difference in yaw rate calculated by said yaw rate difference calculating means, and a front-outside wheel as the braked wheel when the sign of the actual yaw rate is the same as the sign of the difference in yaw rate; and output means responsive to said discrimination signal and said target yaw rate.

8. A braking force control system as set forth in claim 7, wherein said discriminating means presets and stores non-braking values of the actual yaw rate for which selection of the braked wheel of the vehicle is not performed.

9. A braking force control system as set forth in claim 8, wherein the non-braking values preset and stored in said discriminating means are set for a substantially straight running condition of the vehicle.

10. A braking force control system for an automotive vehicle having wheel speed detecting means for detecting a speed of each wheel and for generating a wheel speed signal, steering angle detecting means for detecting a steering angle of a steering wheel, and a yaw rate detector for detecting an actual yaw rate of the vehicle and for generating a yaw rate signal, comprising:

vehicle speed calculating means responsive to said wheel speed signal from each wheel for computing a vehicle speed and for producing a vehicle speed signal;

yaw rate calculating means responsive to said vehicle speed signal for calculating a yaw rate gain and for producing a yaw rate signal;

target yaw rate calculating means responsive to said steering angle signal and said yaw rate signal for calculating a target yaw rate on the basis of said vehicle speed and said steering angle and for generating a target yaw rate signal;

yaw rate difference calculating means responsive to said yaw rate and said target yaw rate signals for calculating a difference in said yaw rate by subtracting said target yaw rate from said yaw rate and for producing a difference signal;

target braking force calculating means responsive to said difference signal for calculating a target braking force of said vehicle on the basis of said difference in said yaw rate and running conditions of said vehicle and for generating a target signal;

discriminating means responsive to said yaw rate and said difference signals for selecting a wheel to be braked on the basis of said yaw rate and said difference and for producing a discrimination signal, wherein said discriminating means selects a rear-inside wheel as the braked wheel when the sign of the actual yaw rate detected by said yaw rate detector detecting means is different from the sign of the difference in yaw rate calculated by said yaw rate difference calculating means, and a front-outside wheel as the braked wheel when the sign of the actual yaw rate is the same as the sign of the difference in yaw rate;

output means responsive to said discrimination signal and said target yaw rate signal for outputting a braking signal so as to control a target braking force at an optimum value corresponding to said running conditions of said vehicle; and output discriminating means for setting a first threshold as a yaw-rate difference discriminating threshold for discriminating as to whether said difference in yaw rate is in a control region, said output discriminating means varying the value of the first threshold, and for setting a second threshold as said yaw rate discriminating threshold when the sign of the actual yaw rate is the same as the sign of the difference in yaw rate after the sign of the actual yaw rate has been different from the sign of the difference in yaw rate, the absolute value of the second threshold being smaller than the absolute value of said first threshold;

wherein said output means outputs a signal to said brake driving section so as to add the target braking force to the braked wheel selected by said discriminating means when said output discriminating means discriminates that said difference in yaw rate is in said control region.

11. A braking force control system as set forth in claim 10, wherein set intervals at which said second threshold is set by said discriminating means is a preset period of time.

12. A braking force control system as set forth in claim 10, wherein set intervals at which said second threshold is set by said discriminating means is a period of time until any one of the difference in yaw rate and the actual yaw rate is approximately zero after said second threshold is set.

13. A braking force control system as set forth in claim 10, wherein set intervals at which said second threshold is set by said output discriminating means is a shorter period of time out of a preset period of time and a period of time until any one of the difference in yaw rate and the actual yaw rate is approximately zero after said second threshold is set.

14. A braking force control system as set forth in claim 10, wherein at least one of the absolute value of said first threshold and the absolute value of said second threshold is set to decrease as the running speed of the vehicle increases.

* * * * *